(12) United States Patent
Nomura et al.

(10) Patent No.: US 7,773,117 B2
(45) Date of Patent: *Aug. 10, 2010

(54) IMAGE STABILIZER

(75) Inventors: Hiroshi Nomura, Saitama (JP); Shinya Suzuka, Saitama (JP); Ken Endo, Saitama (JP)

(73) Assignee: Hoya Corporation, Tokyo (JP)

( * ) Notice: Subject to any disclaimer, the term of this patent is extended or adjusted under 35 U.S.C. 154(b) by 577 days.

This patent is subject to a terminal disclaimer.

(21) Appl. No.: 11/671,289

(22) Filed: Feb. 5, 2007

(65) Prior Publication Data

US 2007/0182825 A1    Aug. 9, 2007

(30) Foreign Application Priority Data

Feb. 6, 2006    (JP) .............................. 2006-028767

(51) Int. Cl.
*H04N 5/228* (2006.01)
(52) U.S. Cl. ................................ 348/208.7; 348/208.99
(58) Field of Classification Search .............. 348/208.4, 348/208.5, 208.7
See application file for complete search history.

(56) References Cited

U.S. PATENT DOCUMENTS

| | | | | |
|---|---|---|---|---|
| 7,499,635 | B2 * | 3/2009 | Tanaka et al. ................ | 396/55 |
| 7,509,040 | B2 * | 3/2009 | Nomura ....................... | 396/55 |
| 2006/0055787 | A1 * | 3/2006 | Hirota et al. ............... | 348/208.5 |
| 2006/0092285 | A1 * | 5/2006 | Shin ........................ | 348/208.7 |
| 2006/0115257 | A1 | 6/2006 | Nomura | |
| 2006/0115258 | A1 | 6/2006 | Nomura | |
| 2006/0115261 | A1 | 6/2006 | Nomura | |
| 2007/0002147 | A1 | 1/2007 | Nomura et al. | |
| 2007/0003264 | A1 | 1/2007 | Nomura et al. | |
| 2007/0003265 | A1 | 1/2007 | Nomura et al. | |
| 2007/0081806 | A1 * | 4/2007 | Nomura et al. ............... | 396/55 |

FOREIGN PATENT DOCUMENTS

| | | |
|---|---|---|
| JP | 2004-48266 | 2/2004 |
| JP | 2006-157833 | 6/2006 |

OTHER PUBLICATIONS

English language Abstract of JP 2004-48266.
U.S. Appl. No. 11/539,369 to Nomura et al., which was filed Oct. 6, 2006.
U.S. Appl. No. 11/670,702 to Nomura et al., which was filed Feb. 2, 2007.

* cited by examiner

*Primary Examiner*—Sinh Tran
*Assistant Examiner*—Jason A Flohre
(74) *Attorney, Agent, or Firm*—Greenblum & Bernstein, P.L.C.

(57) ABSTRACT

An image stabilizer includes an image pickup device; a guide device which guides the image pickup device in a manner to allow the image pickup device to move linearly in a plane orthogonal to an optical axis, the guide device and the image pickup device being arranged at different positions in the plane; and a flexible printed wiring board which extends from the image pickup device. The flexible printed wiring board includes an integrally-movable portion which is connected to the image pickup device to move with the image pickup device, and a freely-deformable portion extending from the integrally-movable portion. The flexible printed wiring board is orientated toward the guide device so that a boundary between the integrally-movable portion and the freely-deformable portion is positioned close to the guide device.

10 Claims, 39 Drawing Sheets

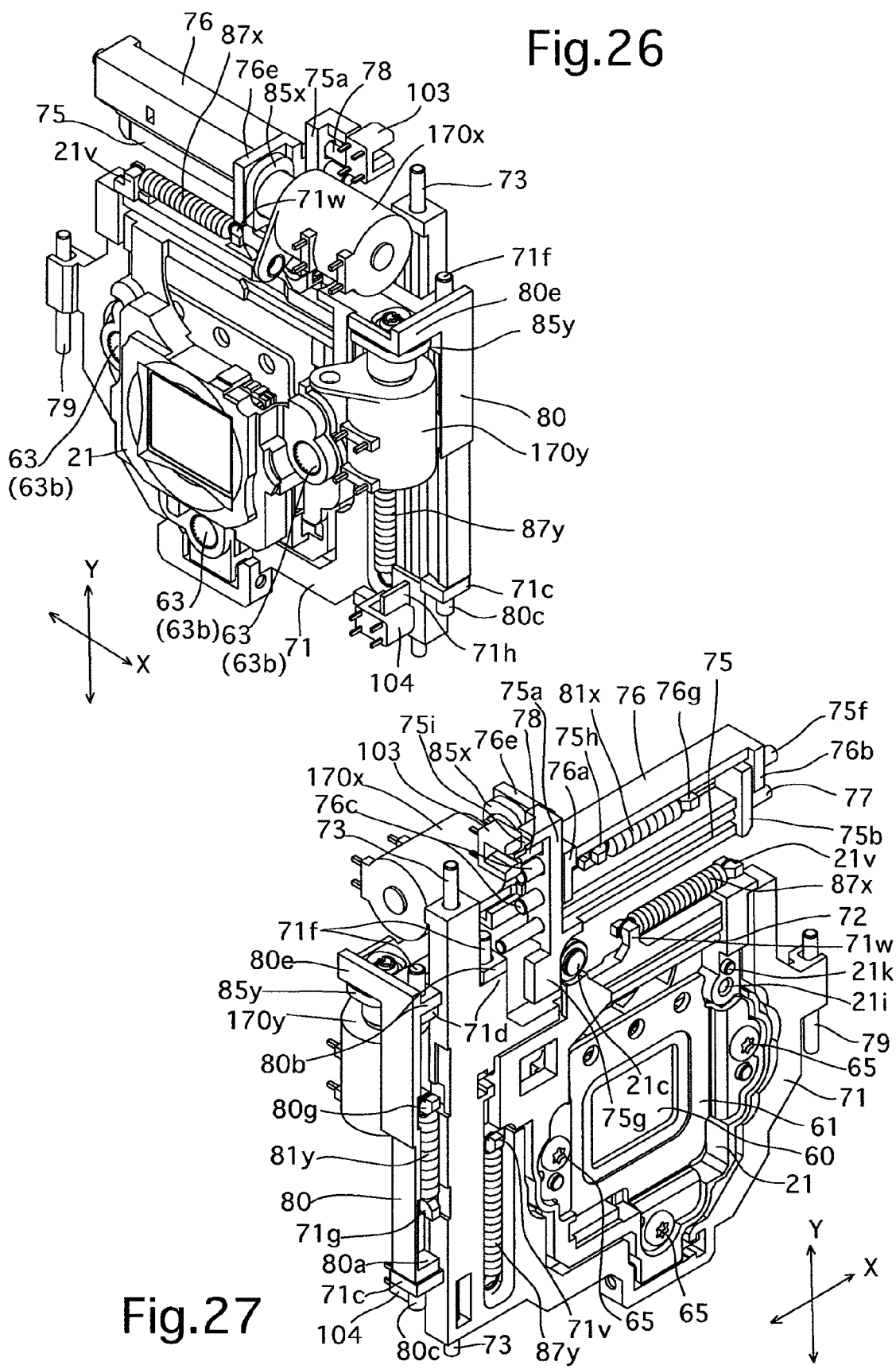

IMAGE STABILIZER

BACKGROUND OF THE INVENTION

1. Field of the Invention

The present invention relates to an image stabilizer which is incorporated in an optical device such as a camera or binoculars.

2. Description of the Related Arts

Optical image stabilizers (shake reduction systems/anti-shake systems) prevent (reduce) image shake of an object image formed at a focal plane by moving a part of an optical system relative to an optical axis thereof so that the part of the optical system shifts from the optical axis in accordance with the direction and the magnitude of vibration (shake) applied to the optical device in which the image stabilizer is incorporated. Such optical image stabilizers can be broadly divided into the following two types: a type of image stabilizer which swings an image-stabilizing optical element about an axis positioned away from the optical axis of the optical system, and another type (X-Y stage type) of image stabilizer which moves an image-stabilizing optical element in a plane orthogonal to the optical axis of the optical system.

The latter type (X-Y stage type) has the advantage that the image stabilizing optical element can be moved precisely in directions to cancel image shake; however, in an apparatus such as an image stabilizer which is required to be driven with great precision, the occurrence of a deleterious moment such as a bending moment or a torsional moment must be controlled to the limit to move the image stabilizing optical element precisely on the order of micrometer.

Specifically, in the case where an electrical component such as an image pickup device is adopted as the image stabilizing optical element, the load on movements of the image pickup device due to deformation of the flexible printed wiring board which extends from the image pickup device must be prevented from becoming deleterious moment or friction.

SUMMARY OF THE INVENTION

The present invention provides an image stabilizer which includes an image pickup device driven in a plane orthogonal to an optical axis to counteract image shake, wherein the image stabilizer is configured to minimize the occurrence of deleterious moment and friction to thereby make it possible to move the image pickup device with a high degree of precision.

According to an aspect of the present invention, an image stabilizer is provided, including an image pickup device; a guide device which guides the image pickup device in a manner to allow the image pickup device to move linearly in a plane orthogonal to an optical axis, the guide device and the image pickup device being arranged at different positions in the plane; and a flexible printed wiring board which extends from the image pickup device. The flexible printed wiring board includes an integrally-movable portion which is connected to the image pickup device to move with the image pickup device, and a freely-deformable portion extending from the integrally-movable portion. The flexible printed wiring board is orientated toward the guide device so that a boundary between the integrally-movable portion and the freely-deformable portion is positioned close to the guide device.

It is desirable for the image stabilizer to include an image-pickup-device holding member which holds the image pickup device, wherein the integrally-movable portion of the flexible printed wiring board is supported by the image-pickup-device holding member.

It is desirable for the image-pickup-device holding member to include a holding frame which holds the image pickup device and is guided linearly by the guide device; and a flexible printed wiring board support member fixed to the holding frame behind the image pickup device so that the flexible printed wiring board partly lies on a front surface of the flexible printed wiring board support member.

It is desirable for the image stabilizer to include a driving device which moves the image-pickup-device holding member in a guide direction of the guide device, the driving device being arranged at different position from the guide device in a plane orthogonal to the optical axis.

It is desirable for the image-pickup-device holding member to include a first moving stage to which the image pickup device is mounted and which is guided linearly in a first direction by the guide device, and a second moving stage which holds the first moving stage and is movable linearly in a second direction orthogonal to the first direction in a plane orthogonal to the optical axis.

It is desirable for a direction of formation of the boundary between the integrally-movable portion and the freely-deformable portion of the flexible printed wiring board to be substantially parallel to a guiding direction of the guide device.

It is desirable for the guide device to include a guide shaft extending in a direction orthogonal to the optical axis; and a guide hole which is formed in the image-pickup-device holding member and in which the guide shaft is slidably engaged.

It is desirable for the driving device to include at least one motor.

It is desirable for the image stabilizer to be incorporated in a digital camera.

In an embodiment, an image stabilizer is provided, including an image pickup device; a holding frame which holds the image pickup device; a guide device which guides the holding frame in a manner to allow the holding frame to move linearly in a plane orthogonal to an optical axis; a flexible printed wiring board which extends from the image pickup device; and a flexible printed wiring board support member fixed to the holding frame behind the image pickup device so that the flexible printed wiring board partly lies on a front surface of the flexible printed wiring board support member, the flexible printed wiring board support member being moved with the holding frame in a direction orthogonal to the optical axis. The flexible printed wiring board is orientated toward the guide device so that a boundary between a supported portion and a non-supported portion of the flexible printed wiring board which are supported and not supported by the flexible printed wiring board support member, respectively, is positioned close to the guide device.

In an embodiment, an image stabilizer is provided, including an image pickup device; a guide device which guides the image pickup device in a manner to allow the image pickup device to move linearly in a plane orthogonal to an optical axis, the guide device and the image pickup device being arranged at different positions in the plane; and a flexible printed wiring board which extends from the image pickup device The flexible printed wiring board includes an integrally-movable portion which is connected to the image pickup device to move with the image pickup device, and a freely-deformable portion extending from the integrally-movable portion. A direction of formation of the boundary between the integrally-movable portion and the freely-deformable portion of the flexible printed wiring board is substantially parallel to a guiding direction of the guide device.

According to the present invention, a high-reliability image stabilizer which includes an image pickup device driven in a plane orthogonal to an optical axis to counteract image shake, wherein the image stabilizer minimizes the occurrence of deleterious moment and friction to thereby make it possible to move the image pickup device with a high degree of precision, is achieved.

The present disclosure relates to subject matter contained in Japanese Patent Application No. 2006-28767 (filed on Feb. 6, 2006) which is expressly incorporated herein by reference in its entirety.

BRIEF DESCRIPTION OF THE DRAWINGS

The present invention will be described below in detail with reference to the accompanying drawings in which:

FIG. 26 is a view similar to that of FIG. 18, showing another embodiment (second embodiment) of the image stabilizing unit from which the stationary holder is removed;

FIG. 27 is a rear perspective view of the elements of the image stabilizing unit shown in FIG. 26;

DESCRIPTION OF THE PREFERRED EMBODIMENTS

Figure 1:
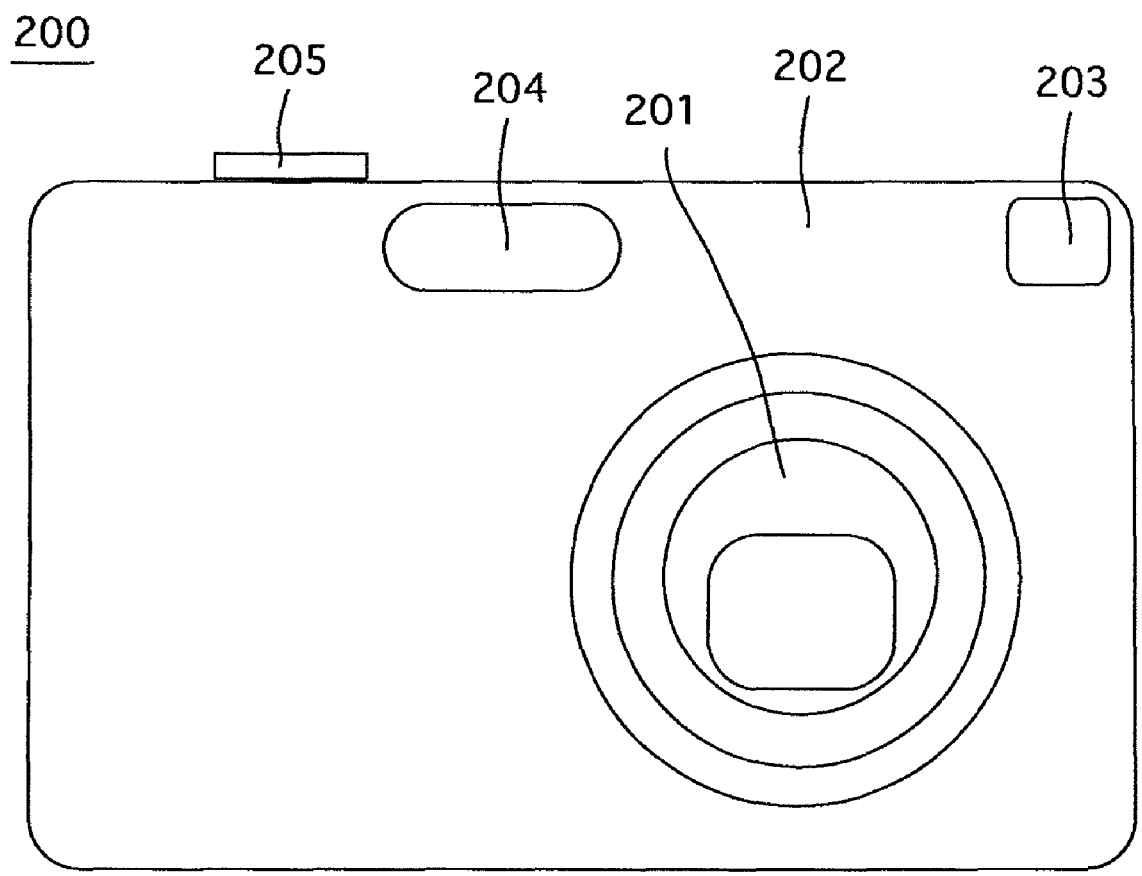
FIG. 1 is a front elevational view of an embodiment of a digital camera equipped with an image stabilizer according to the present invention.

FIG. 1 shows an outward appearance of a digital camera 200 which incorporates an image stabilizer according to the present invention. The digital camera 200 is provided on the front of a camera body 202 thereof with a zoom lens (zoom lens barrel) 201, an optical viewfinder 203 and a flash 204, and is provided on the top of the camera body 202 with a shutter button 205.

Figure 2:
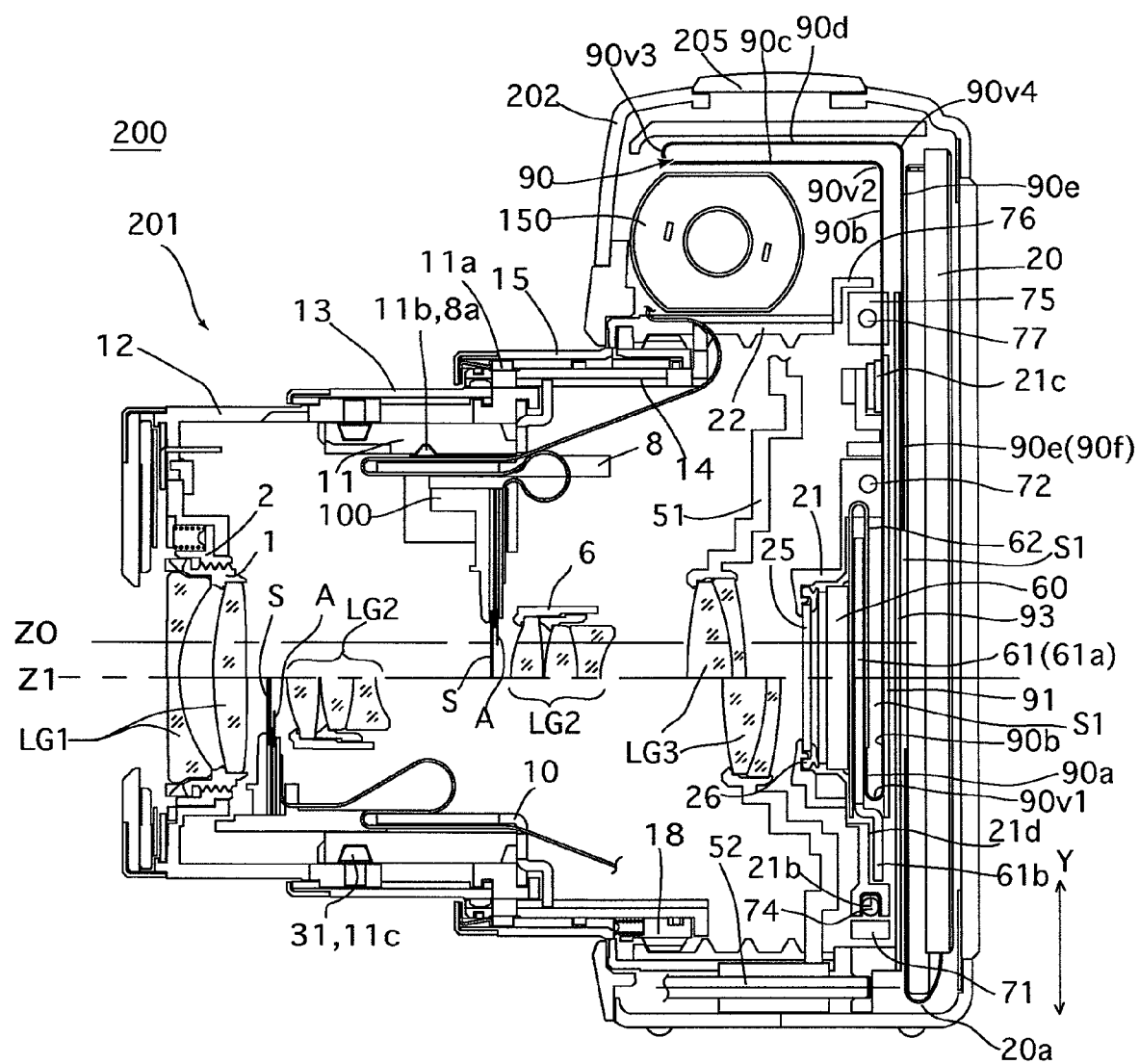
FIG. 2 is a longitudinal sectional view of the digital camera shown in FIG. 1 in a ready-to-photograph state of the zoom lens thereof.
Figure 3:
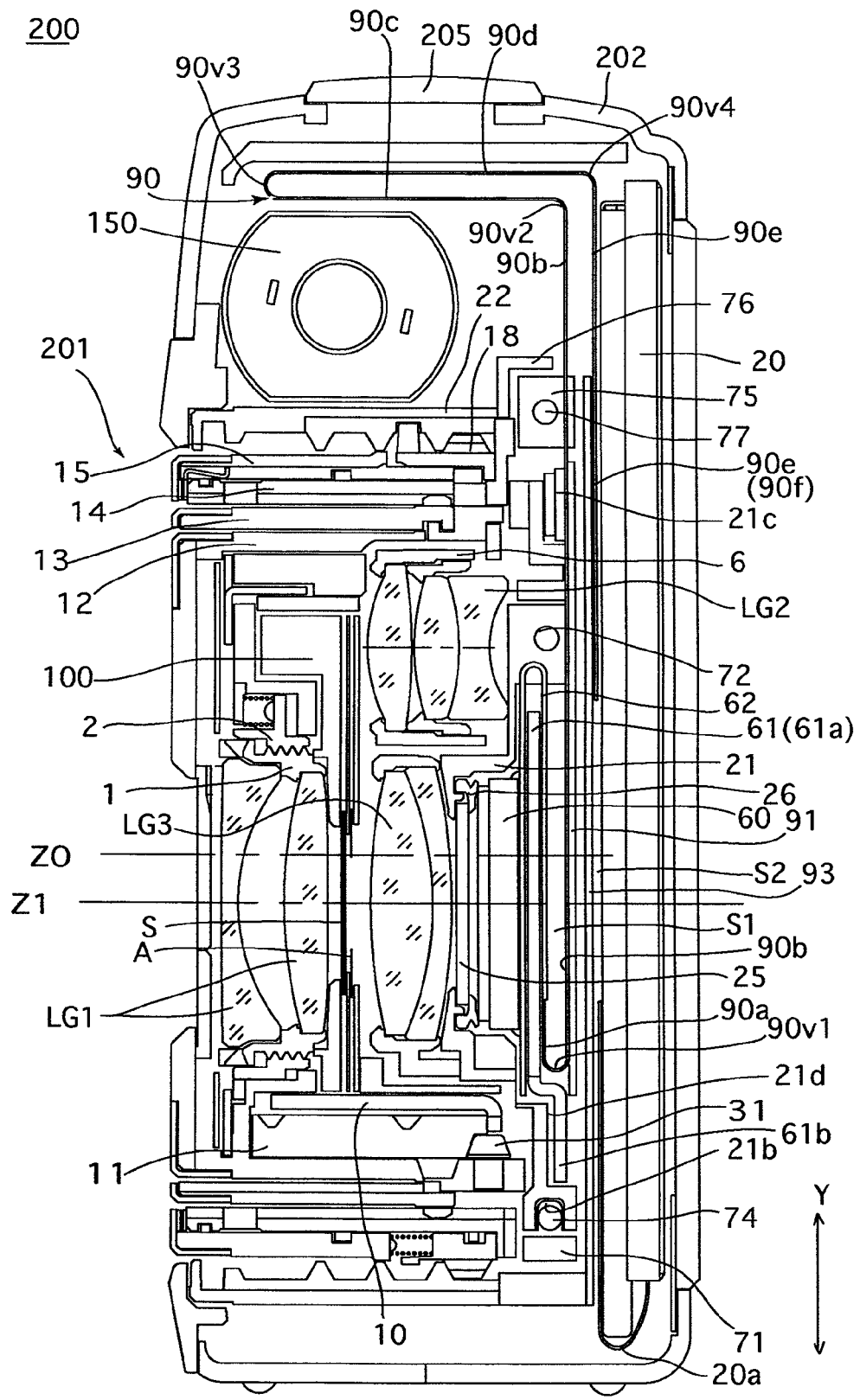
FIG. 3 is a longitudinal sectional view of the digital camera shown in FIG. 1 in the fully-retracted state of the zoom lens.
Figure 5:
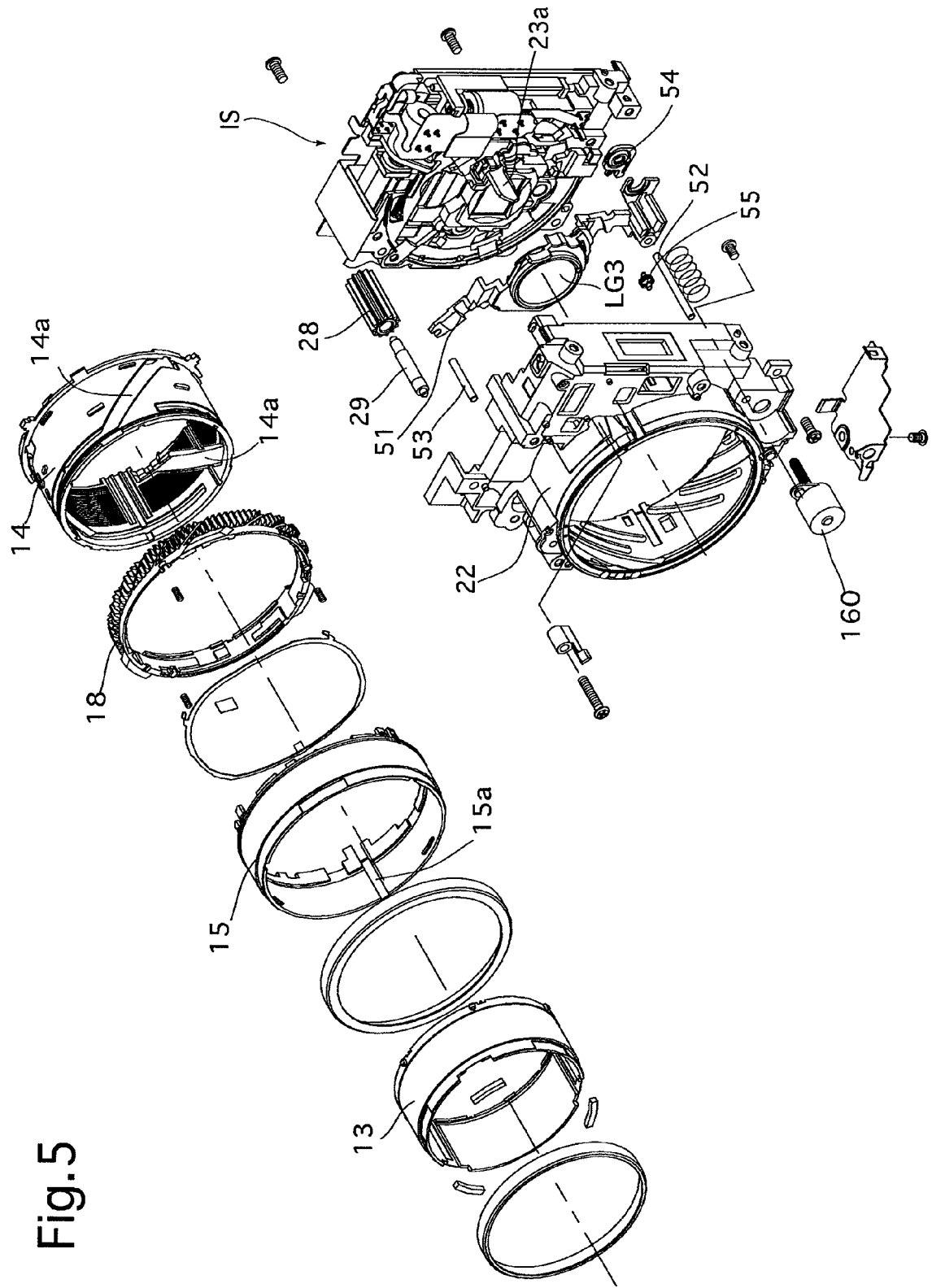
FIG. 5 is an exploded perspective view of a portion of the zoom lens shown in FIG. 4.
Figure 6:
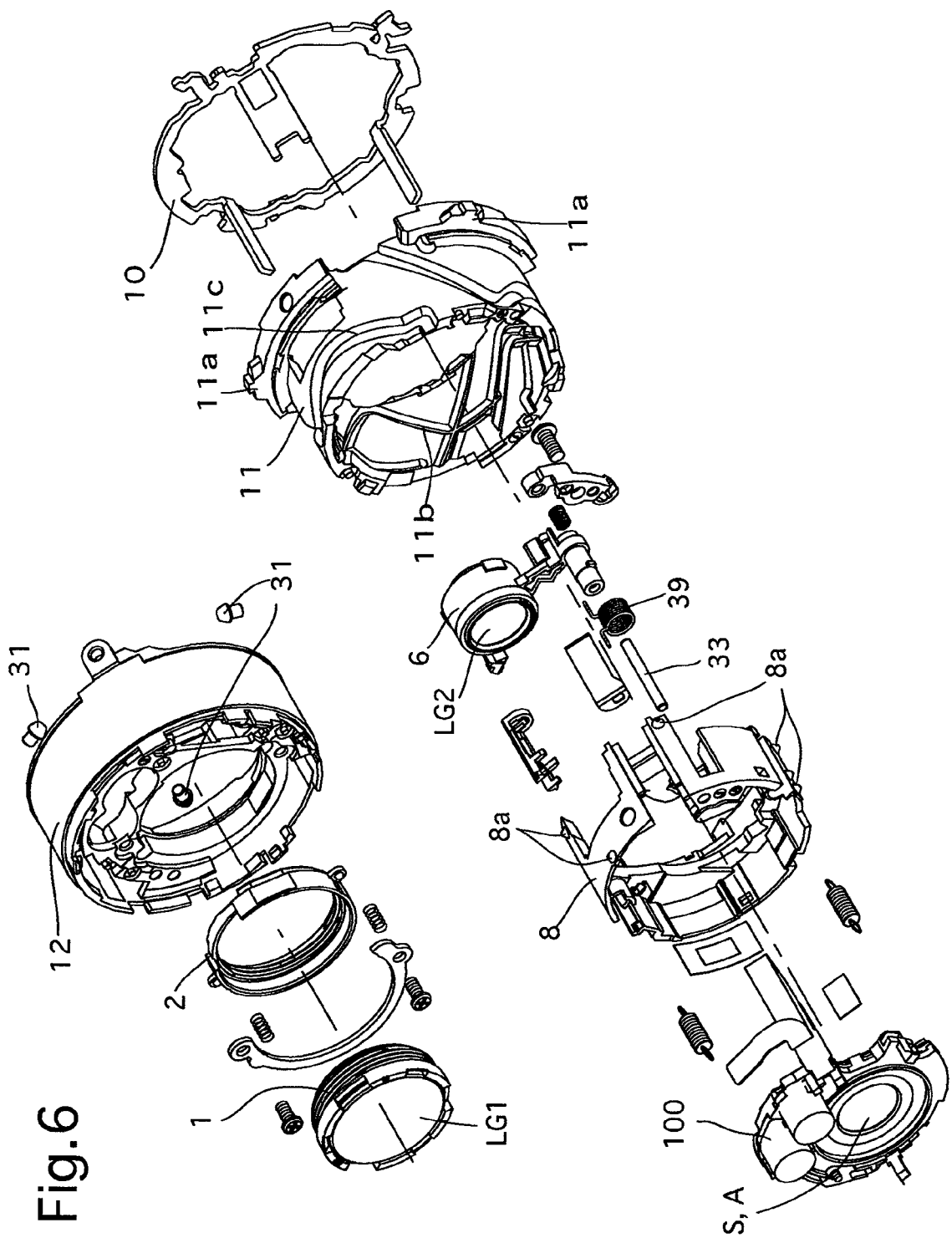
FIG. 6 is an exploded perspective view of another portion of the zoom lens shown in FIG. 4.

The zoom lens 201 of the digital camera 200, longitudinal sectional views of which are shown in FIGS. 2 and 3, is driven to advance toward the object side (leftward as viewed in FIGS. 2 and 3) from the camera body 202 as shown in FIG. 2 during a photographing operation. When photography is not carried out, the digital camera 200 moves from a ready-to-photograph state shown in FIG. 2 to a fully-retracted state shown in FIG. 3 in which the zoom lens 201 is accommodated (fully retracted) in the camera body 202 as shown in FIG. 3. In FIG. 2, the upper half and the lower half of the zoom lens 201 from a photographing optical axis Z1 show the ready-to-photograph state of the zoom lens 201 at the wide-angle extremity and the telephoto extremity, respectively. As shown in FIGS. 5 and 6, the zoom lens 201 is provided with a plurality of ring members (hollow-cylindrical members): a second linear guide ring 10, a cam ring 11, a third movable barrel 12, a second movable barrel 13, a first linear guide ring 14, a first movable barrel 15, a helicoid ring 18 and a stationary barrel 22 which are substantially concentrically arranged about a common axis that is shown as a lens barrel axis Z0 in FIGS. 2 and 3.

The zoom lens 201 is provided with a photographing optical system including a first lens group LG1, a shutter S, an adjustable diaphragm A, a second lens group LG2, a third lens group LG3, a low-pass filter 25 and a CCD image sensor 60 that serves an image pickup device. Optical elements from the first lens group LG1 to the CCD image sensor 60 are positioned on the photographing optical axis (common optical axis) Z1 when the zoom lens 201 is in a ready-to-photograph state. The photographing optical axis Z1 is parallel to the lens barrel axis Z0 and positioned below the lens barrel axis Z0. The first lens group LG1 and the second lens group LG2 are moved along the photographing optical axis Z1 in a predetermined moving manner to perform a zooming operation, and the third lens group LG3 is moved along the photographing optical axis Z1 to perform a focusing operation. In the following description, the term "optical axis direction" refers to a direction parallel to the photographing optical axis Z1 and the terms "object side" and "image side" refer to forward and rearward of the digital camera 200, respectively. Additionally, in the following description, the vertical direction and the horizontal direction of the digital camera 200 in a plane orthogonal to the photographing optical axis Z1 are defined as a Y-axis direction and an X-axis direction, respectively.

The stationary barrel 22 is positioned in the camera body 202 and fixed thereto, while a stationary holder 23 is fixed to a rear portion of the stationary barrel 22. The CCD image sensor 60 and the low-pass filter 25 are supported by the stationary holder 23 via a Y-axis direction moving stage (image-pickup-device holding member/holding frame) 71 and an X-axis direction moving stage (image-pickup-device holding member/holding frame) 21 to be movable in the X-axis direction and the Y-axis direction. The digital camera 200 is provided behind the stationary holder 23 with an LCD panel 20 which indicates visual images and various photographic information. The LCD panel 20 is installed so that the viewing area thereof faces toward the back side of the camera body 202, and a flexible printed wiring board 20a extends from the bottom end of the LCD panel 20.

The zoom lens 201 is provided in the stationary barrel 22 with a third lens frame 51 which supports and holds the third lens group LG3. The zoom lens 201 is provided between the stationary holder 23 and the stationary barrel 22 with a pair of guide shafts 52 and 53 which extend parallel to the photographing optical axis Z1 to guide the third lens frame 51 in the optical axis direction without rotating the third lens frame 51 about the lens barrel axis Z0. The third lens frame 51 is biased forward by a third lens frame biasing spring (extension coil spring) 55. The digital camera 200 is provided with a focusing motor 160 having a rotary drive shaft which is threaded to serve as a feed screw, and the rotary drive shaft is screwed through a screw hole formed on an AF nut 54. If the AF nut 54 is moved rearward by a rotation of the rotary drive shaft of the focusing motor 160, the third lens frame 51 is pressed by the AF nut 54 to move rearward. Conversely, if the AF nut 54 is moved forward, the third lens frame 51 follows the AF nut 54 to move forward by the biasing force of the third lens frame biasing spring 55. Due to this structure, the third lens frame 51 can be moved forward and rearward in the optical axis direction.

Figure 4:
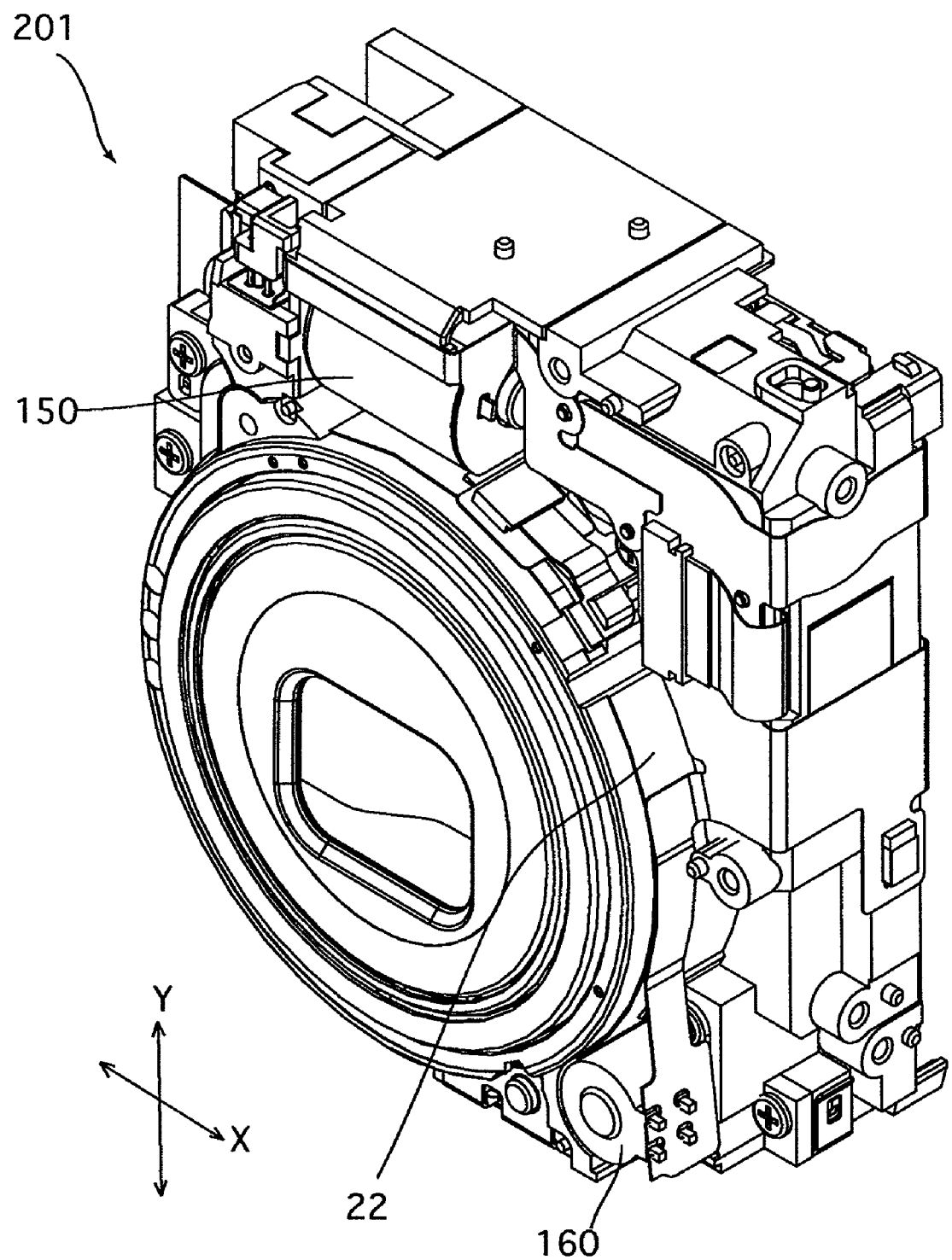
FIG. 4 is a perspective view of the zoom lens of the digital camera shown in FIG. 1 in the fully-retracted state of the zoom lens.

As shown in FIG. 4, the digital camera 200 is provided on the stationary barrel 22 with a zoom motor 150 which is supported by the stationary barrel 22. The driving force of the zoom motor 150 is transferred to a zoom gear 28 (see FIG. 5) via a reduction gear train (not shown). The zoom gear 28 is rotatably fitted on a zoom gear shaft 29 extending parallel to the photographing optical axis Z1. Front and rear ends of the zoom gear shaft 29 are fixed to the stationary barrel 22 and the stationary holder 23, respectively.

The helicoid ring 18 is positioned inside the stationary barrel 22 and supported thereby. The helicoid ring 18 is rotated by rotation of the zoom gear 28. The helicoid ring 18 is moved forward and rearward in the optical axis direction while being rotated about the lens barrel axis Z0 via a helicoid structure (provided between the helicoid ring 18 and the stationary barrel 22) within a predetermined range in the optical axis direction between the position in the fully-retracted state of the zoom lens 201 shown in FIG. 3 to the position in the state of the zoom lens 201 immediately before the zoom lens 201 is in the ready-to-photograph state thereof at the wide-angle extremity shown by the upper half of the zoom lens 201 in FIG. 2. In a ready-to-photograph state of the zoom lens 201 shown in FIG. 2 (between the wide-angle extremity and the telephoto extremity), the helicoid ring 18 is rotated at a fixed position without moving in the optical axis direction. The first movable barrel 15 is coupled to the helicoid ring 18 to be rotatable together with the helicoid ring 18 about the lens barrel axis Z0 and to be movable together with the helicoid ring 18 in the optical axis direction.

The first linear guide ring 14 is positioned inside the first movable barrel 15 and the helicoid ring 18 and supported thereby. The first linear guide ring 14 is guided linearly in the optical axis direction via linear guide grooves formed on the stationary barrel 22, and is engaged with the first movable barrel 15 and the helicoid ring 18 to be rotatable about the lens barrel axis Z0 relative to the first movable barrel 15 and the helicoid ring 18, and to be movable in the optical axis direction together with the first movable barrel 15 and the helicoid ring 18.

As shown in FIG. 5, the first linear guide ring 14 is provided with a set of three through-slots 14a (only two of which appear in FIG. 5) which radially penetrate the first linear guide ring 14. Each through-slot 14a includes a circumferential slot portion and an inclined lead slot portion which extends obliquely rearward from one end of the circumferential slot portion. The inclined lead slot portion is inclined with respect to the optical axis direction, while the circumferential slot portion extends circumferentially about the lens barrel axis Z0. A set of three followers 11a (only two of which appear in FIG. 6) which project radially outward from an outer peripheral surface of the cam ring 11 are engaged in the set of three through-slots 14a, respectively. The set of three followers 11a are further engaged in a set of three rotation transfer grooves 15a which are formed on an inner peripheral surface of the first movable barrel 15 and extend parallel to the photographing optical axis Z1 so that the cam ring 11 rotates with the first movable barrel 15. When the set of three followers 11a are engaged in the lead slot portions of the set of three through-slots 14a, respectively, the cam ring 11 is moved forward and rearward in the optical axis direction while being rotated about the lens barrel axis Z0 and guided by the set of three through-slots 14a. On the other hand, when the set of three followers 11a are engaged in the circumferential slot portions of the set of three through-slots 14a, respectively, the cam ring 11 is rotated at a fixed position without moving in the optical axis direction. Similar to the helicoid ring 18, the cam ring 11 is moved forward and rearward in the optical axis direction while being rotated about the lens barrel axis Z0 within a predetermined range in the optical axis direction between the position in the fully-retracted state of the zoom lens 201 shown in FIG. 3 to the position in the state of the zoom lens 201 immediately before the zoom lens 201 enters the ready-to-photograph state thereof at the wide-angle extremity (shown by the upper half of the zoom lens 201 in FIG. 2), and the cam ring 11 is rotated at a fixed position without moving in the optical axis direction in a ready-to-photograph state of the zoom lens 201 shown in FIG. 2 (between the wide-angle extremity and the telephoto extremity).

The first linear guide ring 14 guides the second linear guide ring 10 and the second movable ring 13 linearly in the optical axis direction by linear guide grooves which are formed on an inner peripheral surface of the first linear guide ring 14 to extend parallel to the photographing optical axis Z1. The second linear guide ring 10 guides a second lens group moving frame 8, which indirectly supports the second lens group LG2, linearly in the optical axis direction, while the second movable barrel 13 guides the third movable barrel 12, which indirectly supports the first lens group LG1, linearly in the optical axis direction. Each of the second linear guide ring 10 and the second movable barrel 13 is supported by the cam ring 11 to be rotatable relative to the cam ring 11 about the lens barrel axis Z0 and to be movable together with the cam ring 11 in the optical axis direction.

The cam ring 11 is provided on an inner peripheral surface thereof with a plurality of inner cam grooves 11b for moving the second lens group LG2, and the second lens group moving frame 8 is provided on an outer peripheral surface thereof with a plurality of cam followers 8a which are engaged in the plurality of inner cam grooves 11b, respectively. Since the second lens group moving frame 8 is guided linearly in the optical axis direction without rotating via the second linear guide ring 10, a rotation of the cam ring 11 causes the second lens group moving frame 8 to move in the optical axis direction in a predetermined moving manner in accordance with contours of the plurality of inner cam grooves 11b.

As shown in FIG. 6, the zoom lens 201 is provided inside the second lens group moving frame 8 with a second lens frame 6 which supports and holds the second lens group LG2. The second lens frame 6 is supported by the second lens group moving frame 8 to be rotatable (swingable) about a pivot shaft 33. The pivot shaft 33 extends parallel to the photographing optical axis Z1. The second lens frame 6 is swingable about the pivot shaft 33 between a photographing position (shown in FIG. 2) where the second lens group LG2 is positioned on the photographing optical axis Z1, and a radially retracted position (shown in FIG. 3) where the optical axis of the second lens group LG2 is retracted away from the photographing optical axis Z1 to be positioned above the photographing optical axis Z1. The second lens frame 6 is biased to rotate in a direction toward the aforementioned photographing position of the second lens frame 6 by a torsion spring 39. The stationary holder 23 is provided with a position-control cam bar 23a (see FIG. 5) which projects forward from the stationary holder 23 to be engageable with the second lens frame 6 so that the position-control cam bar 23a comes into pressing contact with the second lens frame 6 to rotate the second lens frame 6 to the radially retracted position thereof against the biasing force of the torsion spring 39 when the second lens group moving frame 8 moves rearward in a retracting direction to approach the stationary holder 23.

The second movable barrel 13, which is guided linearly in the optical axis direction without rotating by the second linear guide ring 10, guides the third movable barrel 12 linearly in the optical axis direction. The third movable barrel 12 is provided on an inner peripheral surface thereof with a set of three cam followers 31 (see FIG. 6) which project radially inwards, and the cam ring 11 is provided on an outer peripheral surface thereof with a set of three outer cam grooves 11c (cam grooves for moving the first lens group LG1; only two of them appear in FIG. 6) in which the set of three cam followers 31 are slidably engaged, respectively. The zoom lens 201 is provided inside the third movable barrel 12 with a first lens frame 1 which is supported by the third movable barrel 12 via a first lens group adjustment ring 2.

The zoom lens 201 is provided between the first and second lens groups LG1 and LG2 with a shutter unit 100 including the shutter S and the adjustable diaphragm A. The shutter unit 100 is positioned inside the second lens group moving frame 8 and fixed thereto.

Operations of the zoom lens 201 that has the above described structure will be discussed hereinafter. In the state shown in FIG. 3, in which the zoom lens 201 is in the fully-retracted state, the zoom lens 201 is fully accommodated in the camera body 202. Upon a main switch 101 (see FIG. 25) provided on an outer surface of the camera body 202 being turned ON in the fully-retracted state of the zoom lens 201 shown in FIG. 3, the zoom motor 150 is driven to rotate in a lens barrel advancing direction by control of a control circuit 102 (see FIG. 25) provided in the camera body 202. This rotation of the zoom motor 150 rotates the zoom gear 28. The rotation of the zoom gear 28 causes a combination of the first movable barrel 15 and the helicoid ring 18 to move forward while rotating about the lens barrel axis Z0 due to the aforementioned helicoid structure, and further causes the first linear guide ring 14 to move forward linearly together with the first movable barrel 15 and the helicoid ring 18. At this time, the cam ring 11 which rotates by rotation of the first movable barrel 15 moves forward in the optical axis direction by an amount of movement corresponding to the sum of the amount of the forward movement of the first linear guide ring 14 and the amount of the forward movement of the cam ring 11 by a leading structure between the first linear guide ring 14 and the cam ring 11, i.e., by the engagement of the inclined lead slot portions of the set of three through-slots 14a and the set of three followers 11a of the cam ring 11, respectively. Once the helicoid ring 18 and the cam ring 11 advance to respective predetermined points thereof, the functions of a rotating/advancing mechanism (the aforementioned helicoid structure) between the helicoid ring 18 and the stationary barrel 22 and another rotating/advancing mechanism (the aforementioned leading structure) between the cam ring 11 and the first linear guide ring 14 are canceled, so that each of the helicoid ring 18 and the cam ring 11 rotates about the lens barrel axis Z0 without moving in the optical axis direction.

A rotation of the cam ring 11 causes the second lens group moving frame 8, which is positioned inside the cam ring 11 and guided linearly in the optical axis direction via the second linear guide ring 10, to move in the optical axis direction with respect to the cam ring 11 in a predetermined moving manner due to the engagement of the set of three cam followers 8a with the set of three inner cam grooves 11b, respectively. In the state shown in FIG. 3, in which the zoom lens 201 is in the fully-retracted state, the second lens frame 6, which is positioned inside the second lens group moving frame 8, is held in the radially retracted position off the photographing optical axis Z1 by the action of the position-control cam bar 23a, which projects forward from the stationary holder 23. During the course of movement of the second lens group moving frame 8 from the retracted position to a position in the zooming range, the second lens frame 6 is disengaged from the position-control cam bar 23a to rotate about the pivot shaft 33 from the radially retracted position to the photographing position shown in FIG. 2, where the optical axis of the second lens group LG2 coincides with the photographing optical axis Z1, by the spring force of the torsion spring 39. Thereafter, the second lens frame 6 remains held in the photographing position until the zoom lens 201 is retracted into the camera body 201.

In addition, a rotation of the cam ring 11 causes the third movable barrel 12, which is positioned around the cam ring 11 and guided linearly in the optical axis direction via the second movable barrel 13, to move in the optical axis direction relative to the cam ring 11 in a predetermined moving manner due to the engagement of the set of three cam followers 31 with the set of three outer cam grooves 11c of the cam ring 11, respectively.

Accordingly, an axial position of the first lens group LG1 relative to an imaging plane (imaging surface/light receiving surface of the CCD image sensor 60) when the first lens group LG1 is moved forward from the fully-retracted position is determined by the sum of the amount of forward movement of the cam ring 11 relative to the stationary barrel 22 and the amount of movement of the third external barrel 12 relative to the cam ring 11, while an axial position of the second lens group LG2 relative to the imaging plane when the second lens group LG2 is moved forward from the fully-retracted position is determined by the sum of the amount of forward movement of the cam ring 11 relative to the stationary barrel 22 and the amount of movement of the second lens group moving frame 8 relative to the cam ring 11. A zooming operation is carried out by moving the first and second lens groups LG1 and LG2 on the photographing optical axis Z1 while changing the air-distance therebetween. When the zoom lens 201 is driven to advance from the fully-retracted position shown in FIG. 3, the zoom lens 201 firstly moves to a position shown above the photographing lens axis Z1 in FIG. 2 in which the zoom lens 201 is at the wide-angle extremity. Subsequently, the zoom lens 201 moves a position state shown below the photographing lens axis Z1 in FIG. 2 in which the zoom lens 201 is at the telephoto extremity by a further rotation of the zoom motor 150 in a lens barrel advancing direction thereof. As can be seen from FIG. 2, the air-distance between the first and second lens groups LG1 and LG2 when the zoom lens 201 is at the wide-angle extremity is greater than when the zoom lens 201 is at the telephoto extremity. When the zoom lens 201 is at the telephoto extremity as shown below the photographing lens axis Z1 in FIG. 2, the first and second lens groups LG1 and LG2 have moved to approach each other to have an air-distance therebetween which is smaller than the air-distance in the zoom lens 201 at the wide-angle extremity. This variation of the air-distance between the first and second lens groups LG1 and LG2 for the zooming operation is achieved by contours of the plurality of inner cam grooves 11b (for moving the second lens group LG2) and the set of three outer cam grooves 11c (for moving the first lens group LG1) of the cam ring 11. In the zooming range between the wide-angle extremity and the telephoto extremity, the cam ring 11, the first movable barrel 15 and the helicoid ring 18 rotate at their respective axial fixed positions, i.e., without moving in the optical axis direction.

In a ready-to-photograph state of the zoom lens 201 between the wide-angle extremity and the telephoto extremity, a focusing operation is carried out by moving the third lens group LG3 (the third lens frame 51) along the photographing optical axis Z1 by driving the AF motor 160 in accordance with object distance information obtained by a distance measuring device of the digital camera 200.

Upon the main switch 101 being turned OFF, the zoom motor 150 is driven to rotate in a lens barrel retracting direction so that the zoom lens 201 operates in the reverse manner to the above described advancing operation to fully retract the zoom lens 201 into the camera body 202 as shown in FIG. 3. During the course of this retracting movement of the zoom lens 201, the second lens frame 6 rotates about the pivot shaft 33 to the radially retracted position by the position-control cam bar 23a while moving rearward together with the second lens group moving frame 8. When the zoom lens 201 is fully retracted into the camera body 202, the second lens group LG2 is retracted into the space radially outside the space in which the third lens group LG3, the low-pass filter LG4 and the CCD image sensor 60 are retracted as shown in FIG. 3, i.e., the second lens group LG2 is radially retracted into an axial range substantially identical to an axial range in the optical axis direction in which the third lens group LG3, the low-pass filter LG4 and the CCD image sensor 60 are positioned. This structure of the digital camera 200 for retracting the second lens group LG2 in this manner reduces the length of the zoom lens 201 when the zoom lens 201 is fully retracted, thus making it possible to reduce the thickness of the camera body 202 in the optical axis direction, i.e., in the horizontal direction as viewed in FIG. 3.

Figure 7:
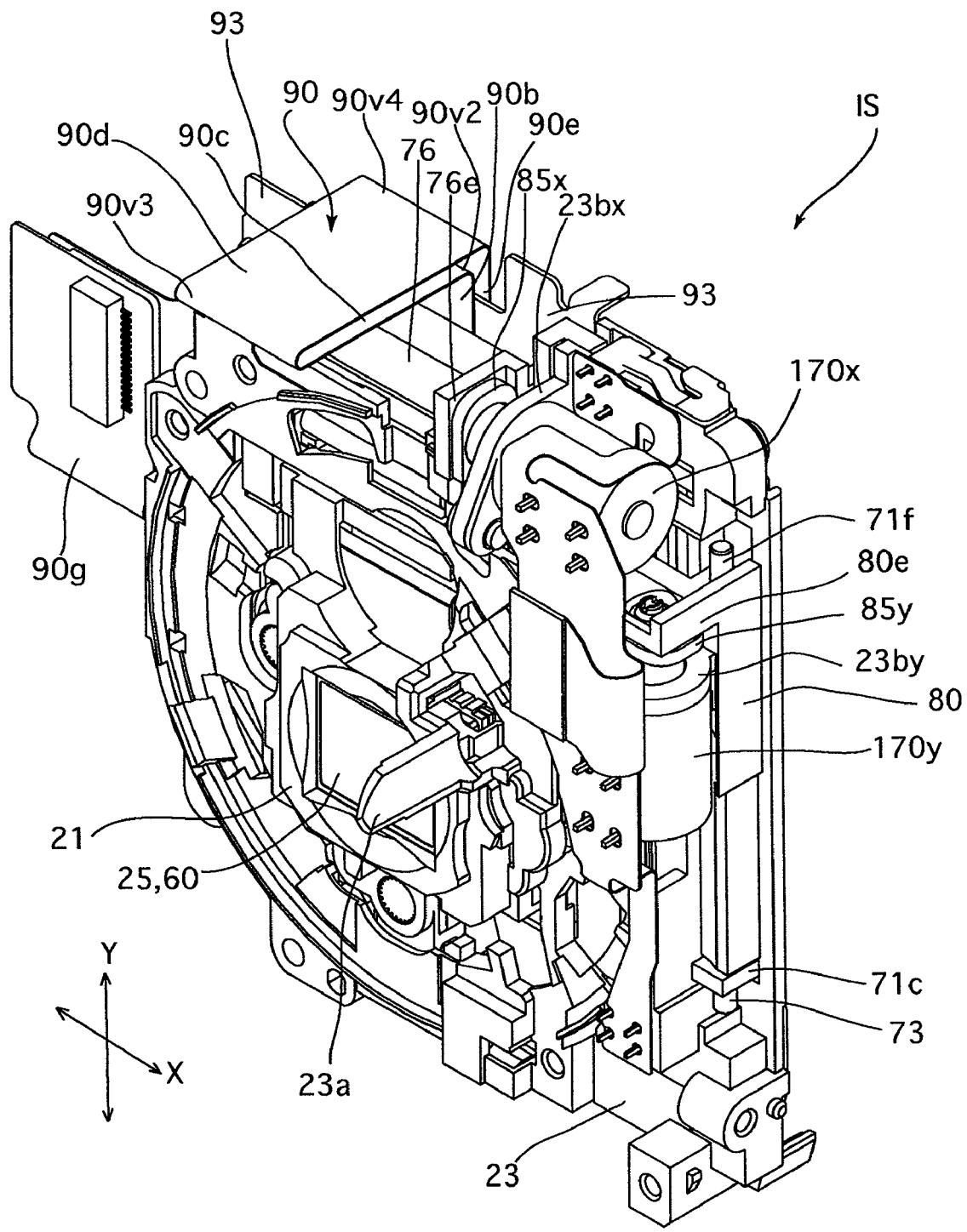
FIG. 7 is a front perspective view of an image stabilizing unit (image stabilizing mechanism) shown in FIG. 5.
Figure 8:
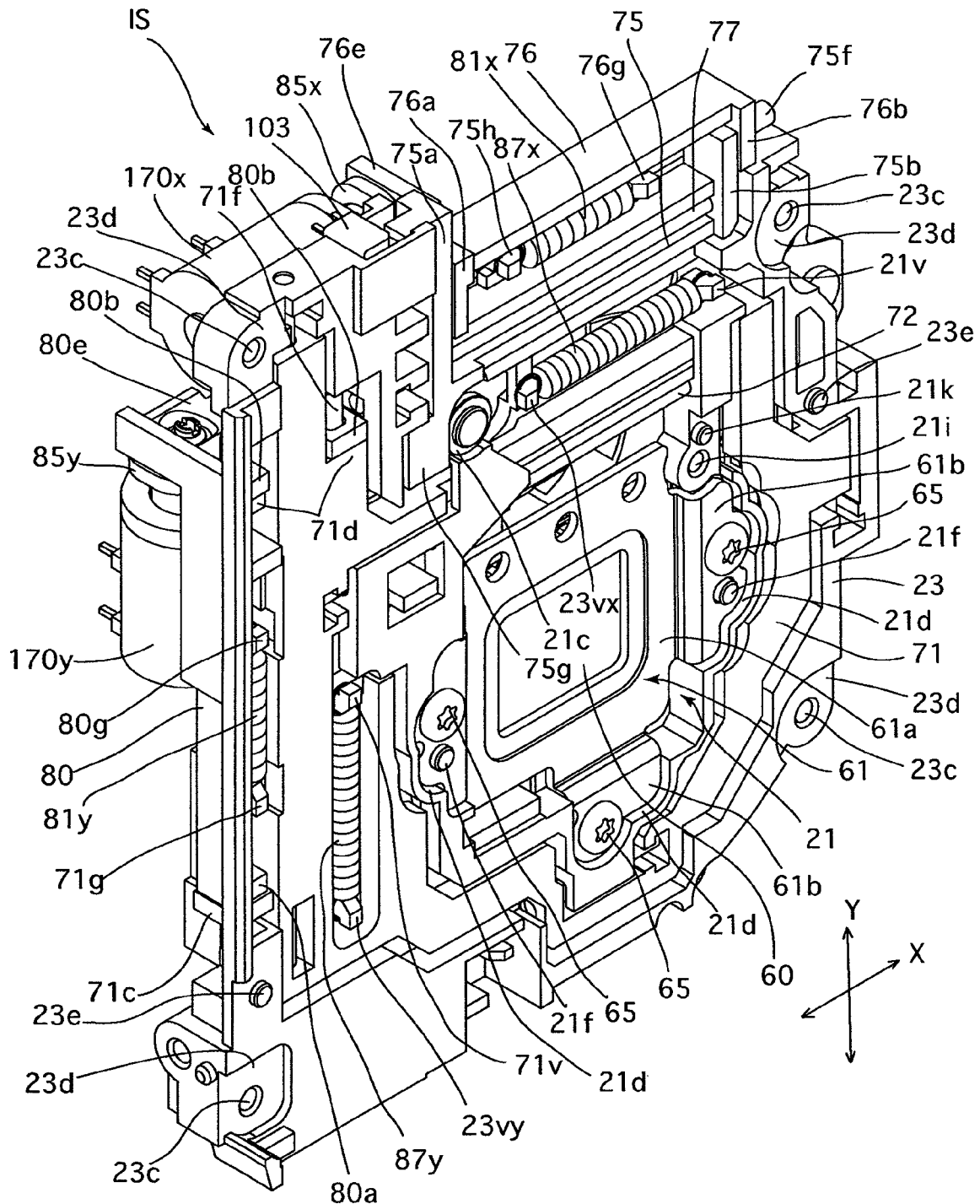
FIG. 8 is a rear perspective view of the image stabilizing unit shown in FIG. 5 from which a movable plate and a stationary cover are removed.
Figure 9:
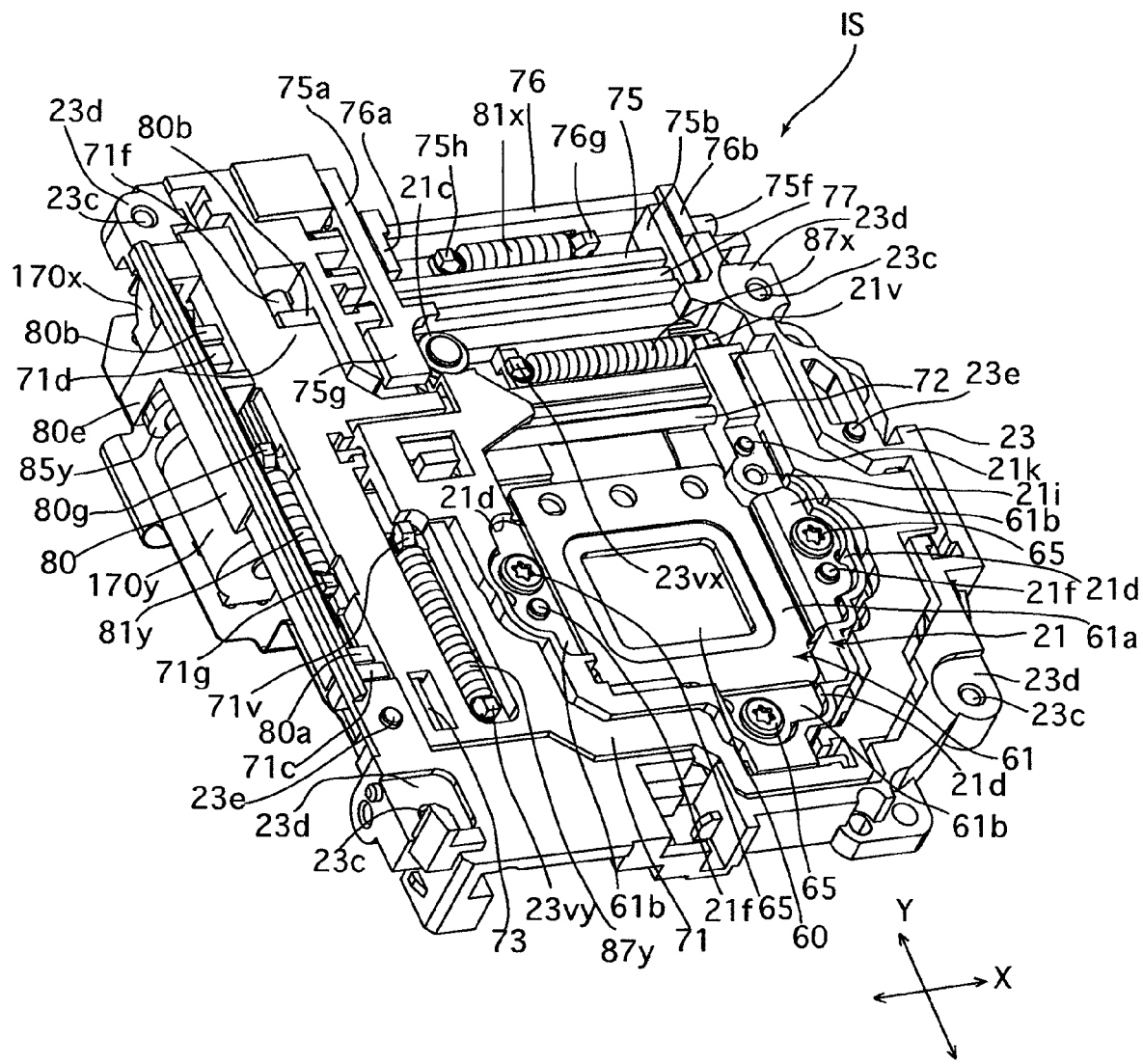
FIG. 9 is a rear perspective view of the image stabilizing unit shown in FIG. 5, viewed from an angle different from the angle of FIG. 8.
Figure 10:
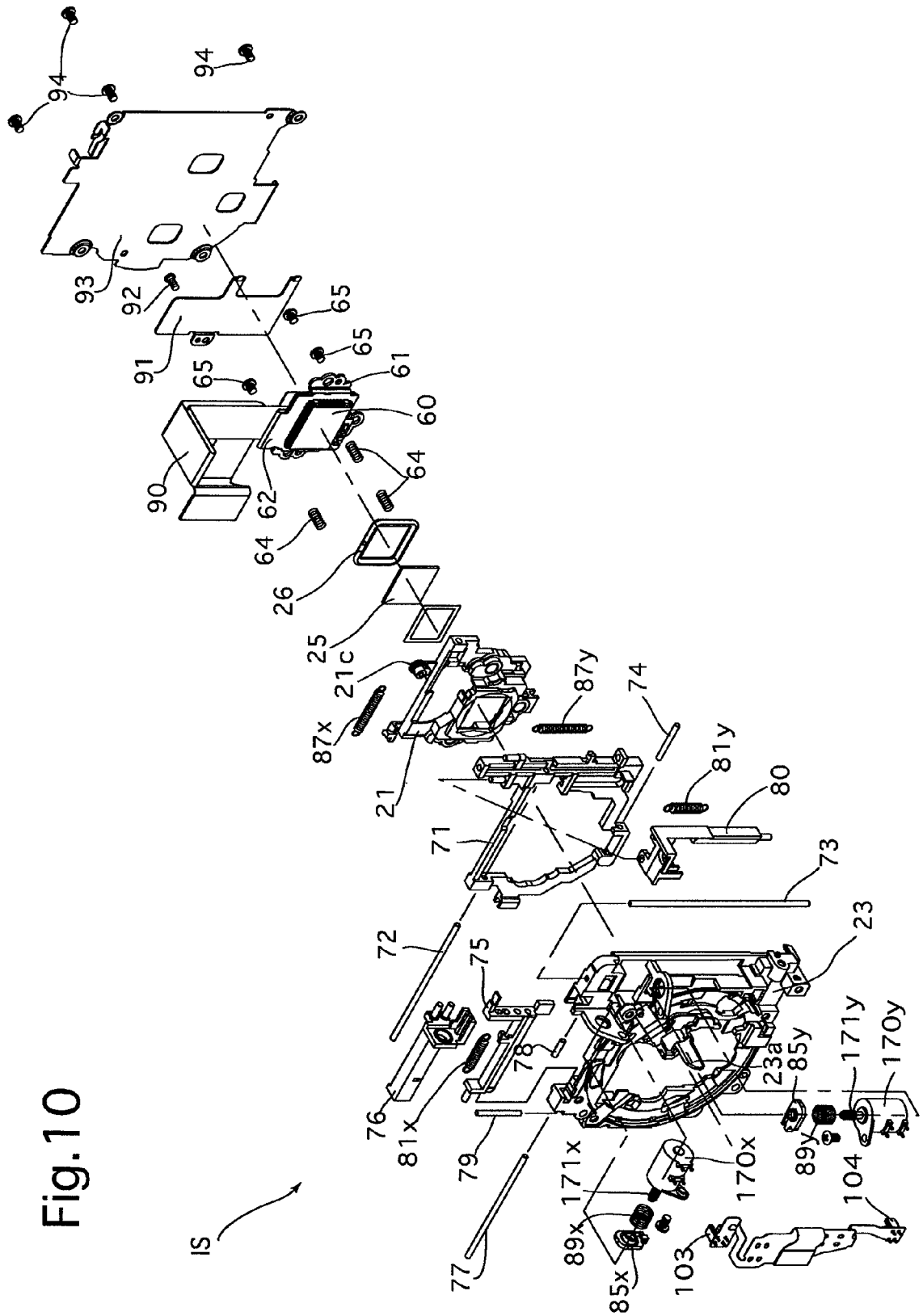
FIG. 10 is an exploded perspective view of the image stabilizing unit.
Figure 25:
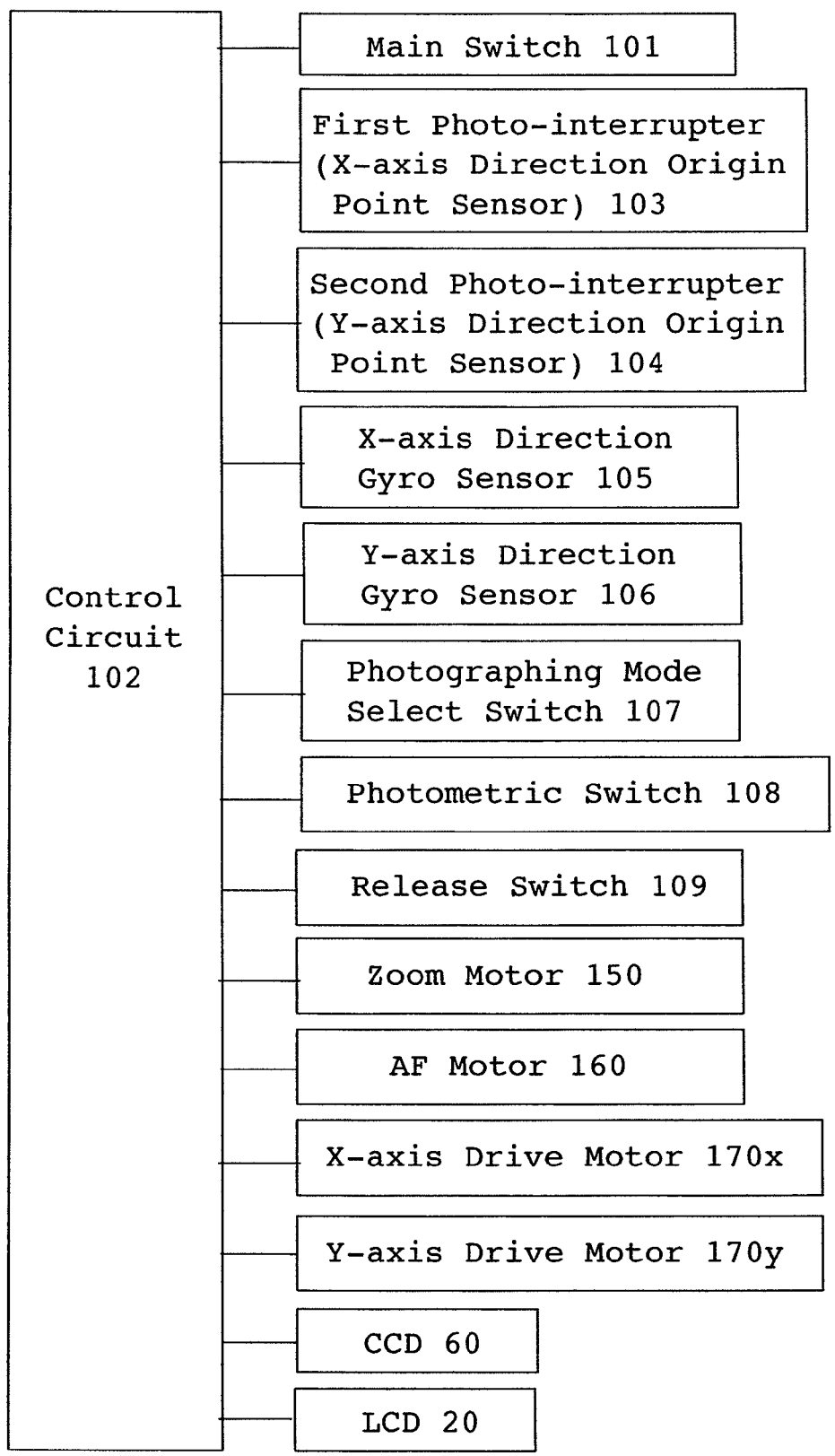
FIG. 25 is a block diagram illustrating a configuration of electrical circuits of the digital camera shown in FIGS. 1 through 3.

The digital camera 200 is provided with an image stabilizer (optical image stabilizer). This image stabilizer moves the CCD image sensor 60 in a plane orthogonal to the photographing optical axis Z1 to counteract image shake of an object image captured by the CCD image sensor 60 in accordance with the direction and the magnitude of vibration (hand shake) applied to the digital camera 200. This control is performed by the control circuit 102 (FIG. 25). FIGS. 7 through 9 show an image stabilizing unit IS including the CCD image sensor 60. FIG. 10 is an exploded perspective view of the entire image stabilizing unit IS and FIGS. 11 through 23 are perspective views or exploded perspective views of various portions of the image stabilizing unit IS.

The stationary holder 23 is provided with a Y-axis direction guide rod (an element of a Y-axis direction guide device) 73 which extends in the Y-axis direction (the vertical direction of the digital camera 200). The Y-axis direction moving stage 71 is provided with a guide hole (an element of the Y-axis direction guide device) 71a (see FIG. 16) in which the Y-axis direction guide rod 73 is engaged so that the Y-axis direction moving stage 71 is supported by the Y-axis direction guide rod 73 to be freely slidable thereon. The stationary holder 23 is provided with a rotation prevention rod 79 substantially parallel to the Y-axis direction guide rod 73. The Y-axis direction moving stage 71 is provided, on the laterally opposite sides thereof from the guide hole 71a, with a guide groove 71b (see FIG. 16) in which the rotation prevention rod 79 is engaged. When moved on the Y-axis direction guide rod 73 therealong, the Y-axis direction moving stage 71 is prevented from tilting relative to the photographing optical axis Z1 by the engagement of the rotation prevention rod 79 with the guide groove 71b. The Y-axis direction moving stage 71 is provided thereon with an X-axis direction guide rod 72 (an element of an X-axis direction guide device) which extends in the X-axis direction (the horizontal direction of the digital camera 200) that is perpendicular to the Y-axis direction guide rod 73. The X-axis direction stage 21 is provided with a guide hole (an element of the X-axis direction guide device) 21a (see FIGS. 12 and 13) in which the X-axis direction guide rod 72 is engaged so that the X-axis direction moving stage 21 is freely slidable thereon in the X-axis direction. The Y-axis direction moving stage 71 is provided with a rotation prevention rod 74 substantially parallel to the X-axis direction guide rod 72. The X-axis direction moving stage 21 is provided at the bottom thereof with a guide groove 21b in which the rotation prevention rod 74 is engaged. When moved on the X-axis direction guide rod 72 therealong, the X-axis direction moving stage 21 is prevented from tilting relative to the photographing optical axis Z1 by the engagement of the rotation prevention rod 74 with the guide groove 21b. Accordingly, the CCD image sensor 60 is supported by the stationary holder 23 via the Y-axis direction moving stage 71 and the X-axis direction moving stage 21 to be movable in two axial directions orthogonal to each other in a plane orthogonal to the photographing optical axis Z1. The range of movement of the X-axis direction stage 21 is defined by inner peripheral surfaces of the Y-axis direction moving stage 71, while the range of movement of the Y-axis direction moving stage 71 is defined by inner peripheral surfaces of the stationary holder 23.

The image stabilizing unit IS is provided with an X-axis direction stage biasing spring (biasing device) 87x which is extended and installed between a spring hook 21v formed on the X-axis direction moving stage 21 and a spring hook 23vx formed on the stationary holder 23. The X-axis direction stage biasing spring 87x is an extension coil spring and biases the X-axis direction moving stage 21 rightward as viewed from the front of the zoom lens 201 (leftward as viewed from the rear of the zoom lens 201). The image stabilizing unit IS is provided with a Y-axis direction stage biasing spring (biasing device) 87y which is extended and installed between a spring hook 71v formed on the Y-axis direction moving stage 71 and a spring hook 23vy formed on the stationary holder 23. The Y-axis direction stage biasing spring 87y is an extension coil spring and biases the Y-axis direction moving stage 71 downward.

Figure 16:
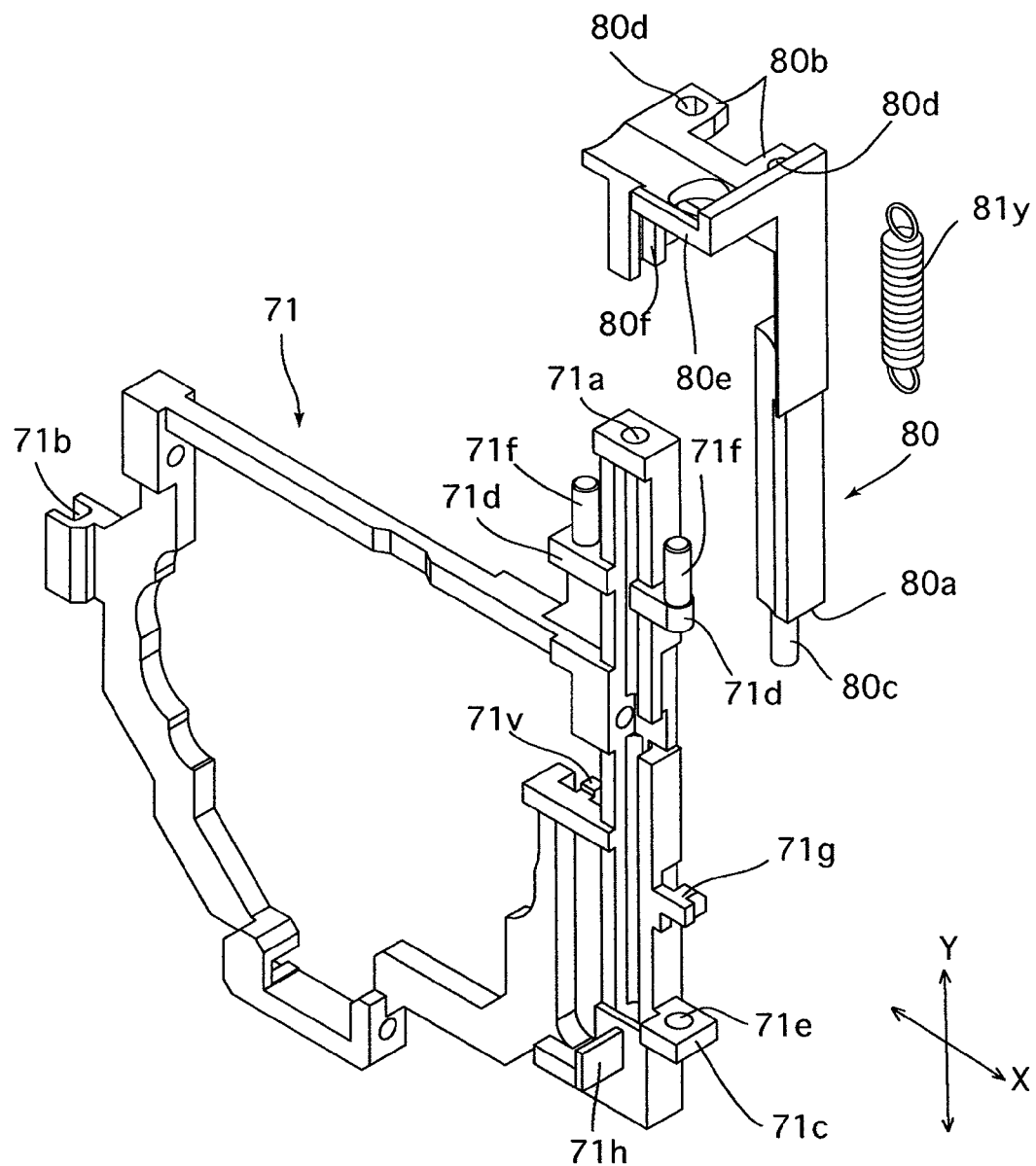
FIG. 16 is an exploded perspective view of a Y-axis direction moving member, a Y-axis direction moving stage and an associated extension joining spring of the image stabilizing unit.
Figure 17:
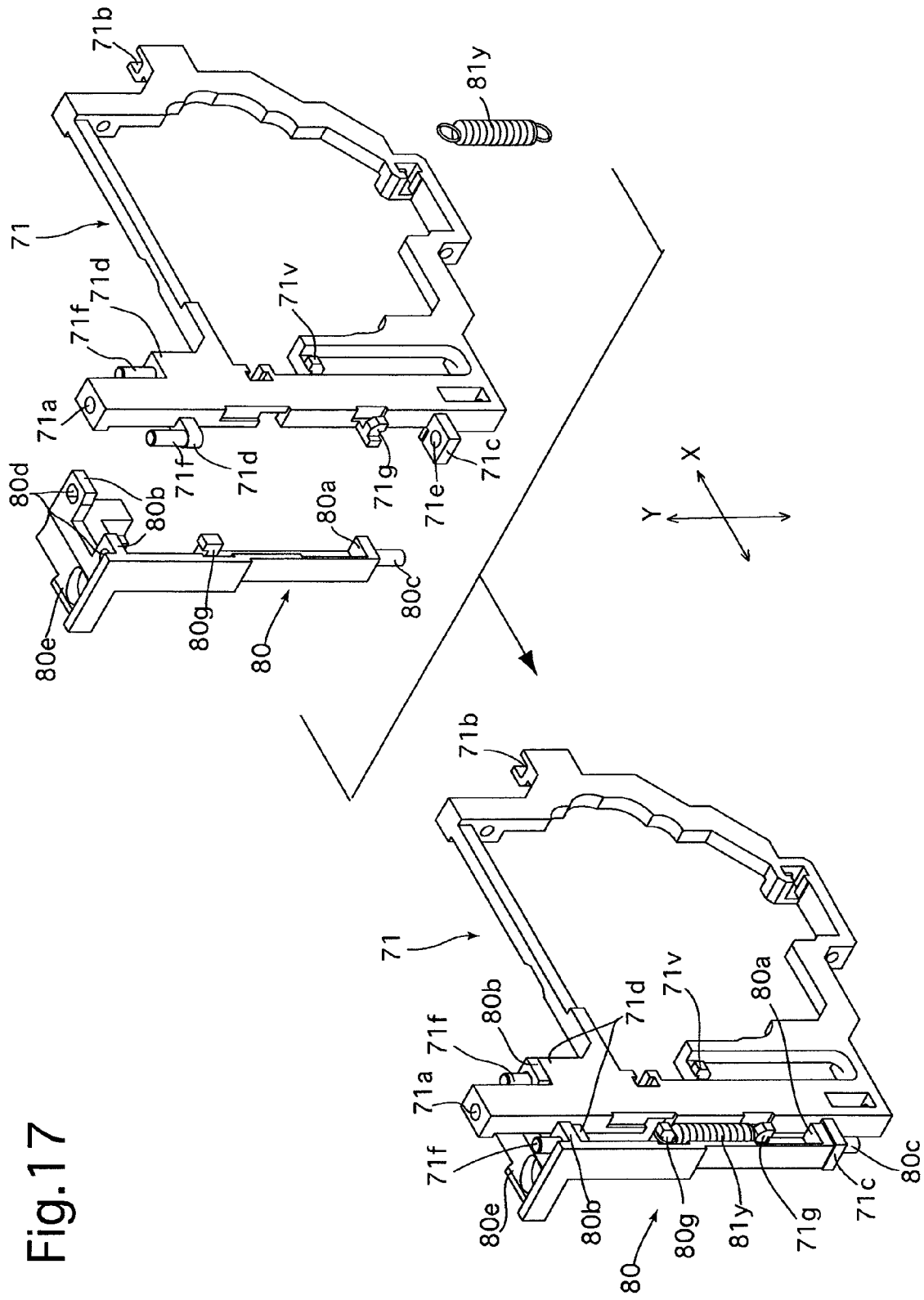
FIG. 17 is a rear perspective view of the Y-axis direction moving member, the Y-axis direction moving stage and the associated extension joining spring that are shown in FIG. 16, showing an exploded state and an assembled state thereof.

As shown in FIGS. 16 and 17, the image stabilizing unit IS is provided on one side of the Y-axis direction moving stage 71 with a Y-axis direction moving member 80 which is supported by the Y-axis direction moving stage 71. The Y-axis direction moving member 80 is elongated in the Y-axis direction and provided in the vicinity of upper and lower ends of the Y-axis direction moving member 80 with a movement limit lug 80a and a movement limit lug 80b, respectively. The Y-axis direction moving member 80 is provided at a lower end thereof with a guide pin 80c which extends downward from the movement limit lug 80a. The movement limit lug 80b is provided with a pair of guide holes 80d. The Y-axis direction moving member 80 is further provided in the vicinity of the pair of guide holes 80d with a nut contacting portion 80e and a linear groove 80f (see FIG. 16), and is further provided, on a vertically straight portion of the Y-axis direction moving member 80 between the movement limit lug 80a and the movement limit lug 80b, with a spring hook 80g (see FIG. 17). The linear groove 80f is elongated in the Y-axis direction.

The Y-axis direction moving stage 71 is provided with a movement limit lug 71c and a movement limit lug 71d which face the movement limit lug 80a and the movement limit lug 80b of the Y-axis direction moving member 80, respectively. The movement limit lug 71c is provided with a guide hole 71e in which the guide pin 80c is slidably engaged, while the movement limit lug 71d is provided with a pair of guide pins 71f which extend upward to be slidably engaged in the pair of guide holes 80d, respectively. The Y-axis direction moving stage 71 is provided on a vertically straight portion thereof between the movement limit lug 71c and a movement limit lug 71d, with a spring hook 71g.

The Y-axis direction moving stage 71 and the Y-axis direction moving member 80 are guided to be movable relative to each other in the Y-axis direction by the engagement of the guide hole 71e with the guide pin 80c and the engagement of the pair of guide pins 71f with the pair of guide holes 80d. The image stabilizing unit IS is provided with an extension joining spring 81y which is extended and installed between the spring hook 71g of the Y-axis direction moving stage 71 and the spring hook 80g of the Y-axis direction moving member 80. The extension joining spring 81y biases the Y-axis direction moving stage 71 and the Y-axis direction moving member 80 in opposite directions to bring the movement limit lug 80a and the movement limit lug 71c into contact with each other and to bring the movement limit lug 80b and the movement limit lug 71d into contact with each other, i.e., in opposite directions to move the Y-axis direction moving stage 71 and the Y-axis direction moving member 80 upward and downward, respectively.

Figure 14:
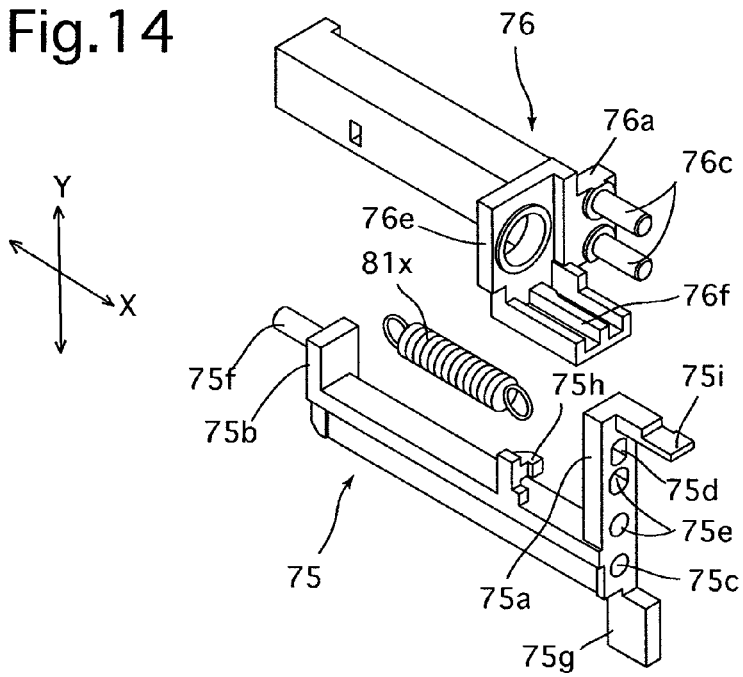
FIG. 14 is a front perspective view of a first X-axis direction moving member, a second X-axis direction moving member and an associated extension joining spring of the image stabilizing unit, showing an exploded state thereof.
Figure 15:
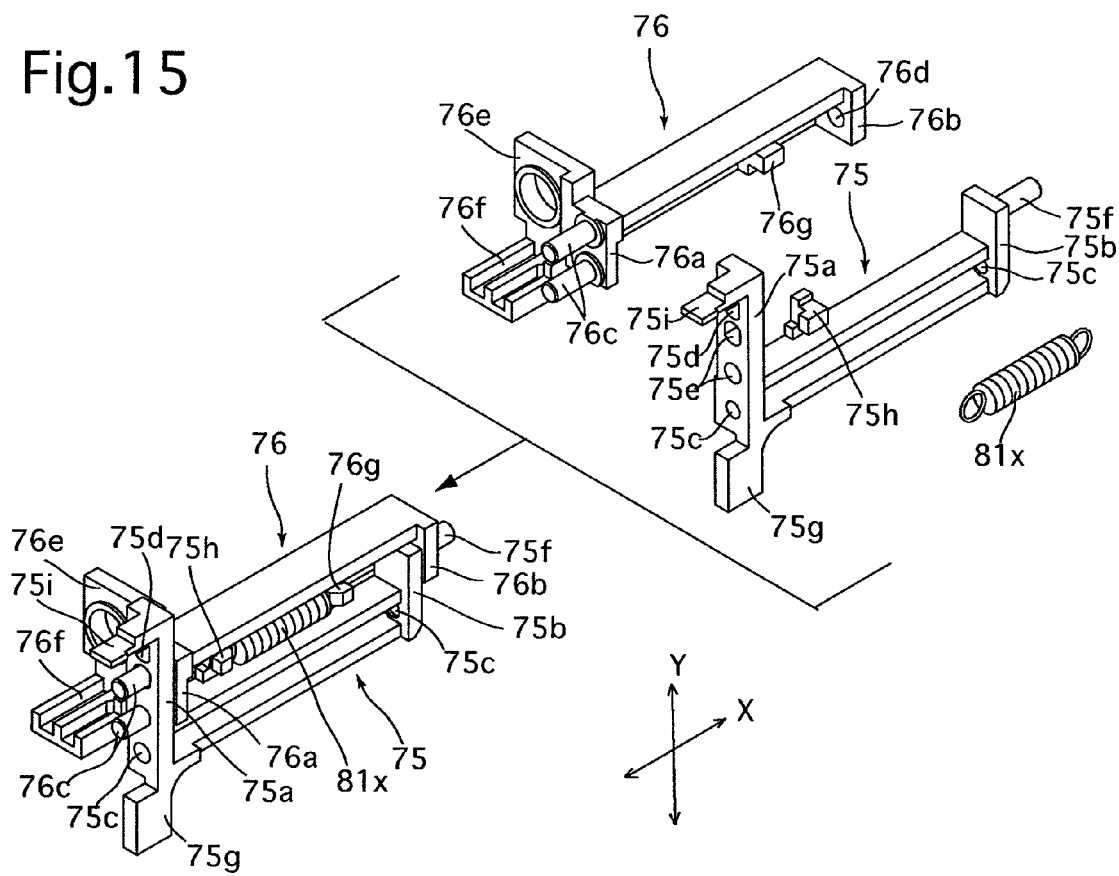
FIG. 15 is a rear perspective view of the first X-axis direction moving member, the second X-axis direction moving member and the associated extension joining spring that are shown in FIG. 14, showing an exploded state and an assembled state thereof.

An X-axis direction guide rod 77 and a rotation prevention rod 78, which are different from the X-axis direction guide rod 72 and the rotation prevention rod 74, respectively, are fixed to the stationary holder 23 to extend in the X-axis direction. As shown in FIGS. 14 and 15, the image stabilizing unit IS is provided with a first X-axis direction moving member 75 which is elongated in the X-axis direction. The first X-axis direction moving member 75 is provided, in the vicinity of opposite ends of the first X-axis direction moving member 75 in the X-axis direction, with a movement limit lug 75a and a movement limit lug 75b, respectively. A pair of guide holes 75c (see FIG. 15) in which the X-axis direction guide rod 77 is inserted are formed on the movement limit lugs 75a and 75b, respectively, to be aligned in the X-axis direction. A guide hole 75d in which the rotation prevention rod 78 is inserted is formed on the movement limit lug 75a. No guide hole corresponding to the guide hole 75d is formed on the movement limit lug 75b. The first X-axis direction moving member 75 is supported by the X-axis direction guide rod 77 to be freely slidable thereon in the X-axis direction, and is prevented from rotating about the X-axis direction guide rod 77 (from tilting relative to the photographing optical axis Z1) by the engagement of the rotation prevention rod 78 with the guide hole 75d. The movement limit lug 75a is provided between the associated guide hole 75c and the guide hole 75d with a pair of guide holes 75e. The movement limit lug 75b is provided, above the associated guide hole 75c in the Y-axis direction (see FIG. 15), with a guide pin 75f which extends in the X-axis direction in a direction away from the movement limit lug 75a. The first X-axis direction moving member 75 is further provided at the bottom of the movement limit lug 75a with a linkage projection 75g, and is further provided, on a horizontally straight portion of the first X-axis direction moving member 75 between the movement limit lug 75a and a movement limit lug 75b, with a spring hook 75h.

The image stabilizing unit IS is provided on the first X-axis direction moving member 75 with a second X-axis direction moving member 76. The second X-axis direction moving member 76 is provided with a movement limit lug 76a and a movement limit lug 76b which are separate from each other in the X-axis direction. The movement limit lug 76a is provided with a pair of guide pins 76c which extend in the X-axis direction to be slidably engaged in the pair of guide holes 75e of the first X-axis direction moving member 75, respectively, and the movement limit lug 76b is provided with a guide hole 76d in which the guide pin 75f of the first X-axis direction moving member 75 is slidably engaged. The second X-axis direction moving member 76 is further provided in the vicinity of the movement limit lug 76a with a nut contacting portion 76e and a linear groove 76f (see FIG. 15), and is further provided, on a horizontally straight portion of the second X-axis direction moving member 76 between the movement limit lug 76a and the movement limit lug 76b, with a spring hook 76g. The linear groove 76f is elongated in the X-axis direction.

The first X-axis direction moving member 75 and the second X-axis direction moving member 76 are guided to be movable relative to each other in the X-axis direction by the engagement of the pair of guide holes 75e with the pair of guide pins 76c and the engagement of the guide pin 75f with the guide hole 76d. The image stabilizing unit IS is provided with an extension joining spring 81x which is extended and installed between the spring hook 75h of the first X-axis direction moving member 75 and the spring hook 76g of the second X-axis direction moving member 76. The extension joining spring 81x biases the first X-axis direction moving member 75 and the second X-axis direction moving member 76 in opposite directions to bring the movement limit lug 75a and the movement limit lug 76a into contact with each other and to bring the movement limit lug 75b and the movement limit lug 76b into contact with each other.

The linkage projection 75g of the first X-axis direction moving member 75 is in contact with a transfer roller (receiving portion) 21c (see FIGS. 12 and 13) mounted to the X-axis direction stage 21 so that a moving force in the X-axis direction is transferred from the first X-axis direction moving member 75 to the X-axis direction stage 21 via the contacting engagement between the linkage projection 75g and the transfer roller 21c. The transfer roller 21c is supported by a rotation pin parallel to the photographing optical axis Z1 so as to be freely rotatable on the rotation pin. When the X-axis direction stage 21 moves with the Y-axis direction moving stage 71 in the Y-axis direction, the transfer roller 21c rolls on a contacting surface of the linkage projection 75g. Since this contacting surface of the linkage projection 75g is a flat surface elongated in the Y-axis direction, the X-axis direction stage 21 can be moved in the Y-axis direction with no driving force in the Y-axis direction being exerted on the first X-axis direction moving member 75 by allowing the transfer roller 21c to roll on the contacting surface of the linkage projection 75g.

Figure 11:
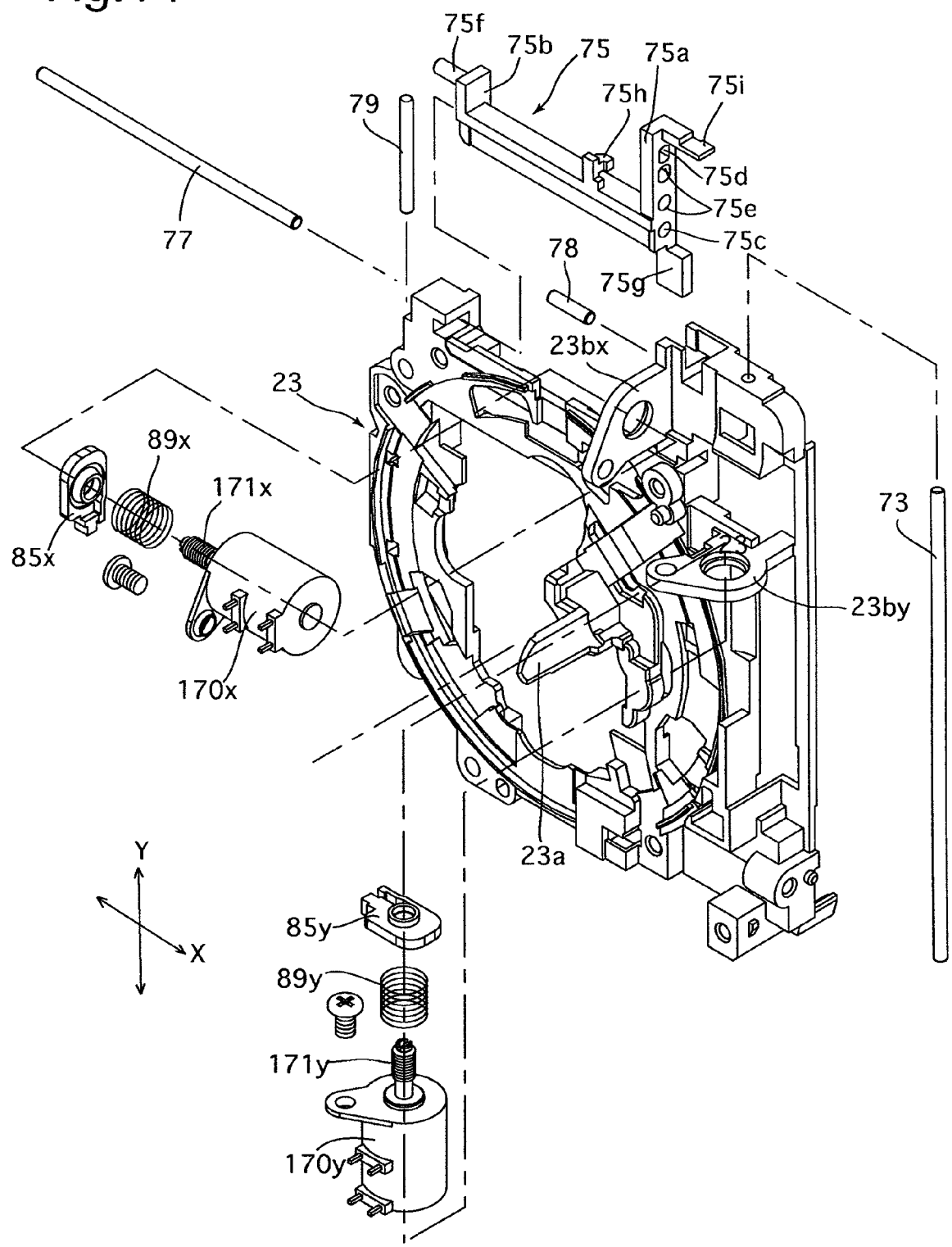
FIG. 11 is an exploded perspective view of a portion of the image stabilizing unit in the vicinity of a stationary holder thereof.
Figure 12:
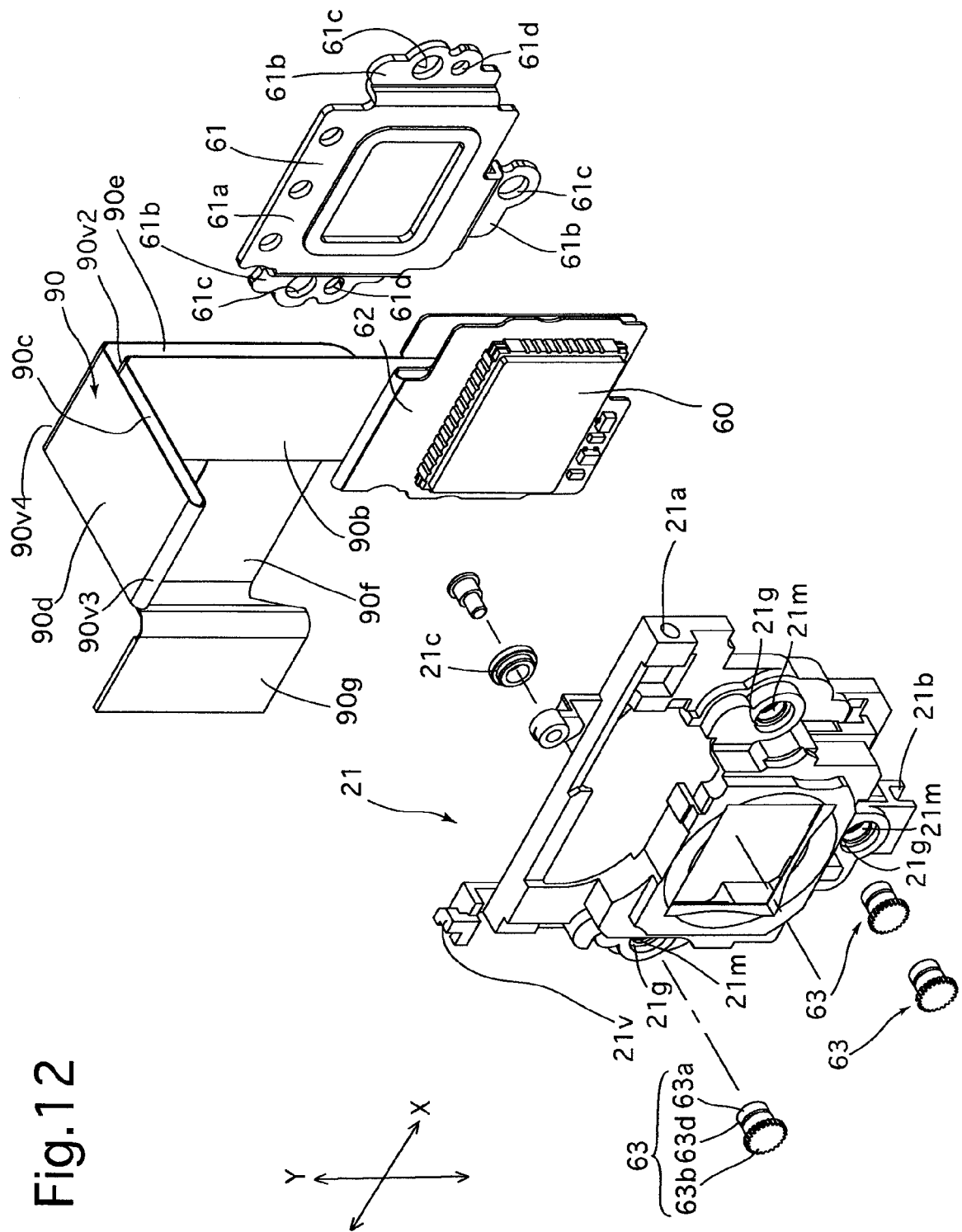
FIG. 12 is an exploded front perspective view of an X-axis direction moving stage, a CCD image sensor, a CCD retaining plate and associated elements shown in FIG. 10.
Figure 13:
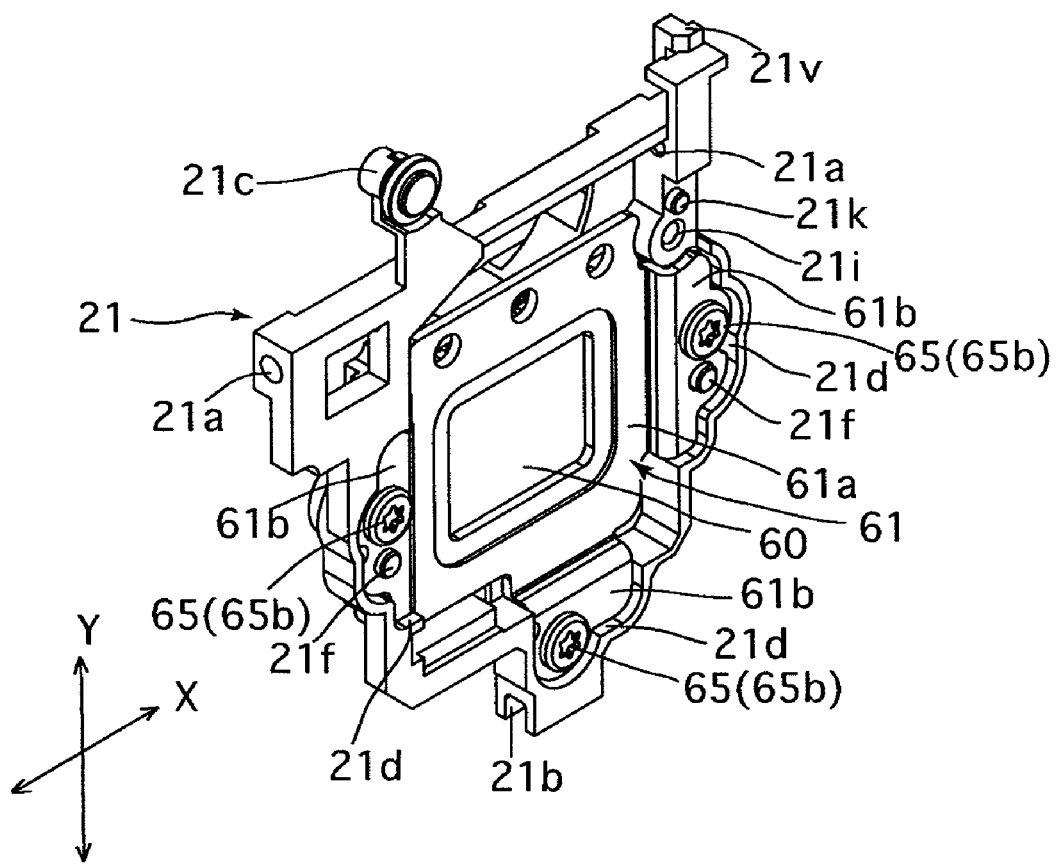
FIG. 13 is a rear perspective view of the X-axis direction moving stage shown in FIG. 12 from which the flexible printed wiring board and the movable plate that are shown in FIG. 10 are removed.

As shown in FIG. 11, the image stabilizing unit IS is provided with an X-axis drive motor (driving device) 170x serving as a drive source for driving the CCD image sensor 60 in the X-axis direction and a Y-axis drive motor (driving device) 170y serving as a drive source for driving the CCD image sensor 60 in the Y-axis direction. The X-axis drive motor 170x and the Y-axis drive motor 170y are fixed to a motor bracket 23bx and a motor bracket 23by, respectively, which are integrally formed on the stationary holder 23. Each of the X-axis drive motor 170x and the Y-axis drive motor 170y is a stepping motor. A drive shaft (rotary shaft) of the X-axis drive motor 170x is threaded to serve as a feed screw 171x, and a drive shaft (rotary shaft) of the Y-axis drive motor 170y is threaded to serve as a feed screw 171y. The feed screw 171x is screwed into a female screw hole of an X-axis direction driven nut member 85x and the feed screw 171y is screwed into a female screw hole of a Y-axis direction driven nut member 85y. The X-axis direction driven nut member 85x is guided linearly in the X-axis direction by the linear groove 76f, and is in contact with the nut contacting portion 76e. The Y-axis direction driven nut member 85y is guided linearly in the Y-axis direction by the linear groove 80f, and is in contact with the nut contacting portion 80e. The X-axis direction driven nut member 85x can be screw-disengaged from either end of the feed screw 171x, and the Y-axis direction driven nut member 85y can be screw-disengaged from either end of the feed screw 171y. A nut-member biasing spring 89x is positioned between the X-axis direction driven nut member 85x and the X-axis drive motor 170x, and a nut-member biasing spring 89y is positioned between the Y-axis direction driven nut member 85x and the X-axis drive motor 170y. Each of the nut-member biasing springs 89x and 89y is a compression coil spring. The nut-member biasing springs 89x and 89y are loosely fitted on the feed screws 171x and 171y, respectively, in a compressed state. The nut-member biasing spring 89x biases the X-axis direction driven nut member 85x in a direction to bring the X-axis direction driven nut member 85x back into screw engagement with the X-axis drive motor 170x in the case where the X-axis direction driven nut member 85x is disengaged from the X-axis drive motor 170x toward the X-axis drive motor 170*x* side. Likewise, the nut-member biasing spring 89*y* biases the Y-axis direction driven nut member 85*y* in a direction to bring the Y-axis direction driven nut member 85*y* back into screw engagement with the Y-axis drive motor 170*y* in the case where the Y-axis direction driven nut member 85*y* is disengaged from the Y-axis drive motor 170*y* toward the Y-axis drive motor 170*y* side.

Figure 24:
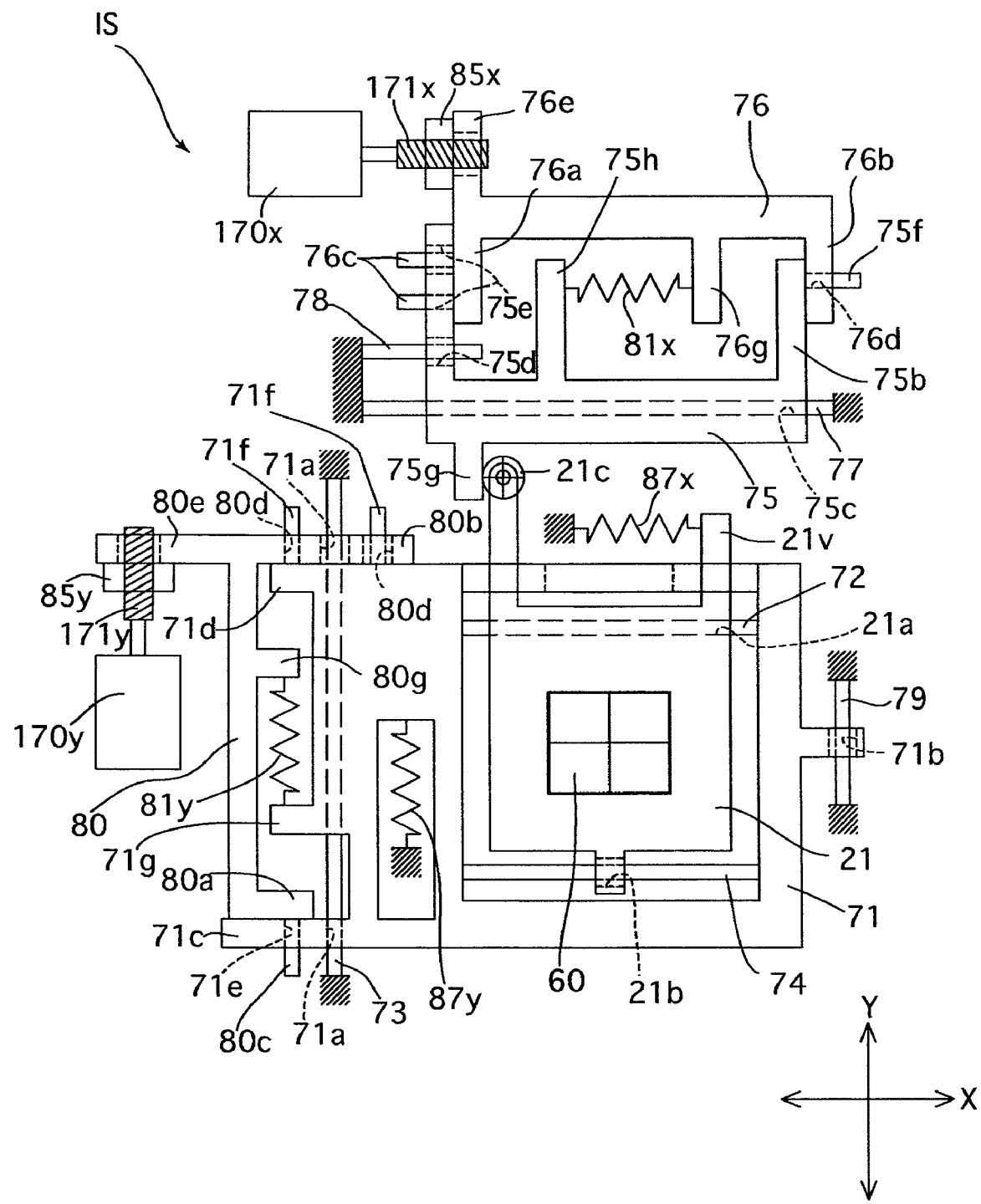
FIG. 24 is a diagrammatic illustration of the image stabilizing unit, showing the structure thereof.

FIG. 24 schematically shows the structure of the image stabilizing unit IS, viewed from the rear of the digital camera 200. Note that the relative position between the rotation prevention rod 78 and the pair of guide pins 76*c*, etc., are different from those shown in FIGS. 7 through 23 for the purpose of illustration. As can be understood from this schematic diagram, in the driving mechanism for driving the CCD image sensor 60 in the X-axis direction, the first X-axis direction moving member 75 and the second X-axis direction moving member 76 are coupled to each other resiliently by the biasing force of the extension joining spring 81*x* with the movement limit lug 75*a* and the movement limit lug 75*b* in contact with the movement limit lug 76*a* and the movement limit lug 76*b*, respectively. The biasing force of the X-axis direction stage biasing spring 87*x* is exerted on the first X-axis direction moving member 75 via the transfer roller 21*c*, which is in contact with the linkage projection 75*g*. Although the biasing force of the X-axis direction stage biasing spring 87*x* is exerted on the first X-axis direction moving member 75 leftward as viewed in FIG. 24, i.e., in a direction to disengage the movement limit lugs 75*a* and 75*b* from the movement limit lugs 76*a* and 76*b*, respectively, the biasing force (spring force) of the extension joining spring 81*x* is predetermined to be greater than that of the X-axis direction stage biasing spring 87*x*. Therefore, the first X-axis direction moving member 75 and the second X-axis direction moving member 76 are collectively biased leftward as viewed in FIG. 24 while maintaining the movement limit lugs 75*a* and 75*b* in resilient contact with the movement limit lugs 76*a* and 76*b*, respectively. Since the leftward movement of the second X-axis direction moving member 76 is limited by the engagement of the nut contacting portion 76*e* with the X-axis direction driven nut member 85*x*, the position of the X-axis direction driven nut member 85*x* serves as a reference position for each of the first X-axis direction moving member 75 and the second X-axis direction moving member 76 in the X-axis direction. As can be seen in FIG. 24, the end of the feed screw 171*x* extends through a through-hole (see FIGS. 14 and 15) formed on the nut contacting portion 76*e* so as not to interfere therewith.

Driving the X-axis drive motor 170*x* to rotate the drive shaft thereof (the feed screw 171*x*) causes the X-axis direction driven nut member 85*x*, that is screw-engaged with the feed screw 171*x*, to move linearly in the X-axis direction, thus causing the relative position between the first X-axis direction moving member 75 and the second X-axis direction moving member 76 in the X-axis direction to vary. For instance, if moved rightward with respect to the view shown in FIG. 24, the X-axis direction driven nut member 85*x* presses the nut contacting portion 76*e* in the same direction to thereby integrally move the first X-axis direction moving member 75 and the second X-axis direction moving member 76 rightward as viewed in FIG. 24 against the spring force of the X-axis direction stage biasing spring 87*x*. If the first X-axis direction moving member 75 is moved rightward with respect to the view shown in FIG. 24, the linkage projection 75*g* presses the transfer roller 21*c* in the same direction to thereby move the X-axis direction stage 21 rightward as viewed in FIG. 24. Conversely, if the X-axis direction driven nut member 85*x* is moved leftward as viewed in FIG. 24, the first X-axis direction moving member 75 and the second X-axis direction moving member 76 follow the X-axis direction driven nut member 85*x* to integrally move leftward as viewed in FIG. 24 by the biasing force of the X-axis direction stage biasing spring 87*x*. At this time, the X-axis direction stage 21 follows the first X-axis direction moving member 75 to move leftward as viewed in FIG. 24 by the biasing force of the X-axis direction stage biasing spring 87*x*. The linkage projection 75*g* and the transfer roller 21*c* are maintained in contact with each other at all times by the biasing force of the X-axis direction stage biasing spring 87*x*.

In the driving mechanism for driving the CCD image sensor 60 in the Y-axis direction, the Y-axis direction moving stage 71 and the Y-axis direction moving member 80 are resiliently coupled to each other via the extension joining spring 81*y* with the movement limit lugs 71*c* and 71*d* being in contact with the movement limit lugs 80*a* and 80*b*, respectively. Although the Y-axis direction moving stage 71 is biased downward as viewed in FIG. 24 by the spring force of the Y-axis direction stage biasing spring 87*y*, i.e., in a direction to disengage the movement limit lugs 71*c* and 71*d* from the movement limit lugs 80*a* and 80*b*, respectively, the biasing force (spring force) of the extension joining spring 81*y* is predetermined to be greater than that of the Y-axis direction stage biasing spring 87*y*. Therefore, the Y-axis direction moving stage 71 and the Y-axis direction moving member 80 are collectively biased downward while maintaining the movement limit lugs 71*c* and 71*d* in resilient contact with the movement limit lugs 80*a* and 80*b*, respectively. Since the downward movement of the Y-axis direction moving member 80 is limited by the engagement of the nut contacting portion 80*e* with the Y-axis direction driven nut member 85*y*, the position of the Y-axis direction driven nut member 85*y* serves as a reference position for each of the Y-axis direction moving stage 71 and the Y-axis direction moving member 80 in the Y-axis direction. As can be seen in FIG. 24, the end of the feed screw 171*y* extends through a through-hole (see FIGS. 16 and 17) formed on the nut contacting portion 80*e* so as not to interfere therewith.

Driving the Y-axis drive motor 170*y* to rotate the drive shaft thereof (the feed screw 171*y*) causes the Y-axis direction driven nut member 85*y*, that is screw-engaged with the feed screw 171*y*, to move linearly in the Y-axis direction, thus causing the relative position between the Y-axis direction moving stage 71 and the Y-axis direction moving member 80 in the Y-axis direction to vary. For instance, if the Y-axis direction driven nut member 85*y* is moved upward as viewed in FIG. 24, the Y-axis direction driven nut member 85*y* presses the nut contacting portion 80*e* in the same direction to thereby integrally move the Y-axis direction moving stage 71 and the Y-axis direction moving member 80 upward with respect to the view shown in FIG. 24 against the spring force of the Y-axis direction stage biasing spring 87*y*. Conversely, if the Y-axis direction driven nut member 85*y* is moved downward with respect to the view shown in FIG. 24, the Y-axis direction moving stage 71 and the Y-axis direction moving member 80 follow the Y-axis direction driven nut member 85*y* to integrally move downward by the biasing force of the Y-axis direction stage biasing spring 87*y*.

When the Y-axis direction moving stage 71 moves in the Y-axis direction, the X-axis direction stage 21 that is supported by the Y-axis direction moving stage 71 thereon moves together with the Y-axis direction moving stage 71. On the other hand, when the X-axis direction stage 21 moves together with the Y-axis direction moving stage 71 vertically in the Y-axis direction, the contacting point between the transfer roller 21*c* and the contacting surface of the linkage projection 75g varies because the first X-axis direction moving member 75, with which the transfer roller 21c is in contact, does not move in the Y-axis direction. At this time, the transfer roller 21c rolls on the contacting surface of the linkage projection 75g, so that the X-axis direction stage 21 can be moved in the Y-axis direction with no driving force in the Y-axis direction being exerted on the first X-axis direction moving member 75.

According to the above described structure of the image stabilizing unit IS, the X-axis direction stage 21 can be moved forward and reverse in the X-axis direction by driving the X-axis drive motor 170x forward and reverse, respectively; and the Y-axis direction moving stage 71, together with the X-axis direction stage 21 that is supported by the Y-axis direction moving stage 71, can be moved forward and reverse in the Y-axis direction by driving the Y-axis drive motor 170y forward and reverse, respectively.

Figure 18:
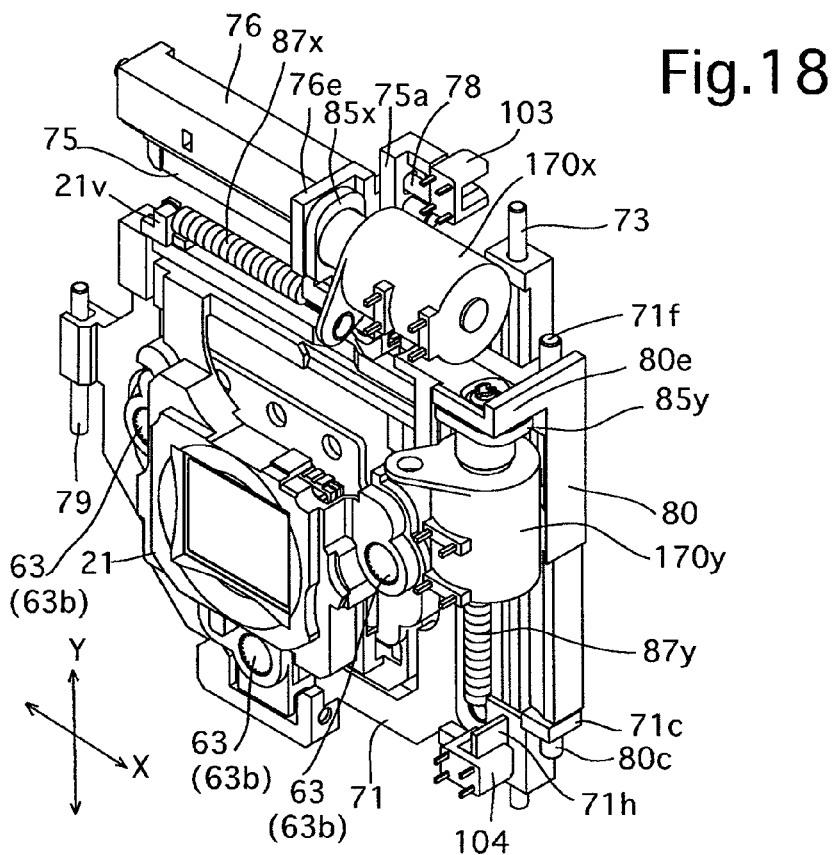
FIG. 18 is a front perspective view of the image stabilizing unit from which the stationary holder is removed.
Figure 19:
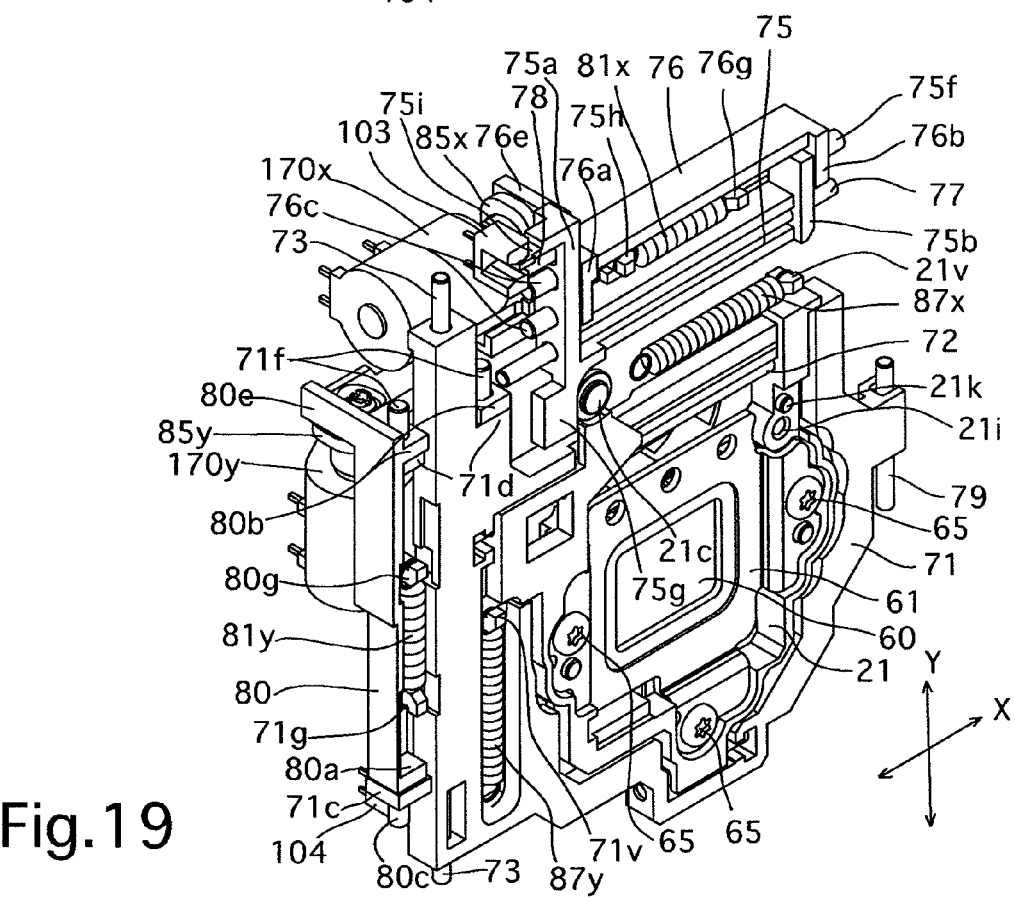
FIG. 19 is a rear perspective view of the elements of the image stabilizing unit shown in FIG. 18.
Figures 20, 21:
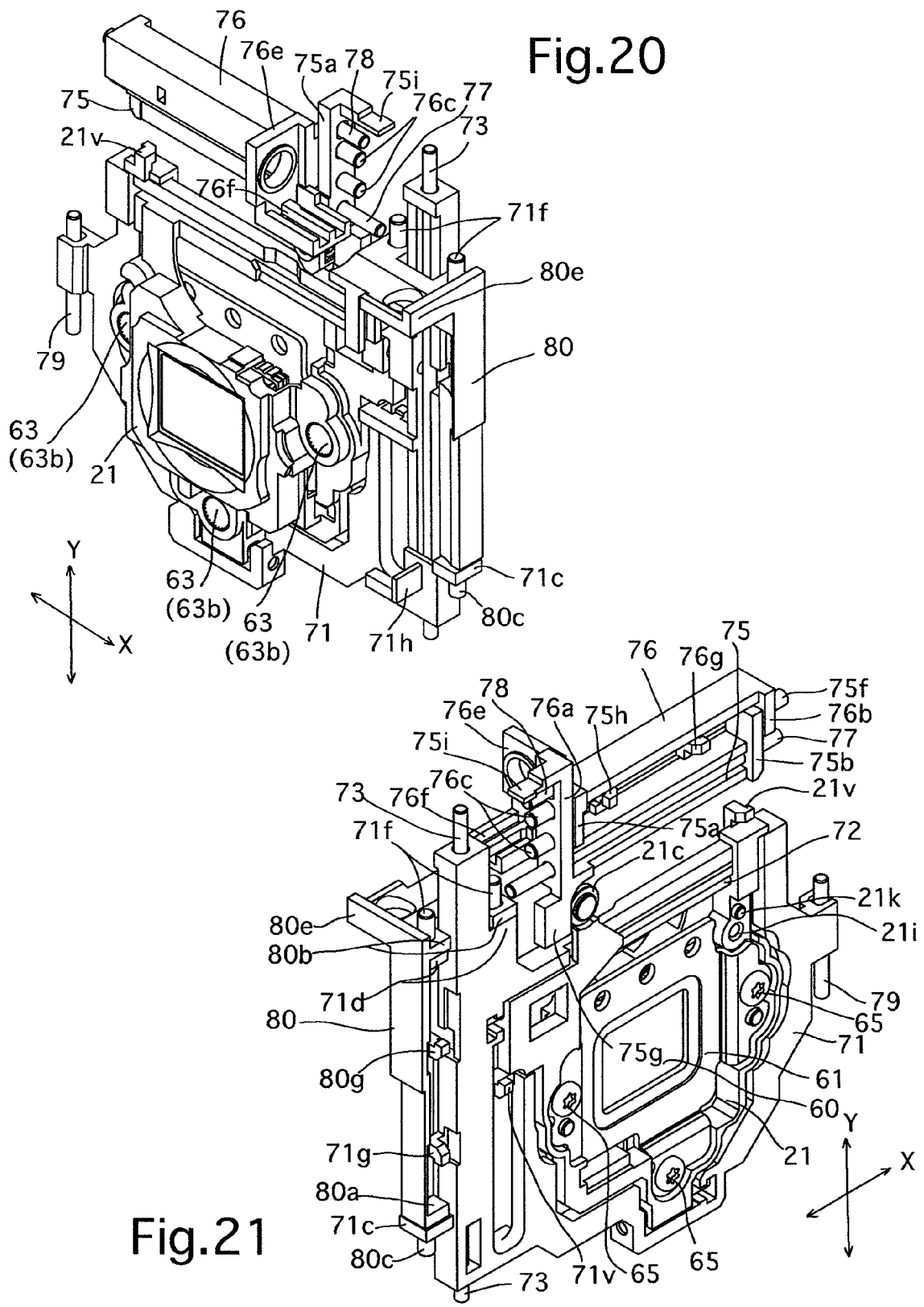
FIG. 20 is a front perspective view of the elements of the image stabilizing unit shown in FIGS. 18 and 19 from which drive motors, photo-interrupters and biasing springs are further removed.
FIG. 21 is a rear perspective view of the elements of the image stabilizing unit shown in FIG. 20.
Figure 22:
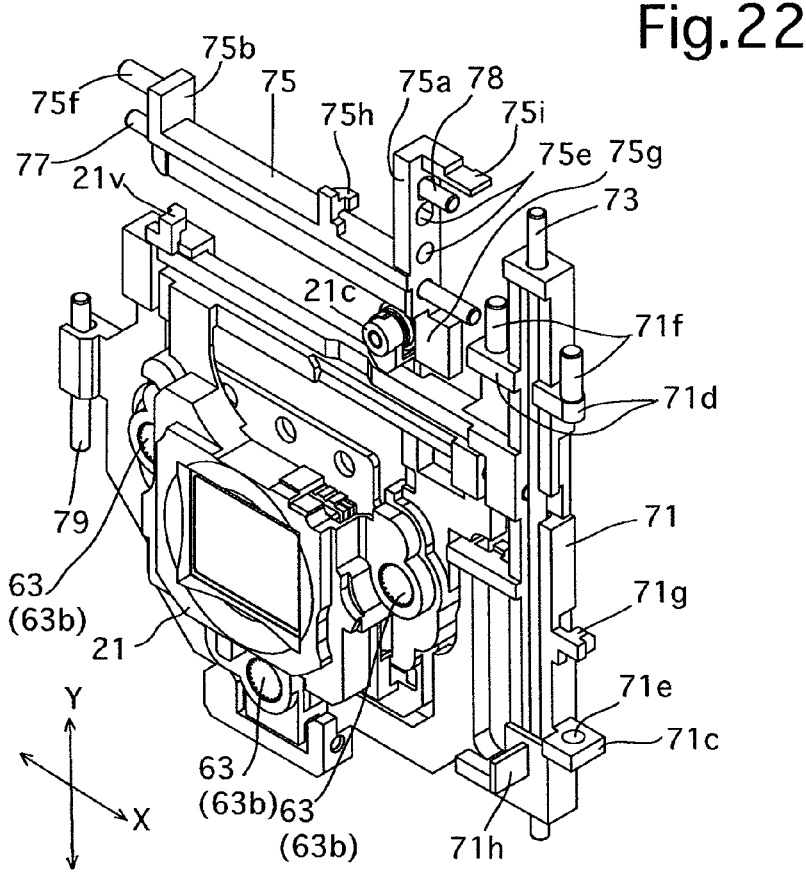
FIG. 22 is a front perspective view of the elements of the image stabilizing unit shown in FIGS. 20 and 21 from which the second X-axis direction moving member and the Y-axis direction moving member are further removed.
Figure 23:
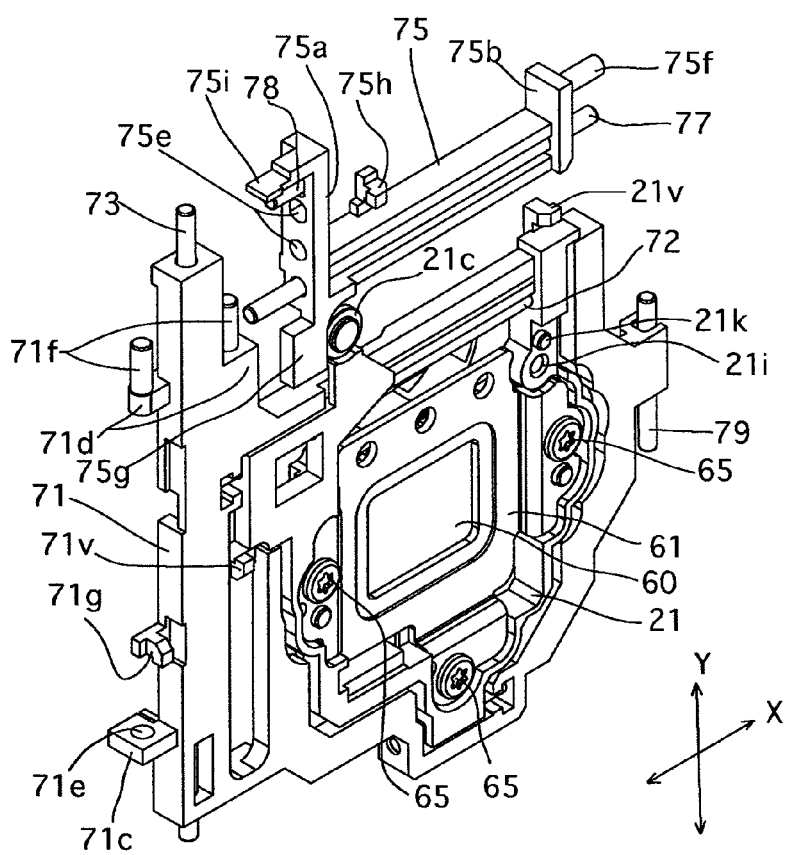
FIG. 23 is a rear perspective view of the elements of the image stabilizing unit shown in FIG. 22.

As shown in FIGS. 14 and 15, the first X-axis direction moving member 75 is provided in the vicinity of the movement limit lug 75a with a position detection lug 75i in the shape of a small thin plate. As shown in FIG. 16, the Y-axis direction moving stage 71 is provided in the vicinity of the movement limit lug 71c with a position detection lug 71h in the shape of a small thin plate. As shown in FIGS. 18 and 19, the image stabilizing unit IS is provided with a first photo-interrupter 103 and a second photo-interrupter 104. The first photo-interrupter 103 detects the presence of the position detection lug 75i of the first X-axis direction moving member 75 that passes between mutually facing emitter/receiver elements when the light beam is blocked by the position detection lug 75i. Likewise, the second photo-interrupter 104 detects the presence of the position detection lug 71h of the Y-axis direction moving stage 71 that passes between mutually facing emitter/receiver elements when the light beam is blocked by the position detection lug 71h. The initial position of the first X-axis direction moving member 75 (the X-axis direction stage 21) in the X-axis direction can be detected by detecting the presence of the position detection lug 75i by the first photo-interrupter 103, while the initial position of the Y-axis direction moving stage 71 in the Y-axis direction can be detected by detecting the presence of the position detection lug 71h by the second photo-interrupter 104.

As shown in the block diagram in FIG. 25, the digital camera 200 is provided with an X-axis direction gyro sensor (angular velocity sensor) 105 and a Y-axis direction gyro sensor (angular velocity sensor) 106 which detect the angular velocity (angular speed) about two axes (the X-axis and the Y-axis) orthogonal to each other. The magnitude and the direction of camera shake (vibrations) applied to the digital camera 200 are detected by these two gyro sensors 105 and 106. Subsequently, the control circuit 102 determines a moving angle by time-integrating the angular velocity of the camera shake in the two axial directions, detected by the two gyro sensors 105 and 106. Subsequently, the control circuit 102 calculates from the moving angle the moving amounts of the image on a focal plane (imaging surface of the CCD image sensor 60) in the X-axis direction and in the Y-axis direction. The control circuit 102 further calculates the driving amounts and the driving directions of the X-axis direction stage 21 (the first X-axis direction moving member 75 and the second X-axis direction moving member 76) and the Y-axis direction moving stage 71 (the Y-axis direction moving member 80) for the respective axial directions (driving pulses for the X-axis drive motor 170x and the Y-axis drive motor 170y) in order to counteract camera shake. Thereupon, the X-axis drive motor 170x and the Y-axis drive motor 170y are actuated and the operations thereof are controlled in accordance with the calculated values, which counteract image shake of an object image captured by the CCD image sensor 60. The digital camera 200 can be entered into this image stabilization mode by turning on a photographing mode select switch 107 (see FIG. 25). If the photographing mode select switch 107 is in an OFF state, the image stabilizing capability is deactivated so that a normal photographing operation is performed. Additionally, by operating the photographing mode select switch 107, either a first tracking mode or a second tracking mode can be selected in the image stabilization mode. The image stabilizing capability remains activated by driving the X-axis drive motor 170x and the Y-axis drive motor 170y in the first tracking mode, while the image stabilizing capability is activated by driving the X-axis drive motor 170x and the Y-axis drive motor 170y only when a photometric switch 108 or a release switch 109 (see FIG. 25) provided in the digital camera 200 is turned ON in the second tracking mode. The photometric switch 108 is turned ON by depressing the shutter button 205 halfway, and the release switch 109 is turned ON by fully depressing the shutter button 205.

The above illustrated image stabilizer of the digital camera 200 is provided with a damage-protection structure which absorbs loads and impacts on a driving force transfer mechanism from each of the X-axis drive motor 170x and the Y-axis drive motor 170y to the CCD image sensor 60 (the X-axis direction stage 21) to prevent damage to the feed screws 171x and 171y and other associated elements. This damage-protection structure is composed of two major components: a first component composed of the first X-axis direction moving member 75 and the second X-axis direction moving member 76 (which are resiliently coupled to each other by the extension joining spring 81x) in the driving mechanism for driving the CCD image sensor 60 in the X-axis direction; and a second part composed of the Y-axis direction stage 71 and the Y-axis direction moving member 80 (which are resiliently coupled to each other by the extension joining spring 81y) in the driving mechanism for driving the CCD image sensor 60 in the Y-axis direction.

The driving mechanism for driving the CCD image sensor 60 in the X-axis direction has the capability of protecting itself from damage. This capability will be discussed hereinafter.

For instance, when the X-axis direction driven nut member 85x is moved rightward with respect to the view shown in FIG. 24 by the X-axis drive motor 170x, the first X-axis direction moving member 75 and the second X-axis direction moving member 76, which move integrally in a normal state, move relative to each other in the X-axis direction so as to disengage the movement limit lug 75a and the movement limit lug 76a (and also the movement limit lug 75b and the movement limit lug 76b) from each other against the biasing force of the extension joining spring 81x in the event of the X-axis direction stage 21 abutting against the Y-axis direction stage 71 upon reaching a mechanical limit of movement of the X-axis direction stage 21 or other causes which interfere with movement of the X-axis direction stage 21. Specifically, the second X-axis direction moving member 76 can solely move rightward in the X-axis direction relative to the first X-axis direction moving member 75 in the case where movement of the first X-axis direction moving member 75, together with the X-axis direction stage 21, is prevented for some reason. This structure makes it possible for the X-axis direction driven nut member 85x to move along the feed screw 171x even if the X-axis direction stage 21 becomes immobilized. This prevents excessive loads on the aforementioned driving force transfer mechanism, thus preventing thread jamming between the feed screw 171x and the X-axis direction driven nut member 85x and further preventing damage to other associated parts of the driving force transfer mechanism. When the X-axis direction driven nut member 85x is moved leftward with respect to the view shown in FIG. 24 by the X-axis drive motor 170x, the X-axis direction driven nut member 85x moves in a direction away from the nut contacting portion 76e, and accordingly, the driving force of the X-axis drive motor 170x does not act on either the first X-axis direction moving member 75 or the second X-axis direction moving member 76; hence, no undue loads are exerted on the driving force transfer mechanism even if movement of the X-axis direction stage 21 is prevented for some reason.

Similar to the driving mechanism for driving the CCD image sensor 60 in the X-axis direction, the driving mechanism for driving the CCD image sensor 60 in the Y-axis direction also has the capability of protecting itself from damage. This capability will be discussed hereinafter.

For instance, when the Y-axis direction driven nut member 85y is moved upward with respect to the view shown in FIG. 24 by the Y-axis drive motor 170y, the Y-axis direction moving member 80 and the Y-axis direction moving stage 71, which move integrally in a normal state, move relative to each other in the Y-axis direction to disengage the movement limit lug 71c and the movement limit lug 80a (and also the movement limit lug 71d and the movement limit lug 80b) away from each other against the biasing force of the extension joining spring 81y in the event of the Y-axis direction stage 71 abutting against the stationary holder 23 upon reaching a mechanical limit of movement of the Y-axis direction stage 71 or other causes which interfere with movement of the Y-axis direction stage 71 (or the X-axis direction stage 21). Specifically, the Y-axis direction moving member 80 can solely move upward in the Y-axis direction relative to the Y-axis direction moving stage 71 in the case where movement of the Y-axis direction stage 71 is prevented for some reason. This structure makes it possible for the Y-axis direction driven nut member 85y to move along the feed screw 171y even if the Y-axis direction stage 71 becomes immobilized. This prevents excessive loads on the aforementioned driving force transfer mechanism, thus preventing thread jamming between the feed screw 171y and the Y-axis direction driven nut member 85y and further preventing damage to other associated parts of the driving force transfer mechanism. When the Y-axis direction driven nut member 85y is moved downward with respect to the view shown in FIG. 24 by the Y-axis drive motor 170y, the Y-axis direction driven nut member 85y moves in a direction away from the nut contacting portion 80e, and accordingly, the driving force of the Y-axis drive motor 170y does not act on either the Y-axis direction moving member 80 or the Y-axis direction moving stage 71; hence, no undue loads are exerted on the driving force transfer mechanism even if movement of the Y-axis direction stage 71 is prevented for some reason.

As mentioned above, the range of movement (mechanical limits of movement) of the X-axis direction stage 21 is defined by inner peripheral surfaces of the Y-axis direction moving stage 71, while the range of movement (mechanical limits of movement) of the Y-axis direction moving stage 71 is defined by inner peripheral surfaces of the stationary holder 23. It is desirable that the driving force of the X-axis drive motor 170x be stopped being transferred from the feed screw 171x to the X-axis direction driven nut member 85x upon the X-axis direction stage 21 reaching either of the right and left limits of movement thereof, and that the driving force of the Y-axis drive motor 170y be stopped being transferred from the feed screw 171y to the Y-axis direction driven nut member 85y upon the Y-axis direction stage 71 reaching either of the upper and lower limits of movement thereof. However, taking manufacturing tolerances of the associated components into consideration, such an ideal correlation cannot be always achieved. For instance, if the X-axis direction driven nut member 85x and the feed screw 171x (or the Y-axis direction driven nut member 85y and the feed screw 171y) are still screw-engaged with each other by a sufficient axial length in a state where the X-axis direction stage 21 (or the Y-axis direction stage 71) has reached a mechanical limit of movement thereof, there is a possibility of jamming occurring between the feed screw 171x and the X-axis direction driven nut member 85x (or the feed screw 171y and the Y-axis direction driven nut member 85y) due to loads placed on each of the X-axis direction driven nut member 85x and the feed screw 171x (or the Y-axis direction driven nut member 85y and the feed screw 171y) by a further rotation of the X-axis drive motor 170x (or the Y-axis drive motor 170y) if the image stabilizer of the digital camera 200 incorporates no damage-protection structure such as the above described damage-protection structure. To prevent this problem from occurring, it is conceivable that the image stabilizing mechanism is constructed so that the X-axis direction driven nut member 85x (the Y-axis direction driven nut member 85y) is disengaged from the feed screw 171x (171y) to come off upon reaching either end of the feed screw 171x (171y) after giving the X-axis direction driven nut member 85x (the Y-axis direction driven nut member 85y) a sufficient range of movement on the feed screw 171x (171y) so that the X-axis direction stage 21 (the Y-axis direction stage 71) does not reach a mechanical limit of movement thereof easily. However, according to this structure, the range of movement of each of the X-axis direction stage 21 and the Y-axis direction stage 71 is required to be increased more than necessary, which may undesirably increase the size of the whole image stabilizer. Additionally, if the X-axis direction stage 21 or the Y-axis direction stage 71 is jammed accidentally at some intermediate position in the range of movement thereof (i.e., not at either end of the range of movement thereof), heavy loads are put on the screw-engaged portion between the X-axis direction driven nut member 85x (or the Y-axis direction driven nut member 85y) and the feed screw 171x (or 171y), regardless of the range of movement of the X-axis direction stage 21 or the Y-axis direction stage 71. Conversely, according to the above illustrated embodiment of the image stabilizer, a difference in amount of movement in the X-axis direction between the X-axis direction driven nut member 85x and the X-axis direction stage 21 is absorbed by intermediate members (i.e., the first X-axis direction moving member 75 and the second X-axis direction moving member 76), while a difference in amount of movement in the Y-axis direction between the Y-axis direction driven nut member 85y and the X-axis direction stage 21 is absorbed by intermediate members (i.e., the Y-axis direction stage 71 and the Y-axis direction moving member 80); and therefore, the range of movement of each of the X-axis direction stage 21 and the Y-axis direction stage 71 does not need to be increased more than necessary. Moreover, even if the X-axis direction stage 21 or the Y-axis direction stage 71 is jammed accidentally at some intermediate position in the range of movement thereof (i.e., not at either end of the range of movement thereof), no heavy loads are put on the screw-engaged portion between the X-axis direction driven nut member 85x (or the Y-axis direction driven nut member 85y) and the feed screw 171x (or 171y) because a difference in amount of movement in the X-axis direction between the X-axis direction driven nut member 85x and the X-axis direction stage 21 (or a difference in amount of movement in the Y-axis direction between the X-axis direction driven nut member 85y and the Y-axis direction stage 21) is absorbed by the aforementioned intermediate members (the first X-axis direction moving member 75 and the second X-axis direction moving member 76, or the Y-axis direction stage 71 and the Y-axis direction moving member 80). In the present embodiment of the image stabilizer, the maximum amount of relative movement between the first X-axis direction moving member 75 and the second X-axis direction moving member 76 is predetermined to be capable of absorbing any difference in amount of movement between the X-axis direction driven nut member 85x and the X-axis direction stage 21 wherever each of the X-axis direction driven nut member 85x and the X-axis direction stage 21 may be positioned in the range of movement thereof. Likewise, the maximum amount of relative movement between the Y-axis direction stage 71 and the Y-axis direction moving member 80 is predetermined to be capable of absorbing any difference in amount of movement between the Y-axis direction driven nut member 85y and the Y-axis direction stage 71 wherever each of the Y-axis direction driven nut member 85y and the Y-axis direction stage 71 may be positioned in the range of movement thereof.

A restriction on movement on the X-axis direction stage 21 or the Y-axis direction stage 71 is not the only cause of imposing loads on the driving force transfer mechanism. Since the CCD image sensor 60, that serves as an optical element for counteracting image shake, is supported to be freely movable in the X-axis direction and the Y-axis direction, there is a possibility of the X-axis direction stage 21 (which holds the CCD image sensor 60) or the Y-axis direction stage 71 (which holds the X-axis direction stage 21) being subjected to a force which forces the X-axis direction stage 21 or the Y-axis direction stage 71 to move even though no driving force is applied thereto by the X-axis drive motor 170x or the Y-axis drive motor 170y, respectively, in the case where a shock or sudden impact is applied to the digital camera 200 when the digital camera 200 is, e.g., dropped to the ground. Even in such a case, such loads, shock or sudden impact can be securely absorbed in the present embodiment of the image stabilizer.

For instance, if the X-axis direction stage 21 is moved leftward with respect to the view shown in FIG. 24 by an external force other than the driving force of the X-axis drive motor 170x, the first X-axis direction moving member 75 is pressed in the same direction via the transfer roller 21c. Since this direction of pressing the first X-axis direction moving member 75 is a direction which disengages the movement limit lugs 75a and 75b from the movement limit lugs 76a and 76b, respectively, the first X-axis direction moving member 75 can solely move leftward relative to the second X-axis direction moving member 76 against the biasing force of the extension joining spring 81x. At this time, the first X-axis direction moving member 75 does not mechanically press the second X-axis direction moving member 76, so that only a resilient tensile force of the extension joining spring 81x acts on the second X-axis direction moving member 76, and accordingly, no excessive force is applied to the X-axis direction driven nut member 85x from the second X-axis direction moving member 76. If the X-axis direction stage 21 is moved rightward with respect to the view shown in FIG. 24 by an external force other than the driving force of the X-axis drive motor 170x, the X-axis direction stage 21 moves in a direction to disengage the transfer roller 21c from the linkage projection 75g, either the first X-axis direction moving member 75 or the second X-axis direction moving member 76 is subjected to the moving force of the X-axis direction stage 21. Namely, even if the X-axis direction stage 21 is forced to move forward or reverse in the X-axis direction by an external force or the like when the X-axis drive motor 170x is not in operation, no undue loads are exerted on the screw-engaged portion between the X-axis direction driven nut member 85x and the feed screw 171x.

On the other hand, if the Y-axis direction stage 71 is moved downward with respect to the view shown in FIG. 24 by an external force other than the driving force of the Y-axis drive motor 170y, this moving direction of the Y-axis direction stage 71 is a direction which disengages the movement limit lugs 80a and 80b from the movement limit lugs 71c and 71d, respectively, and accordingly, the Y-axis direction stage 71 can solely move downward relative to the Y-axis direction moving member 80 against the biasing force of the extension joining spring 81y. At this time, the Y-axis direction stage 71 does not mechanically press the Y-axis direction moving member 80, so that only a resilient tensile force of the extension joining spring 81y acts on the Y-axis direction moving member 80, and accordingly, no excessive force is applied to the Y-axis direction driven nut member 85y from the Y-axis direction moving member 80. If the X-axis direction stage 21 is moved upward with respect to the view shown in FIG. 24 by an external force other than the driving force of the X-axis drive motor 170x, the Y-axis direction moving member 80 is pressed upward via the engagement between the movement limit lug 80a and the movement limit lug 71c and the engagement between the movement limit lug 80b and the movement limit lug 71d. At this time, the moving force of the Y-axis direction moving member 80 does not act on the Y-axis direction driven nut member 85y because this direction of movement of the Y-axis direction moving member 80 is a direction which disengages the nut contacting portion 80e from the Y-axis direction driven nut member 85y. Namely, even if the Y-axis direction stage 71 is forced to move forward or reverse in the Y-axis direction by an external force or the like when the Y-axis drive motor 170y is not in operation, no undue loads are exerted on the screw-engaged portion between the X-axis direction driven nut member 85y and the feed screw 171y.

As can be understood from the above description, according to the above illustrated embodiment of the image stabilizer, in either of the following two cases, i.e., the case where a malfunction occurs in the moving operation of the X-axis direction stage 21 and/or the Y-axis direction stage 71 when it is driven by the X-axis drive motor 170x or the Y-axis drive motor 170y; and the case where the X-axis direction stage 21 and/or the Y-axis direction stage 71 is forced to move unexpectedly by an external force or the like, such an accidental movement can be absorbed to thereby prevent the driving mechanism for the image-stabilizing optical element from being damaged. Specifically, the image stabilizer is designed so that no heavy loads are put on either of the two screw-engaged portions between the X-axis direction driven nut member 85x and the feed screw 171x and between the Y-axis direction driven nut member 85y and the feed screw 171y, which produces a high degree of effectiveness of preventing each of these two screw-engaged portions from being damaged. Although it is possible to drive the X-axis direction stage 21 and the Y-axis direction stage 71 with a high degree of precision by narrowing the lead angles of the feed screws 171x and 171y, respectively, a narrowing of the lead angle of either feed screw disadvantageously reduces the strength of the feed screw mechanism. However, according to the above illustrated embodiment of the image stabilizer, the lead angle of each feed screw can be narrowed since no heavy loads are applied on either of the aforementioned two screw-engaged portions.

Figure 28:
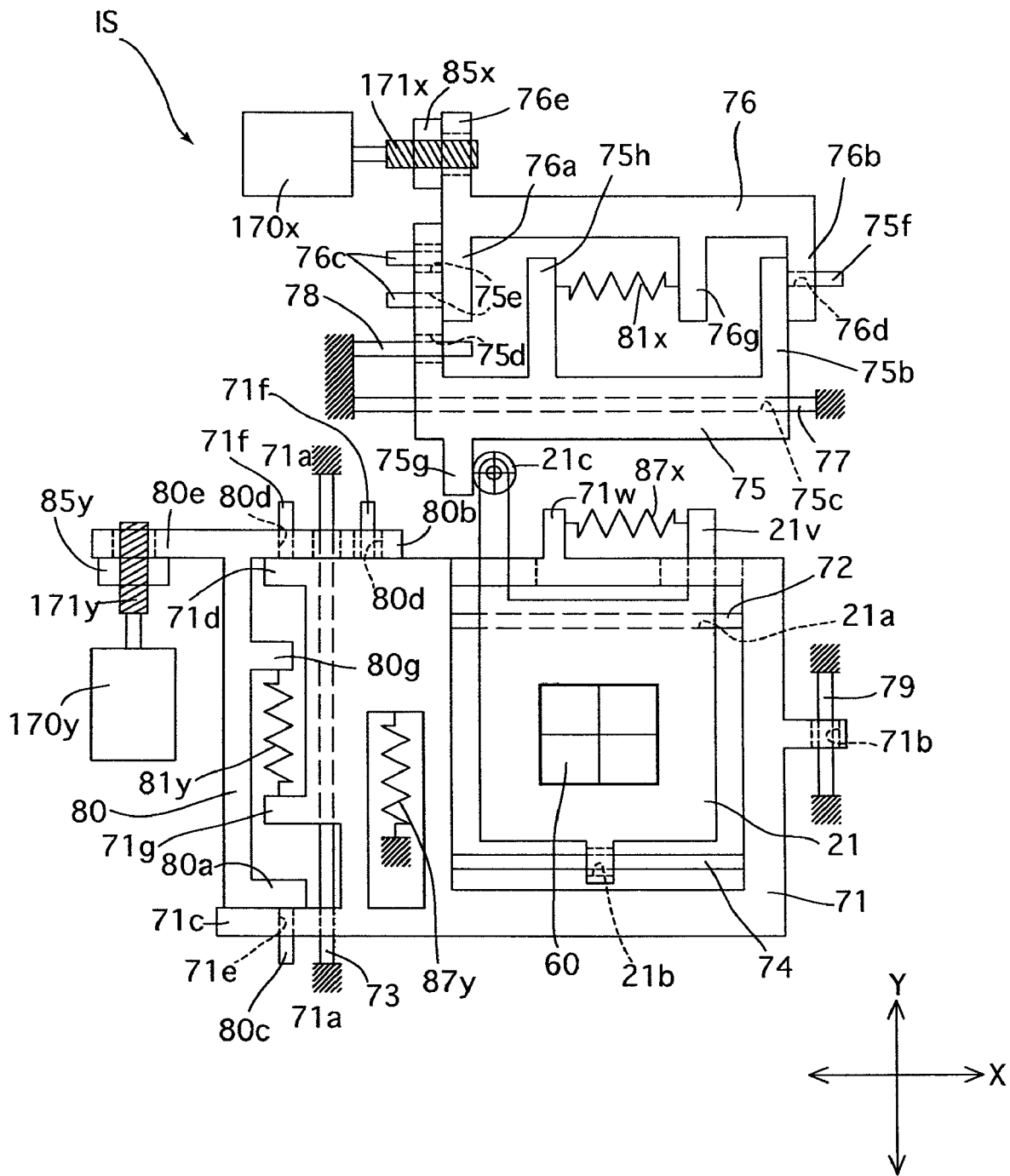
FIG. 28 is a diagrammatic illustration of the second embodiment of the image stabilizing unit, showing the structure thereof.

FIGS. 26 through 28 show another embodiment (second embodiment) of the image stabilizing unit IS. In this embodiment, the elements corresponding to those in the previous embodiment (first embodiment) of the image stabilizer IS are designated with like reference numerals. The second embodiment of the image stabilizing unit is the same as the first embodiment of the image stabilizing unit except that one end (left end as viewed in FIG. 28) of the X-axis direction stage biasing spring 87*x* is hooked on the Y-axis direction stage 71, not on the stationary holder 23. More specifically, the X-axis direction stage biasing spring 87*x* is extended and installed between a spring hook 71*w* formed on the Y-axis direction stage 71 and the spring hook 21*v* of the X-axis direction stage 21. The same effect as that of the first embodiment of the image stabilizing unit can be obtained in the second embodiment of the image stabilizing unit.

In the above illustrated embodiments, the CCD image sensor 60, the low-pass filter 25 and other associated elements are unitized and this CCD unit is driven when image shake is counteracted. The structure of this CCD unit (image pickup device unit) will be discussed in detail with reference to FIGS. 29 through 40.

As shown in FIGS. 29 through 34, the low-pass filter 25 and the CCD image sensor 60 are held between the X-axis direction moving stage 21 and a CCD retaining plate (image-pickup-device holding member) 61. More specifically, the low-pass filter 25 is in contact with an inner surface of the X-axis direction moving stage 21 at the front opening thereof and the imaging surface of the CCD image sensor 60 is positioned behind the low-pass filter 25 with an annular sealing member 26 held between the low-pass filter 25 and the CCD image sensor 60. The sealing member 26 is made of a resilient material. The CCD image sensor 60, together with a CCD substrate 62, is fixed to a front surface of the CCD retaining plate 61. The CCD substrate 62 is extended to the back of the CCD retaining plate 61 to be connected to one end of a flexible printed wiring board (hereinafter referred to as a flexible PWB) 90 adopted for image signal transmission. Another end of the flexible PWB 90 is connected to a stationary circuit board (not shown) on which the control circuit 102 is mounted. The CCD substrate 62 and the flexible PWB 90 are formed integral with each other.

The CCD retaining plate 61 is provided with a front flat portion 61*a* and three support lugs 61*b*. The front flat portion 61*a* is configured to support the CCD image sensor 60 and the CCD substrate 62. Two of the three support lugs 61*b* project horizontally in opposite directions while the remaining support lug 61*b* projects downwards. The X-axis direction moving stage 21 is provided with three recesses 21*d* which are shaped to allow the three support lugs 61*b* to be fitted therein, respectively. The three support lugs 61*b* are provided with three circular through-holes 61*c* which extend through the three support lugs 61*b* in a forward/rearward direction, respectively. Three nuts 63 are fixed to the X-axis direction moving stage 21 inside the three recesses 21*d* to face the through-holes 61*c*, respectively. The X-axis direction moving stage 21 is provided in the vicinity of the three nuts 63 with three spring accommodation recesses 21*e* in which three compression coil springs 64 are accommodated, respectively. The two side support lugs 61*b* of the front flat portion 61*a* are provided below the associated two through-holes 61*c* with two positioning holes 61*d*, respectively. The X-axis direction moving stage 21 is provided in two of the three recesses 21*d* with two positioning projections 21*f* which can be engaged in the two positioning holes 61*d*, respectively.

Figure 35:
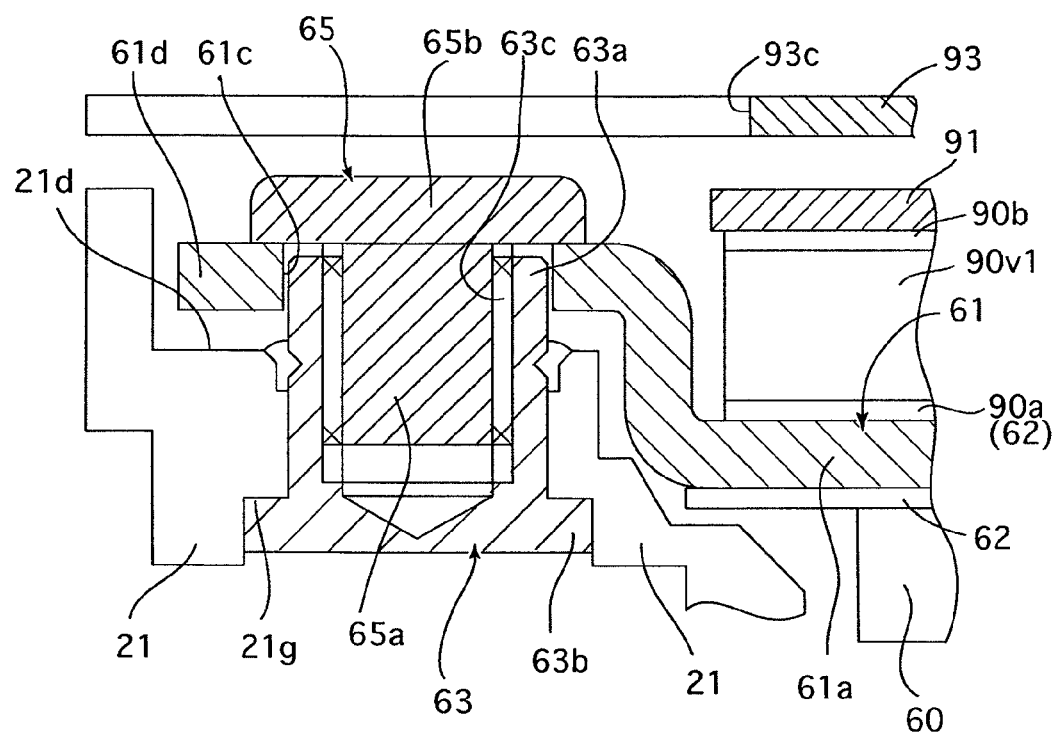
FIG. 35 is an enlarged cross sectional view of a portion of the image stabilizing unit in the vicinity of one of the two adjusting screws shown in FIG. 33.
Figure 36:
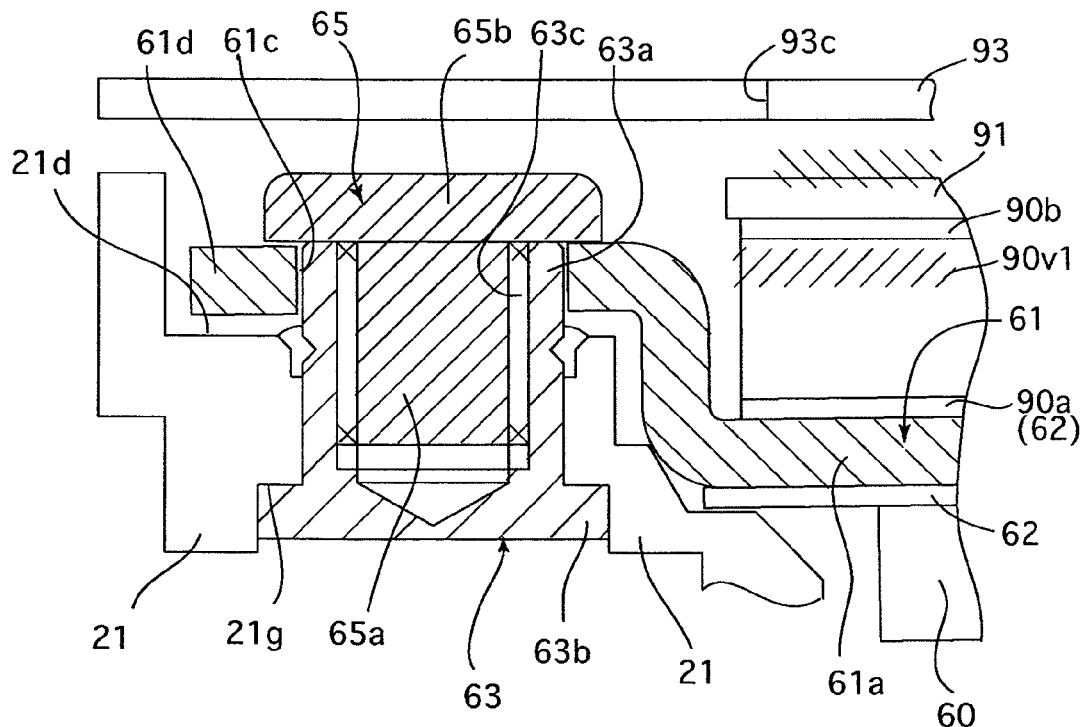
FIG. 36 is an enlarged cross sectional view of a portion of the image stabilizing unit in the vicinity of one of the two adjusting screws shown in FIG. 34.
Figure 37:
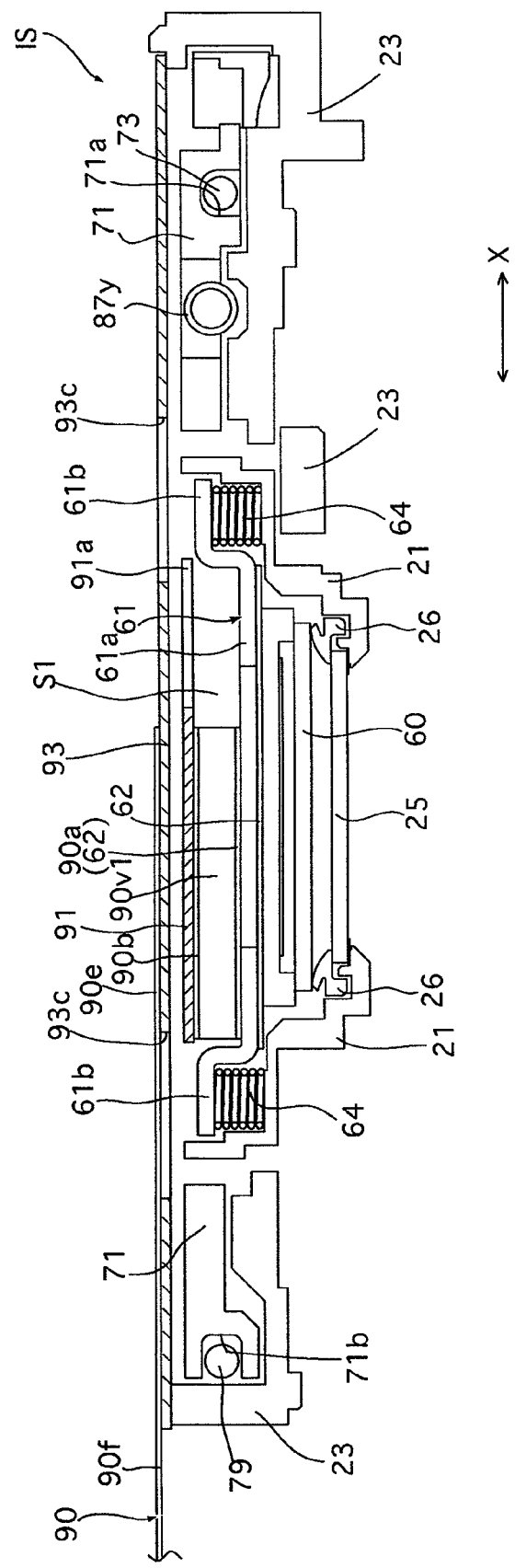
FIG. 37 is a cross sectional view of the image stabilizing unit, taken along a plane in which two compression coil springs of the CCD unit are positioned.

The three nuts 63 are made of metal which is a different material from the X-axis direction moving stage 21. Each nut 63 is provided with a hollow cylinder portion 63*a* and is further provided at one end of the cylinder portion (cylindrical shaft portion) 63*a* with a flange portion 63*b*. The three nuts 63 are fixed to the X-axis direction moving stage 21 with the three flange portions 63*b* being engaged in three large-diameter holes 21*g* formed on the front of the X-axis direction moving stage 21, respectively. The cylinder portion 63*a* of each nut 63 extends through the bottom of the associated large-diameter portion 21*g* to project rearward therefrom in the optical axis direction. As shown in FIGS. 35 and 36, the outer diameter of the cylinder portion 63*a* of each nut 63 is predetermined to be slightly smaller than the inner diameter (opening diameter) of the associated through-hole 61*c* of the CCD retaining plate 61. Each nut 63 is provided along the axis of the cylindrical portion 63*a* thereof with a female screw hole 63*c* so that three CCD adjustment screws 65 are screwed into the three female screw holes 63*c* from the ends thereof (from the rear ends thereof in the optical axis direction), respectively. Each CCD adjustment screw 65 is provided with a shaft portion (screw shaft portion) 65*a* including a male thread portion thereon which is screw-engaged with the associated female screw hole 63*c*, and a head portion 65*b* which is greater in diameter than the shaft portion 65*a*. Unlike the cylinder portion 63*a*, the outer diameter of the head portion 65*b* is predetermined to be greater than the inner diameter (opening diameter) of the associated through-hole 61*c*.

When the CCD unit is assembled, the CCD retaining plate 61 and the X-axis direction moving stage 21 are brought to approach each other so that the three support lugs 61*b* enter the corresponding three recesses 21*d*, respectively, with the three compression coil springs 64 inserted into the three spring accommodation recesses 21*e* in a compressed state, respectively. Thereupon, the two positioning projections 21*f* engage in the two positioning holes 61*d*, respectively, which determines the relative position between the X-axis direction moving stage 21 and the CCD image sensor 60. Additionally, bringing the CCD retaining plate 61 and the X-axis direction moving stage 21 closer to each other to some extent causes the ends of the hollow cylinder portions 63*a* of the three nuts 63 to enter the three circular through-holes 61*c*, respectively, since the outer diameter of the cylinder portion 63*a* of each nut 63 is smaller than the inner diameter (opening diameter) of the associated through-hole 61*c* as mentioned above.

Subsequently, the shaft portions 65*a* of the three CCD adjustment screws 65 are screwed into the female screw holes 63*c* of the three nuts 63, respectively. Bringing the X-axis direction moving stage 21 and the CCD retaining plate 61 closer to each other causes the compressed coil springs 64, which are inserted in the three recesses 21*d*, to be compressed between the X-axis direction moving stage 21 and the three support lugs 61*b*. Due to the resilient force of the compressed coil springs 64 thus compressed, the CCD retaining plate 61 is biased in a direction away from the X-axis direction moving stage 21 (rearwards in the optical axis direction) (see FIG. 37). However, the back surfaces of the head portions 65*b* of the three CCD adjustment screws 65 prevent the CCD retaining plate 61 from moving rearward, thus defining the position of the CCD retaining plate 61 in the optical axis direction. Accordingly, the X-axis direction moving stage 21 and the CCD retaining plate 61 are joined together with the CCD image sensor 60 and the low-pass filter 25 held therebetween.

In the CCD unit, in which the X-axis direction moving stage 21 and the CCD retaining plate 61 are thus joined together, the three CCD adjustment screws 65 are arranged dispersively at three different points about the center of the imaging surface of the CCD image sensor 60, and accordingly, the angle (inclination angle/setting angle) of the CCD retaining plate 61 relative to the photographing optical axis Z1, i.e., the angle (inclination angle/setting angle) of the imaging surface of the CCD image sensor 60 relative to the photographing optical axis Z1, can be adjusted by adjusting the tightening amount of each CCD adjustment screw 65. For instance, if the tightening amount of one CCD adjustment screw 65 is increased, the associated head portion 65b that defines the position of the CCD retaining plate 61 in the optical axis direction moves forward in the optical axis direction. This forward movement of the head portion 65b causes the associated support lug 61b which is in contact with the one CCD adjustment screw 65 to be pushed forward. Conversely, if the tightening amount of one CCD adjustment screw 65 is decreased, the associated head portion 65b moves rearward in the optical axis direction. This rearward movement of the head portion 65b causes the associated support lug 61b which is in contact with the one CCD adjustment screw 65 to be pushed rearward by the biasing force of the associated compression coil springs 64. The inclination angle of the CCD image sensor 60 relative to the photographing optical axis Z1 can be adjusted by changing the balance among the tightening amounts of the three CCD adjustment screws 65.

Figure 33:
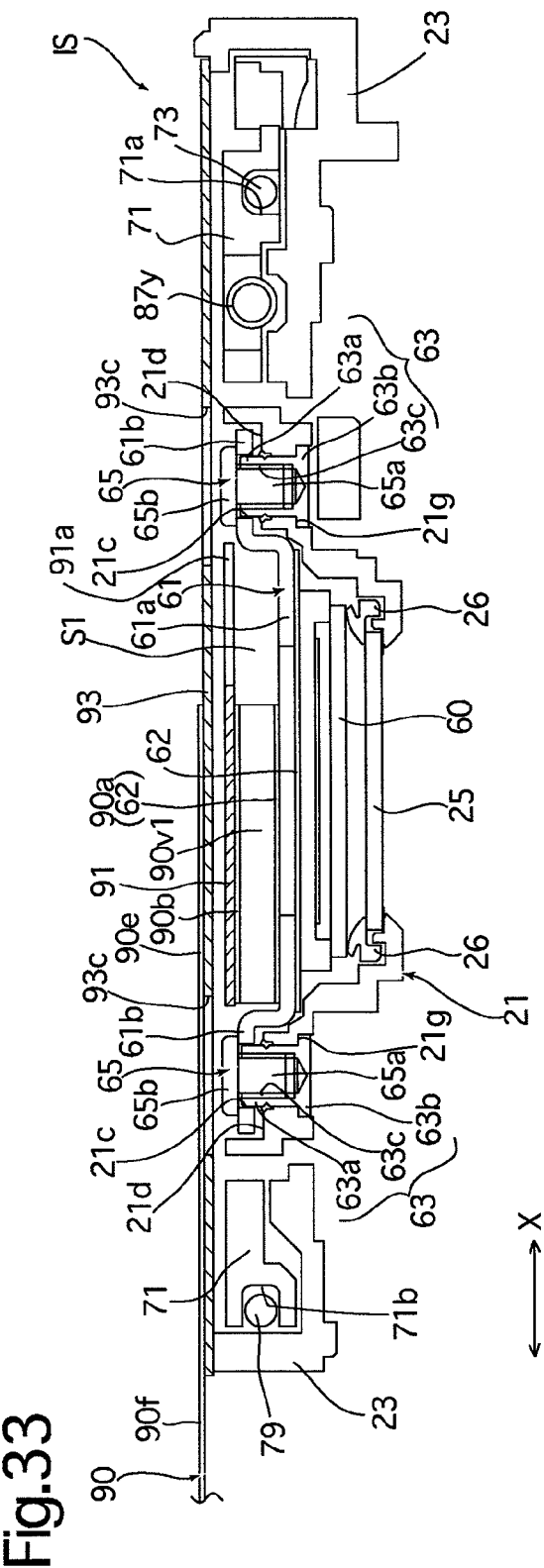
FIG. 33 is a cross sectional view of the image stabilizing unit in a state before an inclination angle adjustment is made to the CCD image sensor.
Figure 34:
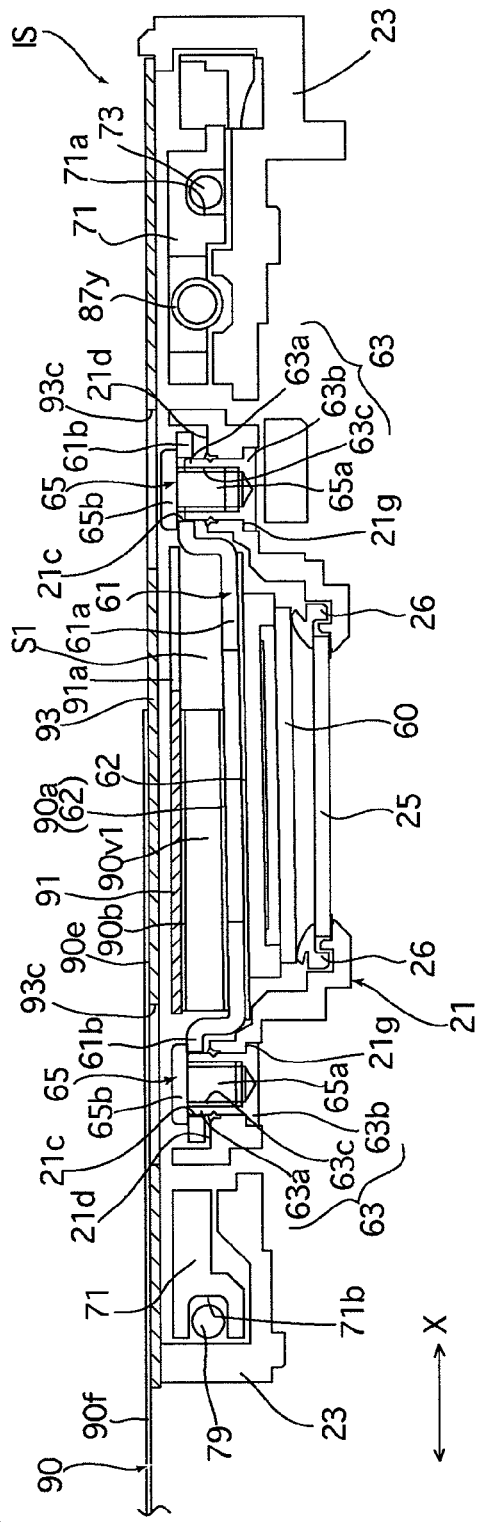
FIG. 34 is a cross sectional view of the image stabilizing unit in a state after the inclination angle adjustment has been made to the CCD image sensor.

FIGS. 33 and 34 are cross sectional views of the image stabilizing unit IS, respectively showing two different states before and after making adjustments to specific two of the three CCD adjustment screws 65 which are positioned on the horizontally opposite sides of the front flat portion 61a. In the state shown in FIG. 33, the tightening amounts of these two CCD adjustment screws 65 (the right and left CCD adjustment screws 65) are substantially identical and are not tightened to the maximum (to the limit) relative to the female screw holes 63c of the associated two nuts 63. FIG. 35 is an enlarged view of one of the right and left CCD adjustment screws 65 (the left CCD adjustment screw 65 as viewed in FIG. 34) and adjacent elements thereof in the state shown in FIG. 33. As can be seen from FIG. 35, the associated support lug 61b abuts against the back surface of the head portion 65b of the CCD adjustment screw 65 by the biasing force of the associated compression coil spring 64; however, there is room for the head portion 65b and the support lug 61b to be moved forward (downwards as viewed in FIG. 35) by further tightening the CCD adjustment screw 65 since there is still a space between the end of the cylinder portion 63a and the head portion 65b.

FIG. 34 illustrates a state in which the left CCD adjustment screw 65 has been tightened to the maximum. As can be seen in the enlarged view of the left CCD adjustment screw 65 and adjacent elements thereof in FIG. 36, the support lug 61b, which is in contact with the left CCD adjustment screw 65, has been pushed forward from the position shown in FIG. 35 against the biasing force of the compression coil spring 64 to thereby cause the CCD retaining plate 61 and the CCD image sensor 60 to tilt relative to the X-axis direction moving stage 21 (relative to the optical axis direction). In this state, the X-axis direction moving stage 21 is not tilted by the tilting of the CCD image sensor 60; however, the resilient sealing member 26, which is held between the low-pass filter 25 and the CCD image sensor 60, is resiliently deformed by the tilting of the CCD image sensor 60 (see FIG. 34).

As shown in FIG. 36, each CCD adjustment screw 65 can be tightened up until the head portion 65b comes into contact with the end of the cylinder portion 63a of the associated nut 63 because the cylinder portions 63a of the three nuts 63 are inserted in the three circular through-holes 61c, respectively. In this state, the support lug 61b is not held so as to be attached between the head portion 65b of the associated CCD adjustment screw 65 and the bottom of the associated recess 21d of the X-axis direction moving stage 21, but rather is held without making contact with the bottom of the recess 21d. Since the support lug 61b is not held so as to be attached between the head portion 65b of the associated CCD adjustment screw 65 and the bottom of the associated recess 21d, the CCD retaining plate 61 is not prevented from tilting even if the CCD adjustment screw 65 is tightened to the maximum when the tightening amount of either of the remaining two CCD adjustment screws 65 is changed. Accordingly, the entire range of axial movement of the shaft portion 65a of each CCD adjustment screw 65 relative to the associated nut 63 (the female screw hole 63c thereof) can be used for making an adjustment (inclination angle adjustment) to the angle of the CCD retaining plate 61 relative to the photographing optical axis Z1.

Figure 31:
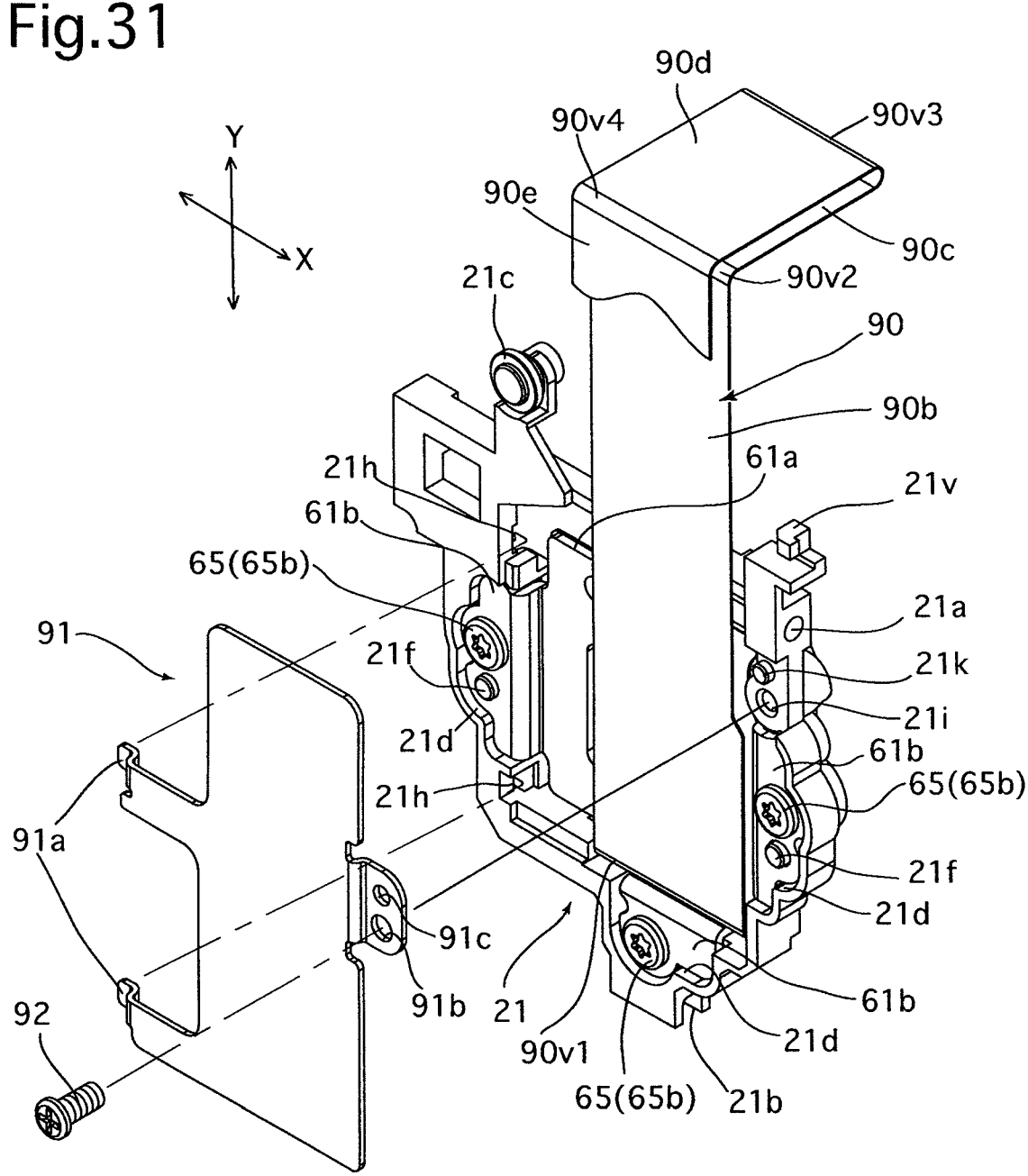
FIG. 31 is an exploded rear perspective view of the CCD unit, showing a state where the CCD retaining plate is fixed to the X-axis direction moving stage.
Figure 32:
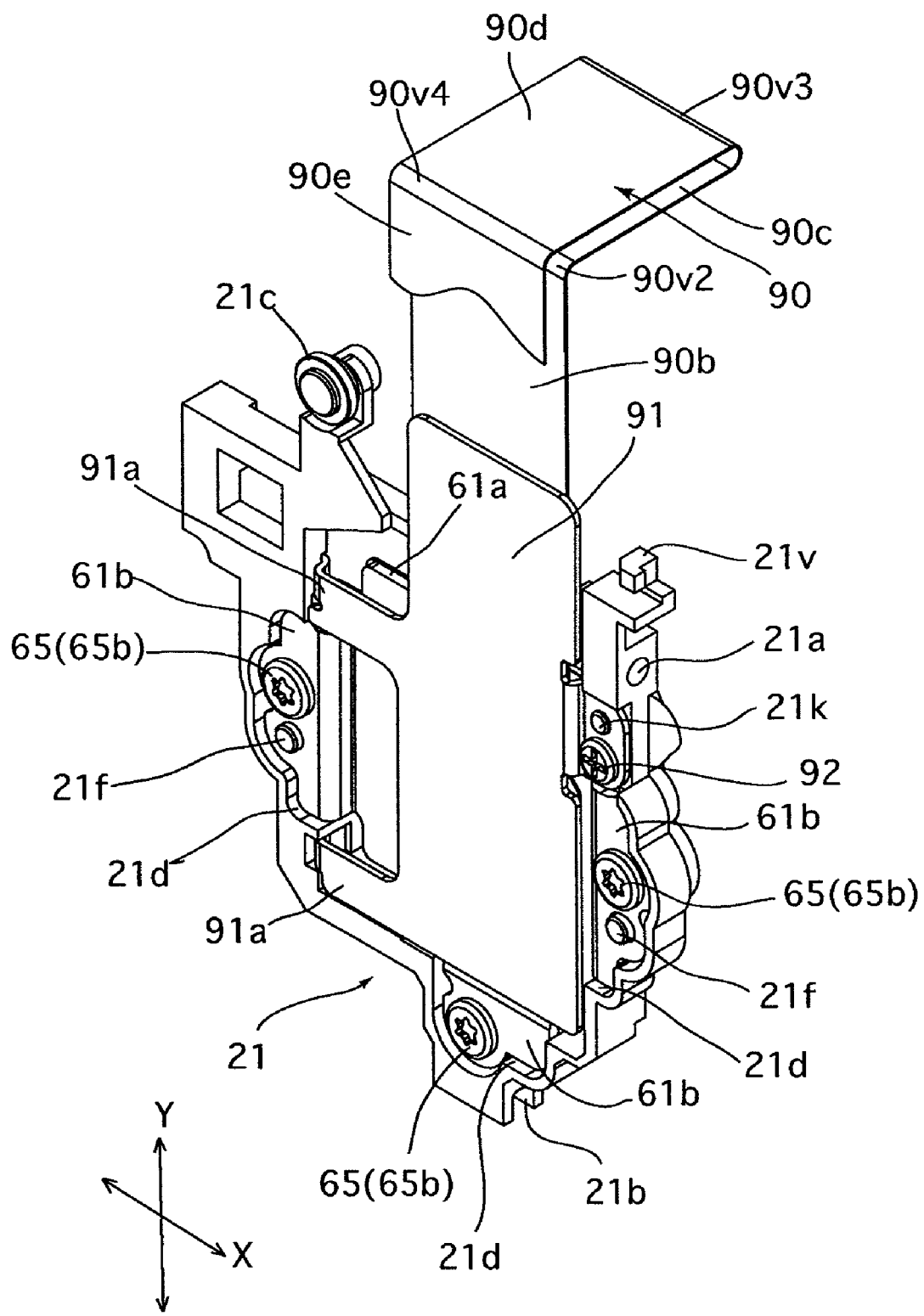
FIG. 32 is a rear perspective view of the CCD unit in an assembled state thereof.

The CCD unit is completed by fixing a movable plate (image-pickup-device holding member/flexible printed wiring board support member) 91 to the back of the X-axis direction moving stage 21 after the X-axis direction moving stage 21 and the CCD retaining plate 61 are joined together (see FIGS. 31 and 32). The movable plate 91 is a flat plate member which lies in a plane substantially parallel to a plane in which the CCD image sensor 60 is driven, i.e., substantially parallel to an X-axis and Y-axis plane defined by both the X-axis direction and the Y-axis direction. The X-axis direction moving stage 21 is provided with a pair of engaging holes 21h, a screw hole 21i and a positioning projection 21k. The movable plate 91 is provided with a pair of locking lugs 91a, a through-hole 91b and a positioning hole 91c which are engaged in the pair of engaging holes 21h, the screw hole 21i and the positioning projection 21k of the X-axis direction moving stage 21, respectively. The movable plate 91 is secured to the X-axis direction moving stage 21 by a set screw 92 which is screwed into the screw hole 21i of the X-axis direction moving stage 21 in a state where the ends of the pair of locking lugs 91a have been engaged in the pair of engaging holes 21h and where the positioning projection 21k has been engaged in the positioning hole 91c (see FIG. 32).

Figure 29:
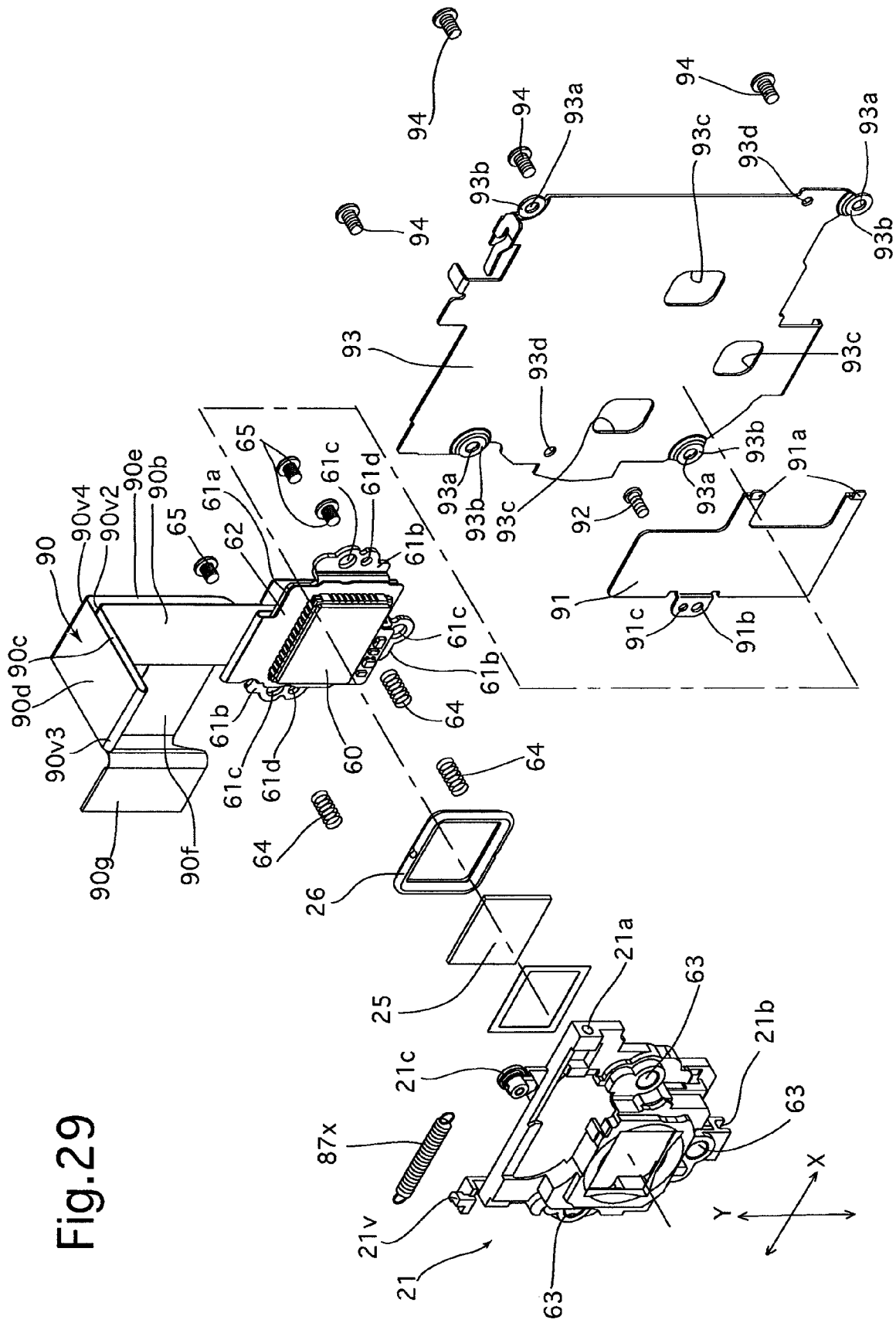
FIG. 29 is an exploded front perspective view of a CCD unit and a stationary cover shown in FIG. 10.
Figure 30:
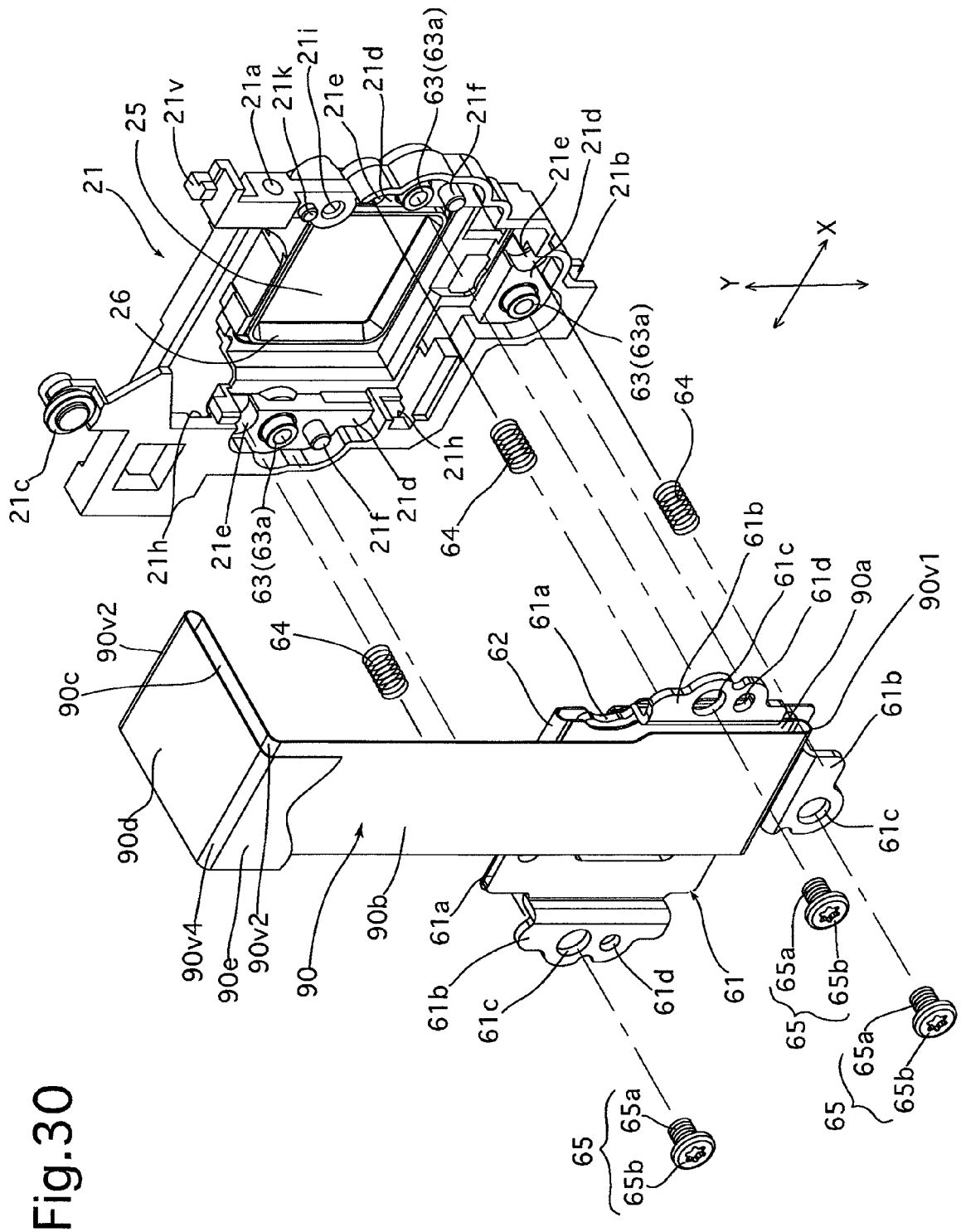
FIG. 30 is an exploded rear perspective view of the CCD unit.

The CCD unit is supported by the above described driving mechanisms for driving the CCD image sensor 60 in the X-axis direction and the Y-axis direction constituting the image stabilizing unit IS. The image stabilizing unit IS is provided with a stationary cover 93 which covers the back of the image stabilizing unit IS for projection thereof. The stationary cover 93 is a flat plate member which lies in a plane substantially parallel to a plane in which the CCD image sensor 60 is driven, i.e., substantially parallel to an X-axis and Y-axis plane defined by both the X-axis direction and the Y-axis direction, and accordingly, the stationary cover 93 is substantially parallel to the moving plate 91. As shown in FIG. 29, the stationary cover 93 is provided with four through-holes 93a arranged dispersively in the vicinity of the outer edge of the stationary cover 93, and is further provided around the four through-holes 93a with four ring-shaped abutting surfaces 93b, respectively. The four ring-shaped abutting surfaces 93b substantially lies in one plane. The stationary cover 93 is further provided with three access holes (through-holes) 93c and two positioning holes (through-holes) 93d.

FIGS. 8 and 9 show the image stabilizing unit IS from which the movable plate 91 and the stationary cover 93 are removed. As can be understood from FIGS. 8 and 9, the stationary holder 23 is provided, on the back thereof at four positions corresponding to the four through-holes 93a of the stationary cover 93, with four screw holes 23c, respectively, and is further provided around the four screw holes 23c with four abutting surfaces 23d with which the four abutting surfaces 93b of the stationary cover 93 are in contact, respectively. The stationary holder 23 is provided with two positioning projections 23e which are engageable in the two positioning holes 93d, respectively.

Figure 38:
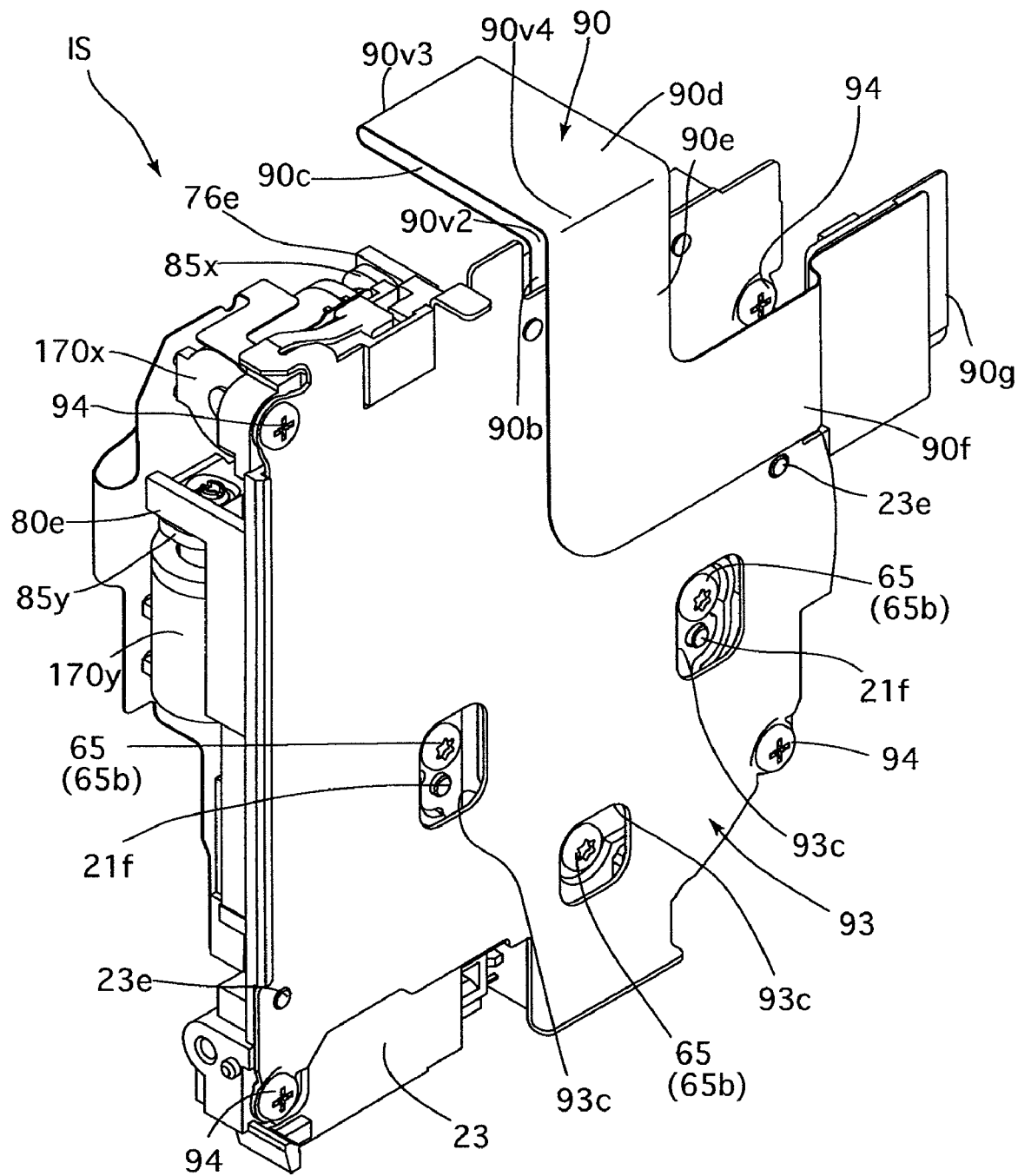
FIG. 38 is a rear perspective view of the image stabilizing unit in a state where the movable plate and the stationary cover are installed.
Figure 39:
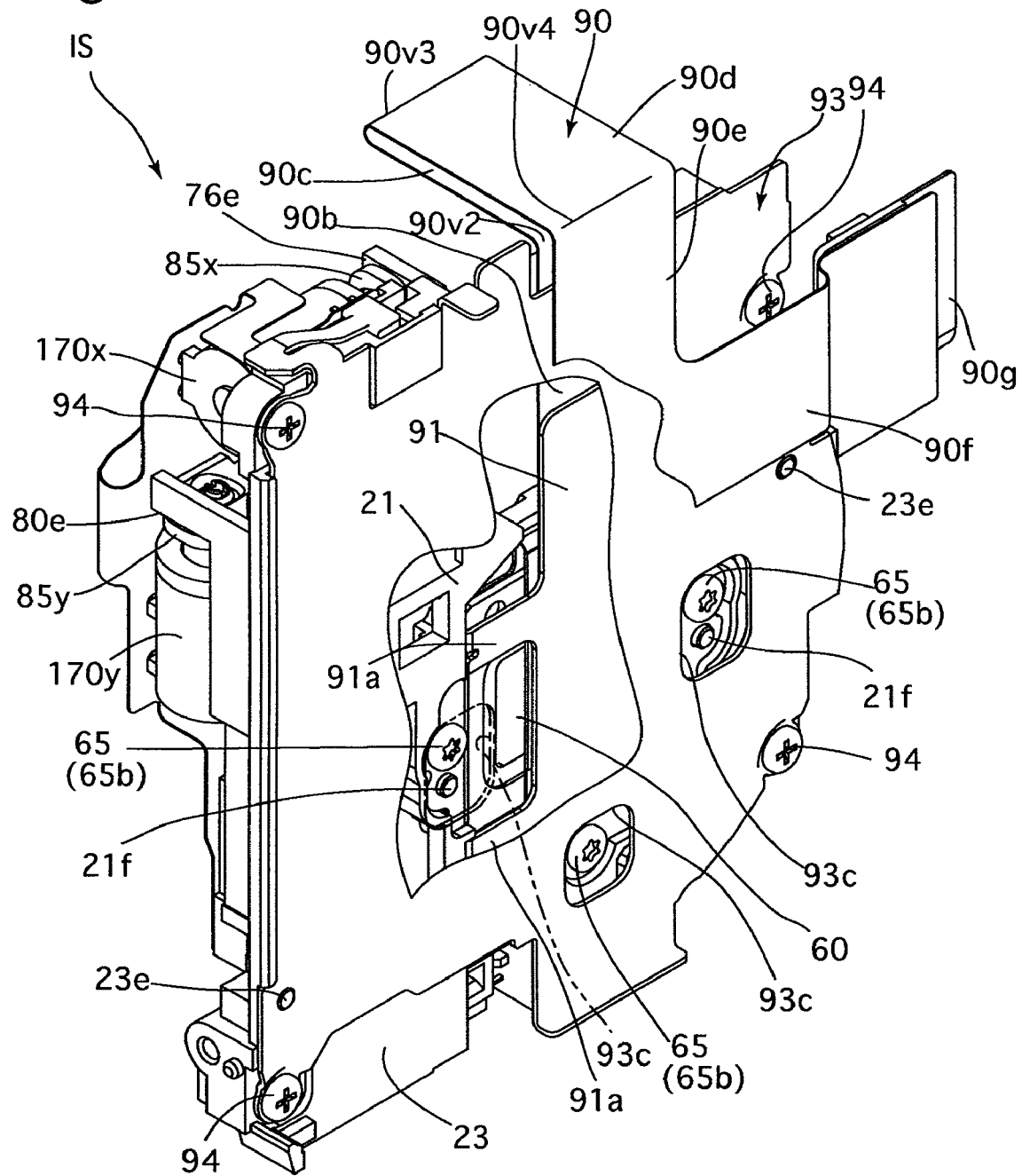
FIG. 39 is a rear perspective view of the image stabilizing unit with the stationary cover partly cut away for clarity.

When the stationary cover 93 is mounted to the stationary holder 23, the two positioning projections 23e are brought into engagement with the two positioning holes 93d, respectively. Thereupon, the four abutting surfaces 93b of the stationary cover 93 come in contact with the corresponding four abutting surfaces 23d of the stationary holder 23, respectively, so that the four through-holes 93a and the four screw holes 23c are aligned. Thereafter, as shown in FIG. 38, the stationary cover 93 is fastened to the stationary holder 23 using four set screws 94 which are screwed into the screw holes 23c of the stationary holder 23 through the through-holes 93a of the stationary cover 93. As shown FIG. 38, the head portions 65b of the three CCD adjustment screws 65 are exposed through the three access holes 93c of the stationary cover 93 in a state where the movable plate 91 and the stationary cover 93 are mounted, and accordingly, the above described inclination angle adjustment operation for adjusting the angle of the CCD image sensor 60 relative to the photographing optical axis Z1 can be carried out without dismounting the movable plate 91 or the stationary plate 93.

The control circuit 102 is mounted on the aforementioned stationary circuit board (not shown) that is provided in the camera body 202, and this stationary circuit board and the CCD substrate 62 are electrically connected to each other via the flexible PWB 90 as mentioned above. As shown in FIGS. 2, 3, 12 and 40, the flexible PWB 90 is provided with a stationary CCD-connecting portion 90a, a U-shaped folded portion 90v1, a first vertical flat portion 90b, a bent portion 90v2, a first horizontal flat portion 90c, a U-shaped folded portion 90v3, a second horizontal flat portion 90d, a bent portion 90v4, a second vertical flat portion 90e, a laterally elongated portion 90f and a connector portion 90g. The stationary CCD-connecting portion 90a is formed integral with the CCD substrate 62 in the back of the CCD retaining plate 61. A bottom end portion of the stationary CCD-connecting portion 90a is folded back upon itself to extend upward to form the U-shaped folded portion 90v1. The first vertical flat portion 90b is elongated upward in the Y-axis direction from the U-shaped folded portion 90v1. An upper end of the first vertical flat portion 90b is bent forward at a substantially right angle to form the bent portion 90v2. The first horizontal flat portion 90c is elongated forward from the bent portion 90v2 above the zoom motor 150. A front end of the first horizontal flat portion 90c is folded over upon itself by substantially 180 degrees to extend rearward to form the U-shaped folded portion 90v3. The second horizontal flat portion 90d is elongated rearward from the U-shaped folded portion 90v3. A rear end portion of the second horizontal flat portion 90d is bent downward at a substantially right angle to form the bent portion 90v4. The second vertical flat portion 90e is elongated downward in the Y-axis direction from the bent portion 90v4. The laterally elongated portion 90f is laterally elongated in the X-axis direction from the lower end of the second vertical flat portion 90e. The connector portion 90g is formed at one end (right end as viewed in FIG. 38) of the laterally elongated portion 90f to be attached to the aforementioned stationary circuit board (not shown) on which the control circuit 102 is mounted. The first vertical flat portion 90b and the second vertical flat portion 90e are substantially parallel to each other and the lengthwise direction of each of the first vertical flat portion 90b and the second vertical flat portion 90e is substantially parallel to the Y-axis direction. The first horizontal flat portion 90c and the second horizontal flat portion 90d are substantially parallel to each other and the lengthwise direction of each of the first horizontal flat portion 90c and the second horizontal flat portion 90d is substantially parallel to the photographing optical axis Z1. Note that the flexible PWB 90 and the CCD substrate 62 are not shown in the rear perspective views in FIGS. 8, 9, 19, 21 and 23 to expose the back of the front flat portion 61a of the CCD retaining plate 61.

Figure 40:
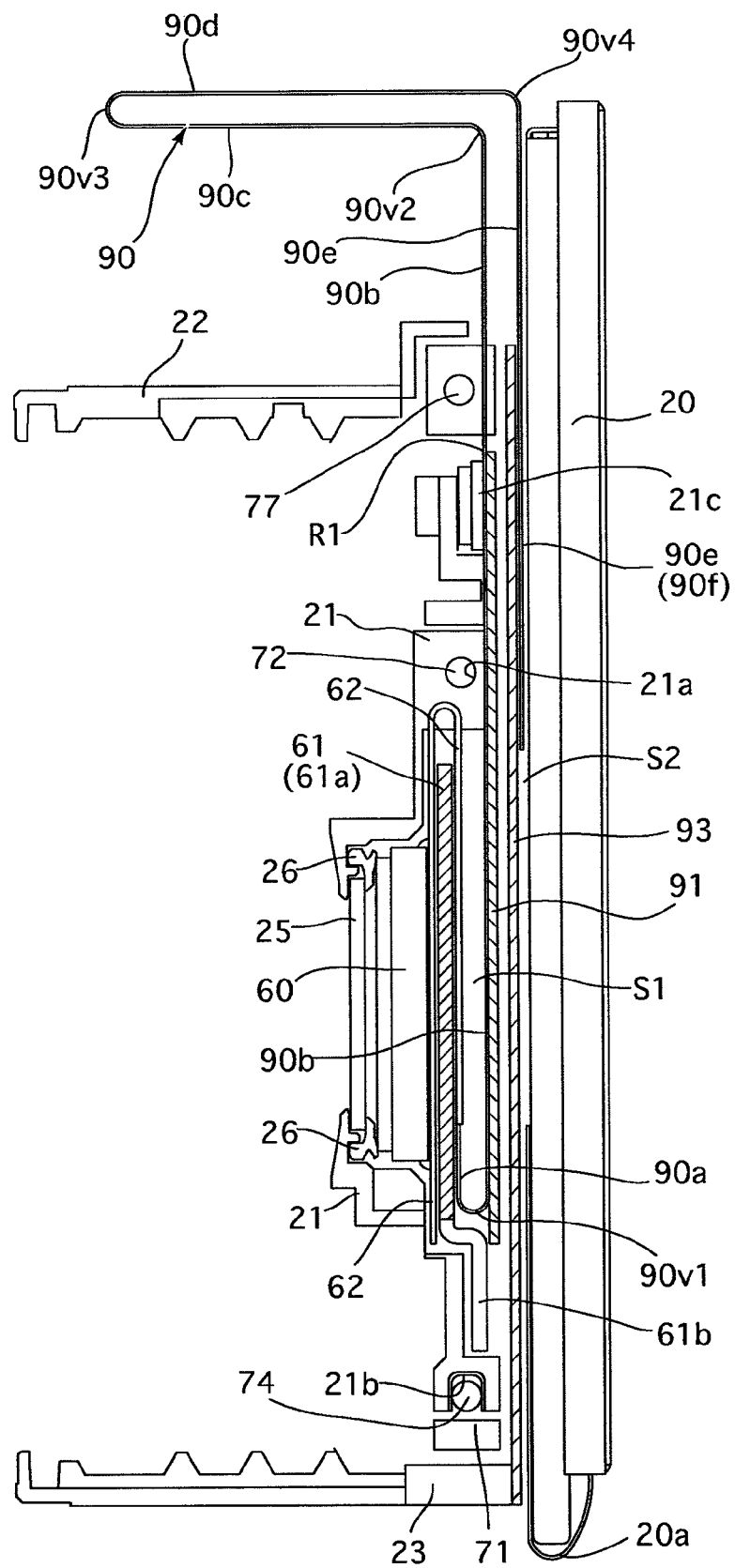
FIG. 40 is a longitudinal sectional view of a portion of the image stabilizing unit, showing the arrangement of the flexible printed wiring board that extends from the CCD image sensor.

As shown in FIG. 40, the movable plate 91 is fixed to the X-axis direction moving stage 21 to be spaced from the front flat portion 61a of the CCD retaining plate 61 in the optical axis direction to form a flexible PWB insertion space S1 between the CCD retaining plate 61 and the movable plate 91. In addition, another flexible PWB insertion space S2 is formed between the stationary cover 93 and the LCD panel 20 that is positioned behind the stationary cover 93. The U-shaped folded portion 90v1 of flexible PWB 90, which has a U-shape in cross section, is positioned in the flexible PWB insertion space S1 so that the stationary CCD-connecting portion 90a and the first vertical flat portion 90b are positioned at the front and the rear of the flexible PWB insertion space S1, respectively. The stationary CCD-connecting portion 90a is fixed to the back of the CCD retaining plate 61. On the other hand, the first vertical flat portion 90b is in contact (surface contact) with a front surface of the movable plate 91 and guided by the movable plate 91 in a direction to extend from the U-shaped folded portion 90v1 to the bent portion 90v2. The second vertical flat portion 90e and the laterally elongated portion 90f, which extend behind the first vertical flat portion 90b via the first horizontal flat portion 90c and the second horizontal flat portion 90d, extend in the flexible PWB insertion space S2 and are supported by a back surface of the stationary cover 93. Each of the second vertical flat portion 90e and the laterally elongated portion 90f is partly fixed to the back of the stationary cover 93 using a fixing device such as an adhesive double coated tape.

In this flexible printed wiring board arrangement, the movable plate 91 is arranged at a position in the optical axis direction between the CCD retaining plate 61, which supports one end of the flexible PWB 90 (the CCD substrate 62), and the stationary cover 93 that serves as a stationary support portion. As shown in FIG. 40, a part (stationary part) of the flexible PWB 90 which includes the second vertical flat portion 90e, the laterally elongated portion 90f and the connector portion 90g is fixed to the back of the stationary cover 93 in the optical axis direction and supported thereby, and the movable plate 91 is positioned so as to cover another part (movable part) of the flexible PWB 90 which extends vertically in front of the stationary cover 23, thus preventing the other part of the flexible printed PWB 90 and the stationary cover 93 from touching each other. Accordingly, the movable plate 91 serves as a protective member which prevents the flexible PWB 90 (except the aforementioned stationary portion thereof that is positioned behind the stationary cover 93) from touching adjacent stationary members such as the stationary cover 93 and the stationary holder 23. In general, if a flexible PWB (90) comes in contact with any adjacent stationary members when following movements of a movable member while being elastically deformed, friction occurs between the flexible PWB (90) and such adjacent members, and this friction may cause resistance to movements of such a movable member. However, according to the present embodiment of the flexible printed wiring board arrangement, providing the image stabilizing unit IS with the movable plate 91 makes it possible to prevent the aforementioned movable part of the flexible PWB 90 from touching adjacent stationary members to thereby prevent such friction from occurring. Additionally, a part of the first vertical flat portion 90b of the flexible PWB 90 is in surface contact with the front surface of the movable plate 91. Since the movable plate 91 is a movable member which is driven integrally with the CCD image sensor 60 in the X-axis direction and the Y-axis direction, no excessive friction occurs between the first vertical flat portion 90b and the movable plate 91 in the range of this surface contact when the CCD image sensor 60 is driven to counteract image shake. In this manner, the movable plate 91 serves as a protective member which prevents the aforementioned movable part of the flexible PWB 90 from touching adjacent stationary members and also serves as a movable support member which provides a bending-resistance property to the flexible PWB 90 while preventing excessive friction from occurring. Accordingly, the stability of the flexible PWB 90 is improved and therefore the CCD image sensor 60 (CCD unit) can be driven with a higher degree of precision under less load.

In the above described inclination angle adjustment operation for adjusting the angle of the CCD image sensor 60, the CCD retaining plate 61 is tilted relative to the X-axis direction moving stage 21 and the movable plate 91. A variation of the holding angle of the CCD retaining plate 61 produces a force which twists the flexible PWB 90 via the portion of thereof fixed to the CCD retaining plate 61. Since the flexible PWB 90 itself has elasticity, the flexible PWB 90 can cope with such twisting force by being elastically deformed. However, in the case where this elastically deformed portion of the flexible PWB 90 touches an adjacent stationary member, there is a possibility of excessive loads on movements of the CCD image sensor 60 (CCD unit) being produced when the flexible PWB 90 follows movements of the CCD image sensor 60 in the image stabilizing operation. In the present embodiment of the flexible printed wiring board arrangement, although the U-shaped folded portion 90v1, which is positioned in the flexible PWB insertion space S1 between the CCD retaining plate 61 and the movable plate 91, is twisted to be elastically deformed when the angle of the CCD image sensor 60 relative to the photographing optical axis Z1 is adjusted as shown in FIG. 34, the twisted portion of the flexible PWB 90 which extends from the first vertical flat portion 90b onward is restrained because the first vertical flat portion 90b that follows the folded portion 90v1 is in surface contact with a front surface of the movable plate 91 to be supported thereby. In other words, the angle of the CCD retaining plate 61 relative to the photographing optical axis Z1 is adjusted in the space (the flexible PWB insertion space S1) between the X-axis direction moving stage 21 and the movable plate 91, while the flexible PWB 90 that extends from the CCD image sensor 60 is supported by a surface of the movable plate 91 which faces the CCD retaining plate 61. Consequently, the twist of the flexible PWB 90 which is produced by an inclination angle adjustment made to the CCD image sensor 60 is absorbed within the CCD unit (at the folded portion 90v1) that is held between the X-axis direction moving stage 21 and the movable plate 91, so that no deformation of the flexible PWB 90, which may cause an increase in load on the movement of the CCD image sensor 60, remains in the portion thereof that extends outwards from the CCD unit. Namely, making an adjustment to the angle of the CCD image sensor 60 relative to the photographing optical axis Z1 has no adverse influence on the driving accuracy of the CCD unit.

When the CCD image sensor 60 is driven to counteract image shake, the flexible PWB 90 that is partly fixed relative to the stationary cover 93 tends to remain in the initial place. Thereupon, a deleterious moment such as a bending moment or a torsional moment occurs between the flexible PWB 90 which tends to remain at rest and the CCD image sensor 60 which tends to move. Since an elongated (strip-shaped) flexible PWB (90) can easily follow (is easily deformed by) movements of a movable member in the lengthwise direction of the elongated flexible PWB but is difficult to be made to have a similar degree of ease of following movements of the movable member in the widthwise direction of the elongated flexible PWB, due consideration must be given to preventing a deleterious moment which originates in the flexible PWB from occurring when the movable member is moved in the widthwise direction of the flexible PWB with a high degree of precision. In the present embodiment of the image stabilizer, due consideration must be given to such prevention when the CCD image sensor 60 is moved in the X-axis direction (i.e., the widthwise direction of the flexible PWB 90).

As noted above, the CCD retaining plate 61 and the movable plate 91, which move with the X-axis direction stage 21, are fixed to the back of the X-axis direction moving stage 21 that holds the CCD image sensor 60, the stationary CCD-connecting portion 90a of the flexible PWB 90 is fixed to the back of the CCD retaining plate 61, and the first vertical flat portion 90b of the flexible PWB 90 is arranged along a front surface of the movable plate 91 to be supported thereby. Note that a portion of the flexible PWB 90 which is supported by the movable plate 91 can be either fixed to the movable plate 91 by an adhesive or the like or simply in surface contact with the movable plate 91 to be supported thereby without being fixed to the movable plate 91. A portion of the stationary CCD-connecting portion 90a which is fixed to the back of the CCD retaining plate 61 and a portion of the first vertical flat portion 90b which is in contact with the movable plate 91 and supported thereby constitutes an integrally-movable portion of the flexible PWB 90 which is moved by following movements of the X-axis direction stage 21. In addition, another portion of the flexible PWB 90 which extends upward from a support boundary R1 (see FIGS. 40 and 41) and is given no support from the movable plate 91 (i.e., a portion of the flexible PWB 90 which extends upward from the upper end of the movable plate 91) is a freely-deformable portion (non-supported portion) of the flexible PWB 90 movements of which are not limited by the movable plate 91. Accordingly, the X-axis direction stage 21, the CCD retaining plate 61 and the movable plate 91 can be regarded as a single CCD holding unit (image-pickup-device holding member). The followability (flexibility) of the flexible PWB 90 relative to movements of the CCD image sensor 60 varies in the vicinity of the support boundary R1. Namely, a deleterious moment such as a bending moment or a torsional moment by the flexible PWB 90 becomes easily occurs in the vicinity of the support boundary R1 when the CCD image sensor 60 is driven in the X-axis direction.

Figure 41:
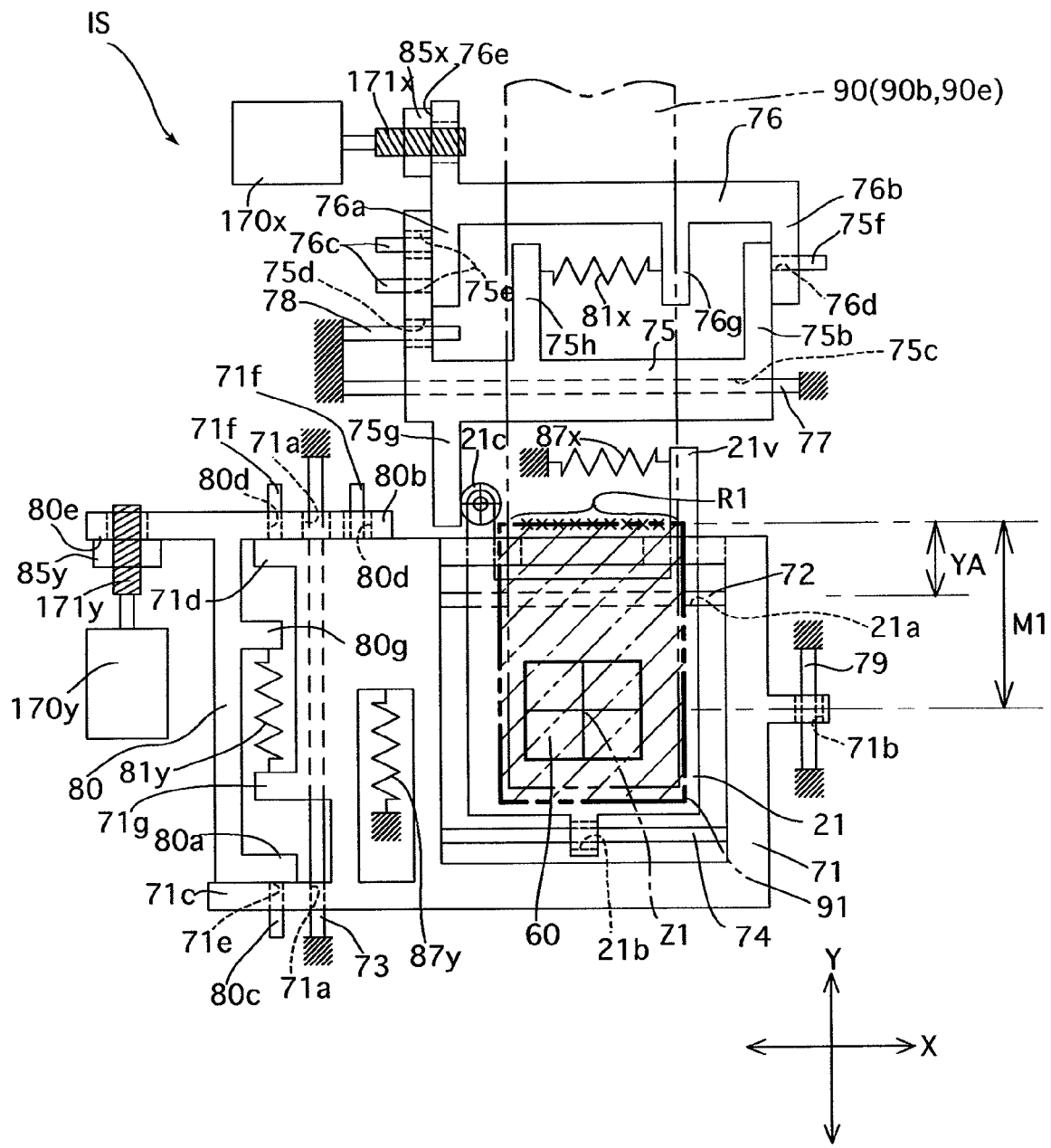
FIG. 41 is a view similar to that of FIG. 24, with the flexible printed wiring board that extends from the CCD image sensor is shown by a thin two-dot chain line, and with the movable plate that supports the flexible printed wiring board is shown by a thick two-dot chain line.

As shown in FIGS. 40 and 41, the extension of the flexible PWB 90 is orientated toward the X-axis direction guide rod 72 and the guide hole 21a so that the portion of the flexible PWB 90 which is supported by the movable plate 91 and the support boundary R1 of the freely-deformable portion of the flexible PWB 90 are positioned close to the X-axis direction guide rod 72 and the guide hole 21a. More specifically, the X-axis direction guide rod 72 and the guide hole 21a are provided above the CCD image sensor 60, and similarly, the first vertical flat portion 90b of the flexible PWB 90 is arranged to extend above the CCD image sensor 60 in the Y-axis direction in a direction orthogonal to the X-axis direction guide rod 72. Therefore, the support boundary R1 of the flexible PWB 90 is positioned in the vicinity of the X-axis direction guide rod 72 and the guide hole 21a. The X-axis direction guide rod 72 and the guide hole 21a serve as a guide device (the X-axis direction guide device) for linearly guiding the X-axis direction stage 21 in the X-axis direction. Although (in the prior art) a deleterious moment such as a bending moment or a torsional moment by the flexible PWB 90 would normally act on the engaging portions between the X-axis direction guide rod 72 and the guide hole 21*a* when the X-axis direction stage 21 is driven in the X-axis direction, in the image stabilizer of present invention, since the support boundary R1 is positioned close to the X-axis direction guide rod 72 and the guide hole 21*a*, it is possible to curb the occurrence of such a deleterious moment which would otherwise be produced by the flexible PWB 90 and exerted on the X-axis direction stage 21 (the CCD holding unit).

Figure 42:
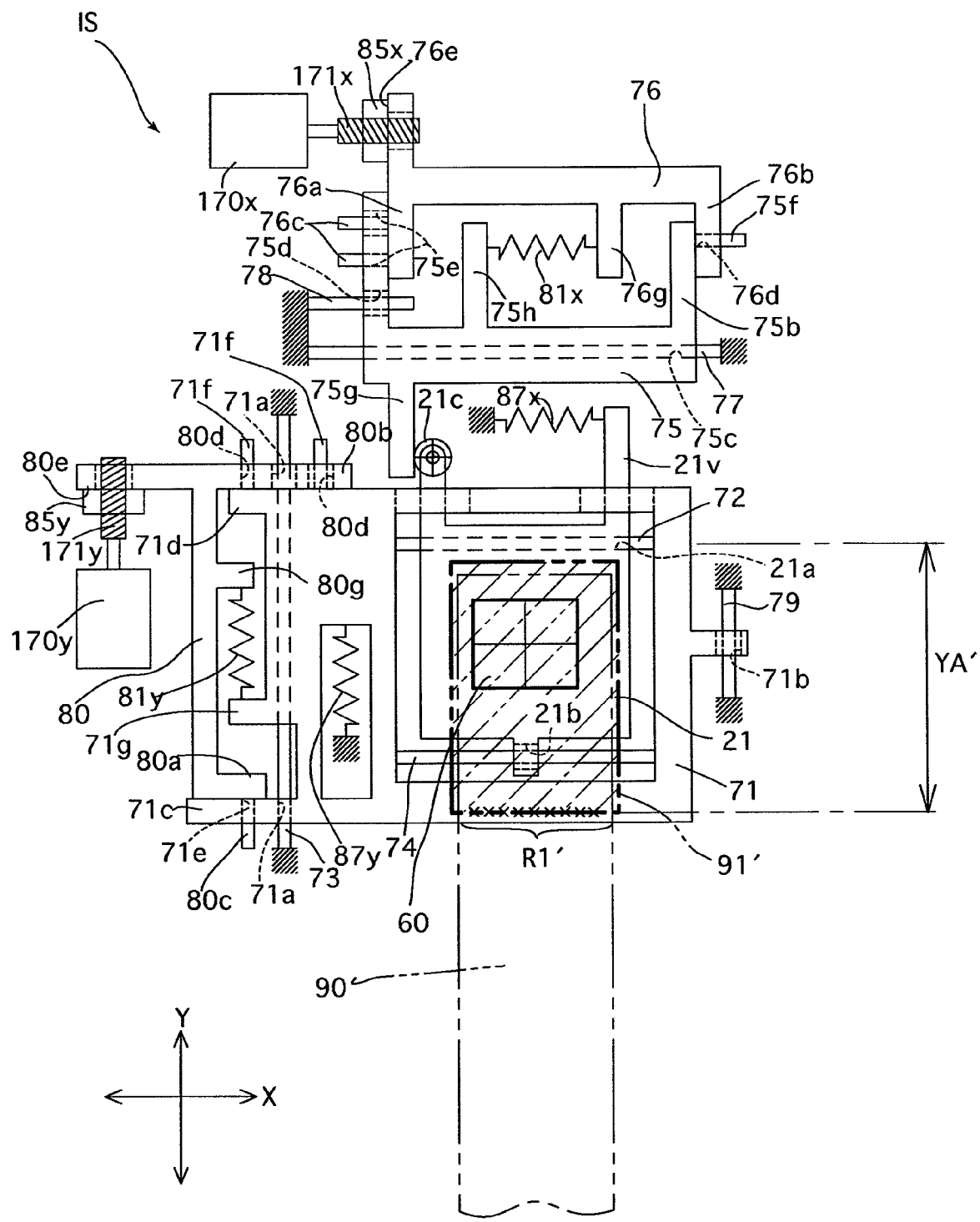
FIG. 42 is a view similar to that of FIG. 41, showing a comparative example wherein the flexible printed wiring board extends from the CCD image sensor in the direction opposite to the direction of the flexible printed wiring board shown in FIG. 41.

As an example to be compared with the image stabilizing unit shown in FIG. 41, FIG. 42 shows a comparative example of image stabilizing unit wherein a flexible PWB 90' (which corresponds to the flexible PWB 90) extends downward (in the direction opposite to the direction toward the X-axis direction guide rod 72 (i.e., orientated away from the X-axis direction guide rod 72)) from the CCD image sensor 60. In the flexible PWB 90' shown in FIG. 42, a portion of the flexible PWB 901 which extends upward from a support boundary R1' positioned at the bottom end of the movable plate 91' is a supported portion which is in contact with the front surface of a movable plate 91' (which corresponds to the movable plate 91) to be supported thereby, another portion of the flexible PWB 90' which extends downward from the support boundary R1' is a freely-deformable portion that is given no support from the movable plate 91', and these two portions of the flexible PWB 90' are mutually different in followability (flexibility) relative to movements of the CCD image sensor 60 in the X-axis direction. Although the distance from the center of the CCD image sensor 60 to the support boundary R1' is the same as the distance from the center of the CCD image sensor 60 to the support boundary R1 shown in FIG. 41, the support boundary R1' is positioned on the opposite side of the center of the CCD image sensor 60 from the position of the support boundary R1 shown in FIG. 41 in the vertical direction of the digital camera 200 (in the Y-axis direction). Therefore, the distance YA' (see FIG. 42) in the Y-axis direction between the support boundary R1' that is positioned below the CCD image sensor 60 and the X-axis direction guide rod 72 and the guide hole 21*a* that are positioned above the CCD image sensor 60 is greater than the distance YA (see FIG. 41) in the Y-axis direction between the support boundary R1 and the X-axis direction guide rod 72 and the guide hole 21*a*. According to this positional relationship between the support boundary R1' and the X-axis direction guide rod 72 and the guide hole 21*a*, a deleterious moment such as a bending moment or a torsional moment which would otherwise be produced by the flexible PWB 90' which acts on the X-axis direction stage 21 tends to become great.

Although the flexible PWB 90' that extends from the CCD image sensor 60 in the direction diametrically opposite to the direction toward the X-axis direction guide rod 72 has been shown in FIG. 42 as an example to be compared with the image stabilizing unit shown in FIG. 41, compared with any angular direction of extension of the flexible PWB other than that shown in FIG. 42 under the condition that the distance M1 (see FIG. 41) from the CCD image sensor 60 to the support boundary R1 in the Y-axis direction is constant, the direction of extension of the flexible PWB 90 from the CCD image sensor 60 in the Y-axis direction in the image stabilizing unit shown in FIG. 41 can achieve the closest position from the support boundary R1 to the X-axis direction guide rod 72 and the guide hole 21*a*.

In addition, the support boundary R1 of the flexible PWB 90 (which is positioned at the upper end of the movable plate 91) is formed to extend in a direction substantially parallel to the lengthwise direction of the X-axis direction guide rod 72, i.e., in a direction substantially parallel to the X-axis direction. Establishing the direction of the formation of the support boundary R1 in this manner makes it difficult for a deleterious moment such as a bending moment or a torsional moment by the flexible PWB 90 to act on the X-axis direction stage 21. For instance, it is desirable that the support boundary R1 be formed to extend in a direction substantially parallel to the X-axis direction guide rod 72 even in the case where the flexible PWB 90 is arranged to extend obliquely upward from the CCD image sensor 60 (i.e., in a direction not orthogonal to the X-axis direction guide rod 72) unlike the case shown in FIG. 41.

Figure 43:
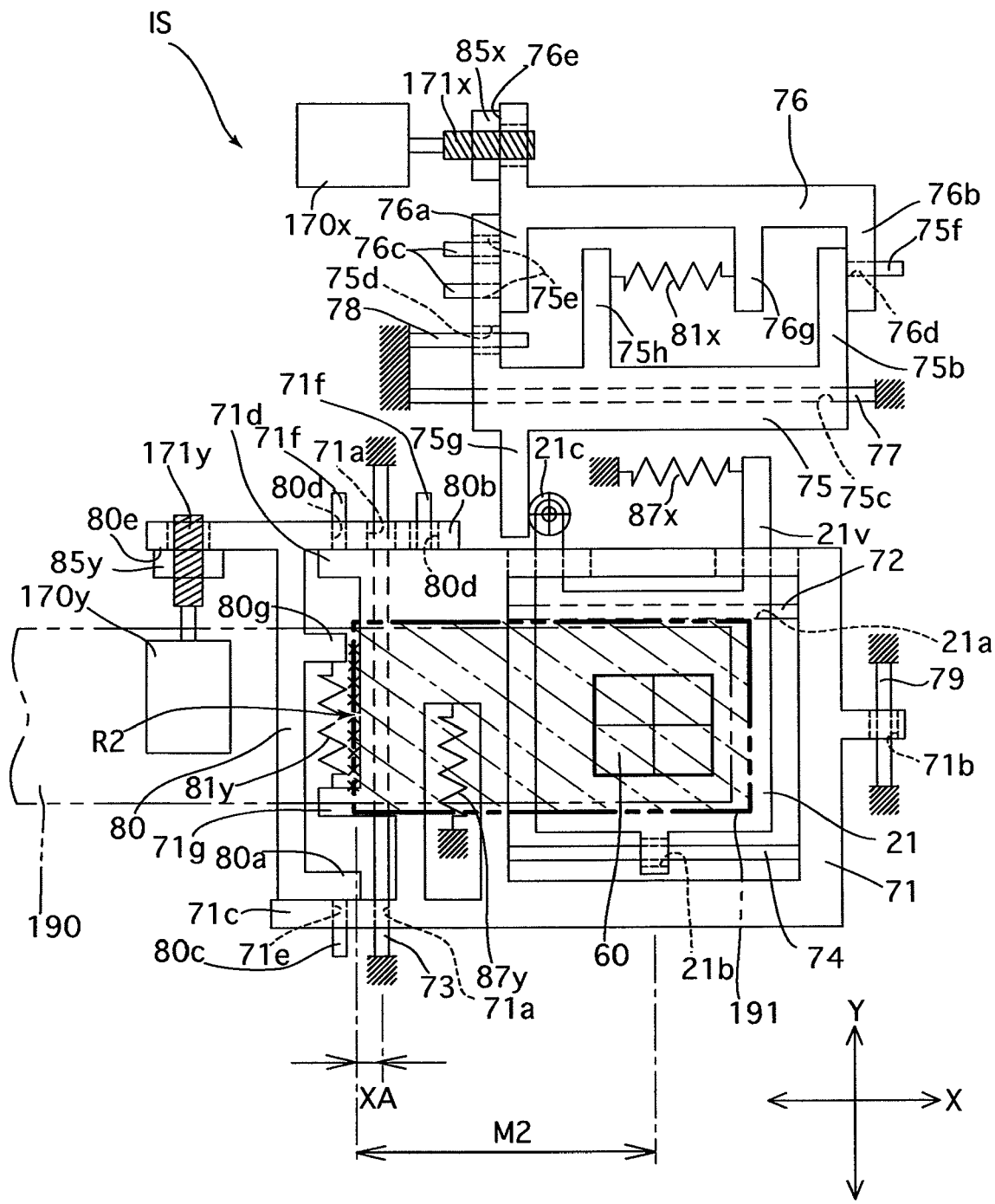
FIG. 43 is a view similar to that of FIG. 41, showing another embodiment (third embodiment) of the image stabilizing unit, wherein the flexible printed wiring board extends from the CCD image sensor in the X-axis direction (leftward as viewed in FIG. 43), i.e., in a direction different from that in FIG. 41.

Although the present invention is applied to the driving mechanism for driving the CCD image sensor 60 in the X-axis direction in each of the above illustrated embodiments of the image stabilizing units, the present invention can also be applied to the driving mechanism for driving the CCD image sensor 60 in the Y-axis direction if the length-width orientation is reversed. FIG. 43 shows another embodiment (third embodiment) of the image stabilizing unit, wherein a flexible PWB 190 (which corresponds to the flexible PWB 90) which extends from the CCD image sensor 60 is arranged to extend leftward as viewed in FIG. 43 in the X-axis direction. In the driving mechanism for driving the CCD image sensor 60 in the Y-axis direction, the Y-axis direction guide rod 73 and the guide hole 71*a* serve as a guide device (the Y-axis direction guide device) for guiding the Y-axis direction stage 71 linearly in the Y-axis direction. This guide device is provided on the left-hand side of the CCD image sensor 60 as shown in FIG. 43. The flexible PWB 190 is arranged to extend to the left-hand side area of the CCD image sensor 60 to approach the Y-axis direction guide rod 73 and the guide hole 71*a* in a direction orthogonal to the Y-axis direction guide rod 73. In the flexible PWB 190, a portion of the flexible PWB 190 which extends in this direction of extension from the right end as viewed in FIG. 43 to a support boundary R2 positioned at the left end of the movable plate 191 as viewed in FIG. 43 is an integrally-movable portion (supported portion) which is supported by a movable plate 191 (image pickup device holding member/flexible printed wiring board support member) corresponding to the movable plate 91 and which moves with the Y-axis direction stage 71, and another portion of the flexible PWB 190 which extends leftward as viewed in FIG. 43 from the support boundary R2 is a freely-deformable portion that is given no support from the movable plate 191. The movable plate 191 is fixed to the X-axis direction stage 21 or the Y-axis direction stage 71, and moves with the CCD image sensor 60 when the CCD image sensor 60 moves in the Y-axis direction. Since the support boundary R2, at which the followability (flexibility) of the flexible PWB 190 relative to movements of the Y-axis direction stage 71 varies when the Y-axis direction stage 73 moves, is disposed in the vicinity of the Y-axis direction guide rod 73 and the guide hole 71*a*, the occurrence of a deleterious moment which would otherwise be produced by the flexible PWB 90 which is exerted on the Y-axis direction stage 71 can be curbed similarly to the embodiment shown in FIG. 41.

Figure 44:
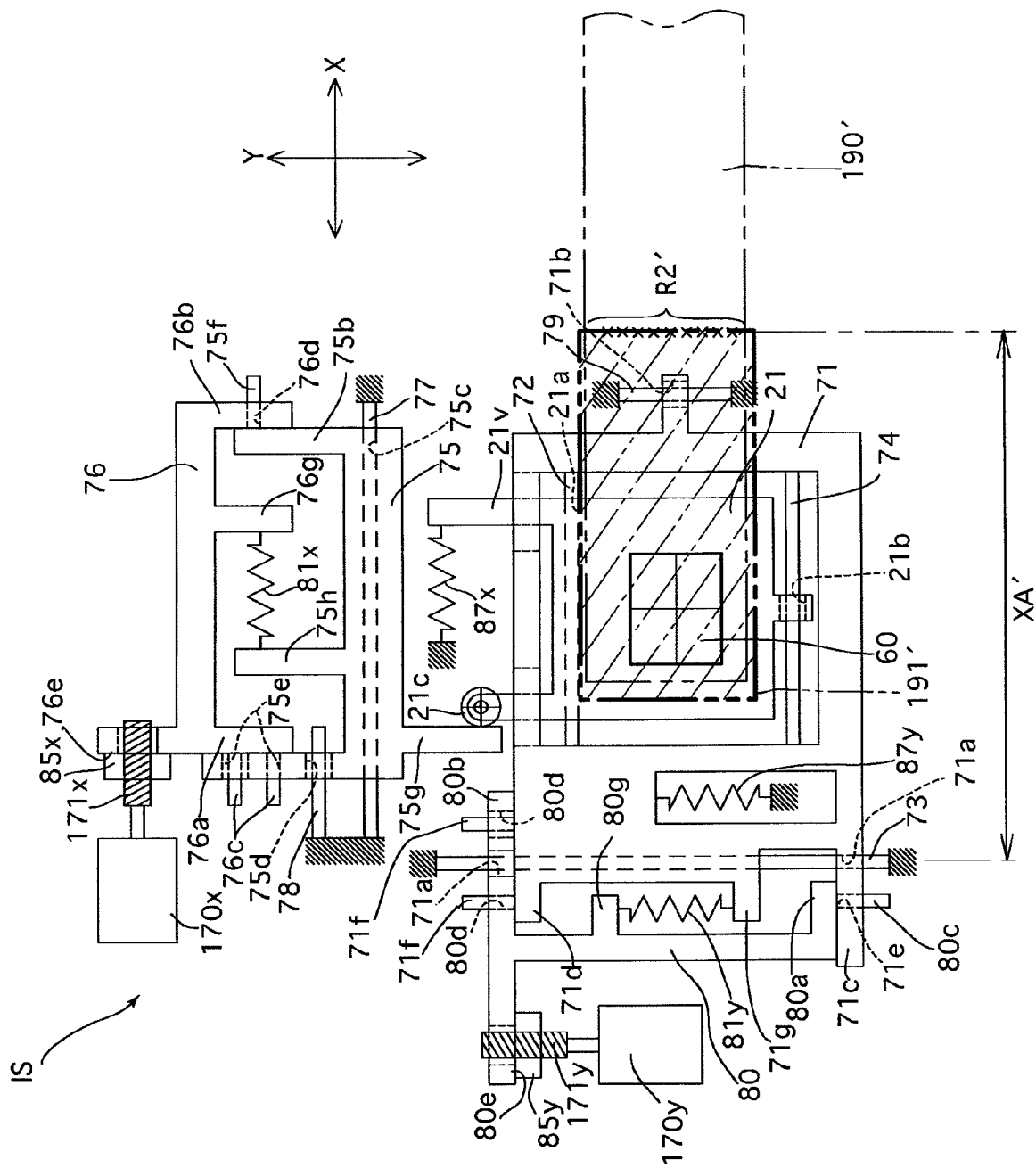
FIG. 44 is a view similar to that of FIG. 43, showing a comparative example wherein the flexible printed wiring board extends from the CCD image sensor in the direction opposite to the direction of the flexible printed wiring board shown in FIG. 43.

As an example to be compared with the image stabilizing unit shown in FIG. 43, FIG. 44 shows a comparative example of image stabilizing unit wherein a flexible PWB 190' (which corresponds to the flexible PWB 190) extends rightward, in the direction opposite to the direction toward the Y-axis direction guide rod 73 (i.e., in a direction away from the Y-axis direction guide rod 73), from the CCD image sensor 60. In the flexible PWB 190' shown in FIG. 44, a portion of the flexible PWB 190' which is positioned on one of the opposite sides of the support boundary R2' in the X-axis direction which is closer to the CCD image sensor 60 is a supported portion which is in contact with the front surface of a movable plate 191' (which corresponds to the movable plate 91) to be supported thereby, another portion of the flexible PWB 190' which extends rightward from the support boundary R2, is a freely-deformable portion that is given no support from the movable plate 191', and these two portions of the flexible PWB 190' are mutually different in followability (flexibility) relative to movements of the CCD image sensor 60 in the Y-axis direction. Although the distance from the center of the CCD image sensor 60 to the support boundary R2' is the same as the distance from the center of the CCD image sensor 60 to the support boundary R2 shown in FIG. 43, the support boundary R2' is positioned on the opposite side of the center of the CCD image sensor 60 from the position of the support boundary R2 shown in FIG. 43 in the X-axis direction. Therefore, the distance XA' (see FIG. 44) in the X-axis direction between the support boundary R2' that is positioned on the right-hand side of the CCD image sensor 60 and the Y-axis direction guide rod 73 and the guide hole 71a that are positioned on the left-hand side of the CCD image sensor 60 is greater than the distance XA (see FIG. 43) in the X-axis direction between the support boundary R2 and the Y-axis direction guide rod 73 and the guide hole 71a. According to this positional relationship between the support boundary R2' and the Y-axis direction guide rod 73 and the guide hole 71a, a deleterious moment produced by the flexible PWB 190' which acts on the Y-axis direction stage 71 tends to become great.

Although the flexible PWB 190' that extends from the CCD image sensor 60 in the direction diametrically opposite to the direction toward the Y-axis direction guide rod 73 has been shown in FIG. 44 as an example to be compared with the image stabilizing unit shown in FIG. 43, compared with any angular direction of extension of the flexible PWB other than that shown in FIG. 43 under the condition that the distance M2 (see FIG. 43) from the CCD image sensor 60 to the support boundary R2 in the X-axis direction is constant, the direction of extension of the flexible PWB 190 from the CCD image sensor 60 in the X-axis direction in the image stabilizing unit shown in FIG. 43 can achieve the closest position from the support boundary R2 to the Y-axis direction guide rod 73 and the guide hole 71a.

Similar to the driving mechanism for driving the CCD image sensor 60 in the X-axis direction, in the driving mechanism for driving the CCD image sensor 60 in the Y-axis direction, the support boundary R2 of the flexible PWB 190 (which is positioned at the left end of the movable plate 191) is formed to extend in a direction substantially parallel to the lengthwise direction of the Y-axis direction guide rod 73, i.e., in a direction substantially parallel to the Y-axis direction. Establishing the direction of the formation of the support boundary R2 in this manner makes it difficult for a deleterious moment such as a bending moment or a torsional moment by the flexible PWB 190 to act on the Y-axis direction stage 71. For instance, it is desirable that the support boundary R2 be formed to extend in a direction substantially parallel to the Y-axis direction guide rod 73 even in the case where the flexible PWB 190 is arranged to extend obliquely leftward from the CCD image sensor 60 (i.e., in a direction not orthogonal to the Y-axis direction guide rod 73) unlike the case shown in FIG. 43.

Figure 45:
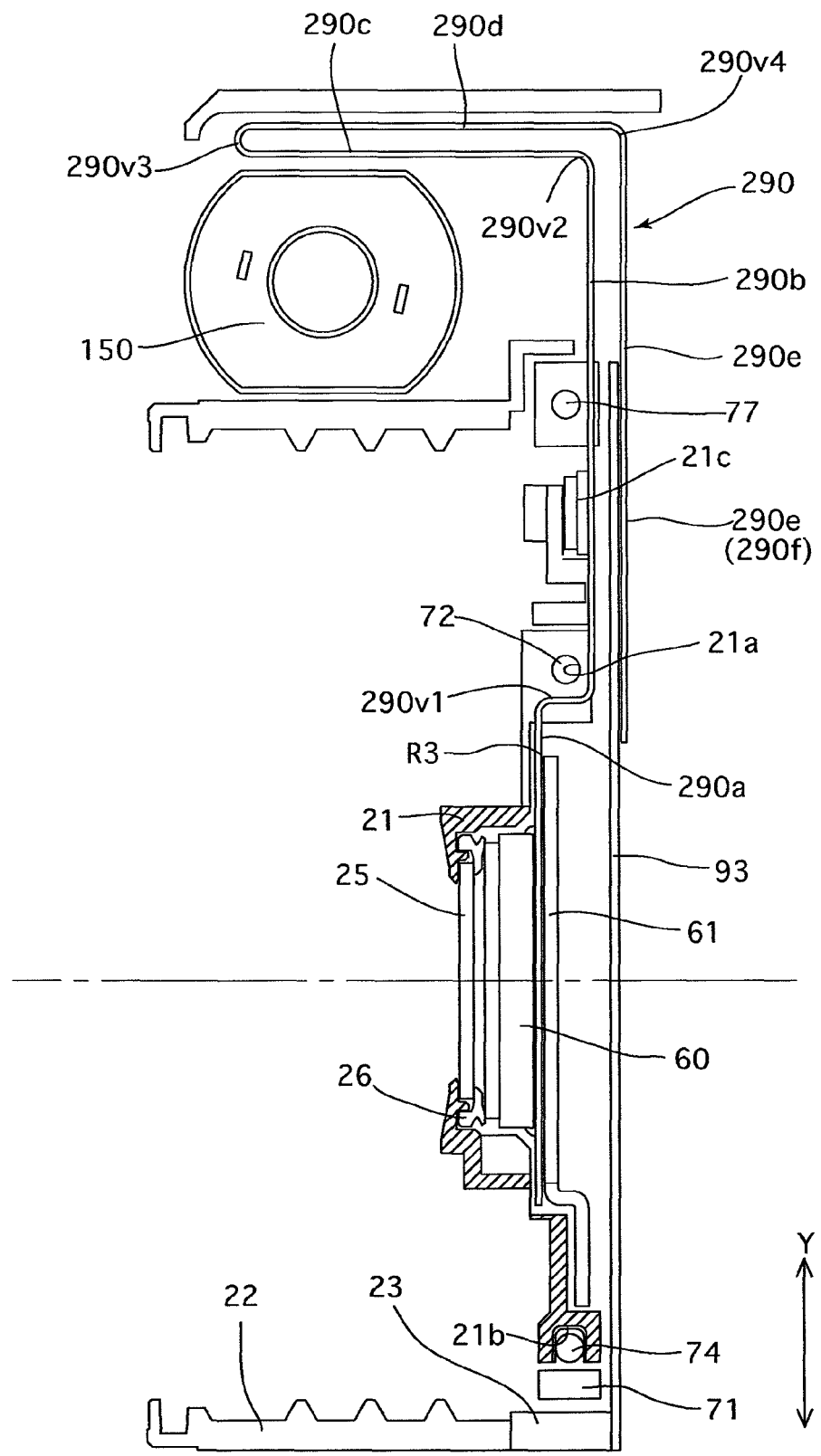
FIG. 45 is a view similar to that of FIG. 40, showing another embodiment (fourth embodiment) of the image stabilizing unit which is similar to the first embodiment of the image stabilizing unit and provided with no movable plate corresponding to the movable plate shown in FIG. 40.

FIG. 45 shows another embodiment (fourth embodiment) of the image stabilizing unit which is similar to the first embodiment shown in FIG. 40 of the image stabilizing unit, but does not have a movable plate like the movable plate 91. In a flexible PWB 290 (which corresponds to the flexible PWB 90) in the fourth embodiment, a portion of a stationary CCD-connecting portion 290a (which corresponds to the stationary CCD-connecting portion 90a) of the flexible PWB 290 is fixed to the front of the CCD retaining plate 61. This fixed portion of the stationary CCD-connecting portion 290a is an integrally-movable portion which moves integrally with the CCD image sensor 60. The flexible PWB 290 is arranged to extend from this integrally-movable portion upward, toward the area where the X-axis direction guide rod 72 and the guide hole 21a are disposed, and a portion of the flexible PWB 290 which extends upward from a support boundary R3 (see FIG. 45) positioned at the upper end of the CCD retaining plate 61 is a freely-deformable portion which is not supported by the image stabilizing unit including the CCD retaining plate 61. More specifically, a part of the stationary CCD-connecting portion 290a, a folded portion 290v1 (which corresponds to the U-shaped folded portion 90v1), a first vertical flat portion 290b (which corresponds to the first vertical flat portion 90b), a bent portion 290v2 (which corresponds to the bent portion 90v2), a first horizontal flat portion 290c (which corresponds to the first horizontal flat portion 90c), a U-shaped folded portion 290v3 (which corresponds to the a U-shaped folded portion 90v3), a second horizontal flat portion 290d (which corresponds to the second horizontal flat portion 90d), a bent portion 290v4 (which corresponds to the bent portion 90v4) and a part of a second vertical flat portion 290e (which corresponds to the second vertical flat portion 90e) constitute the freely-deformable portion of the flexible PWB 290. A lower part of the second vertical flat portion 290e is fixed to the back of the stationary cover 93 and is continuously formed with a laterally elongated portion 290f (which corresponds to the laterally elongated portion 90f) that is laterally elongated in the X-axis direction from the lower end of the second vertical flat portion 290e. The support boundary R3 of the flexible PWB 290 is formed to extend in the X-axis direction to be substantially parallel to the X-axis direction guide rod 72. Similar to the first embodiment of the image stabilizing unit, orientating the flexible PWB 290 toward the X-axis direction guide rod 72 and the guide hole 21a so that the support boundary R3 is close to the X-axis direction guide rod 72 and the guide hole 21a makes it possible to curb the occurrence of a deleterious moment such as a bending moment or a torsional moment which would otherwise be produced by the flexible PWB 290 and exerted on the X-axis direction stage 21.

Figure 46:
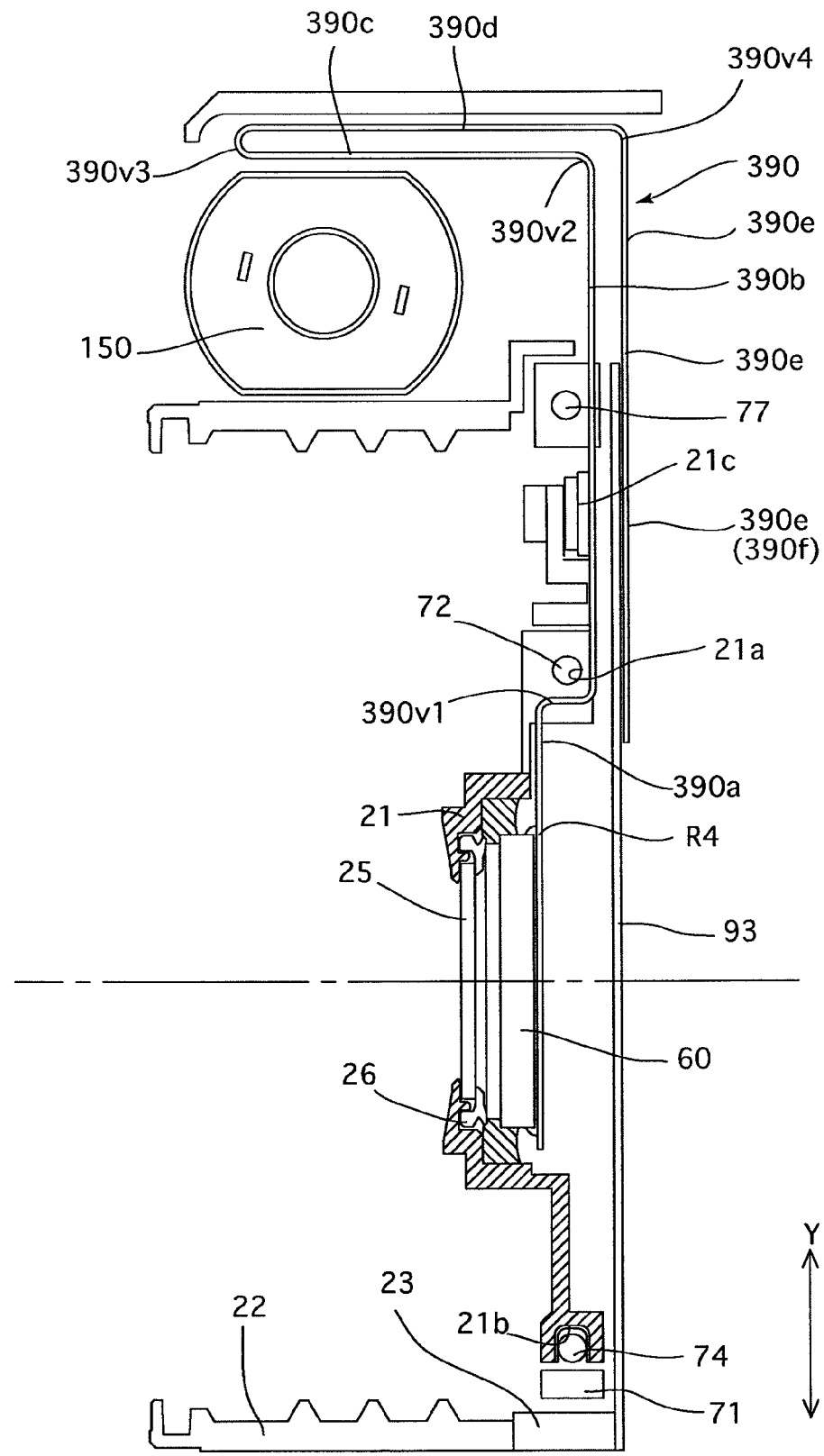
FIG. 46 is a view similar to that of FIG. 45, showing another embodiment (fifth embodiment) of the image stabilizing unit which is similar to the fourth embodiment of the image stabilizing unit and provided with no CCD retaining plate corresponding to the CCD retaining plate shown in FIG. 45.

FIG. 46 shows another embodiment (fifth embodiment) of the image stabilizing unit, which is similar to the fourth embodiment shown in FIG. 45 of the image stabilizing unit, but does not have a CCD retaining plate like the CCD retaining plate 61. In a flexible PWB 390 (which corresponds to the flexible PWB 290) in the fifth embodiment, a portion of a stationary CCD-connecting portion 390a (which corresponds to the stationary CCD-connecting portion 290a) of the flexible PWB 390 is fixed to the back of the CCD image sensor 60. This fixed portion of the stationary CCD-connecting portion 390a is an integrally-movable portion which moves integrally with the CCD image sensor 60. The flexible PWB 390 is arranged to extend from this integrally-movable portion upward, toward the area where the X-axis direction guide rod 72 and the guide hole 21a are disposed, and a portion of the flexible PWB 390 which extends upward from a support boundary R4 (see FIG. 46) positioned at the upper end of the back of the CCD image sensor 60 is a freely-deformable portion which is not supported by the image stabilizing unit including the CCD image sensor 60. More specifically, a part of the stationary CCD-connecting portion 390a, a folded portion 390v1 (which corresponds to the folded portion 290v1), a first vertical flat portion 390b (which corresponds to the first vertical flat portion 290b), a bent portion 390v2 (which corresponds to the bent portion 290v2), a first horizontal flat portion 390c (which corresponds to the first horizontal flat portion 290c), a U-shaped folded portion 390v3 (which corresponds to the a U-shaped folded portion 290v3), a second horizontal flat portion 390d (which corresponds to the second horizontal flat portion 290d), a bent portion 390v4 (which corresponds to the bent portion 290v4) and a part of a second vertical flat portion 390e (which corresponds to the second vertical flat portion 290e) constitute the freely-deformable portion of the flexible PWB 390. A lower part of the second vertical flat portion 390e is fixed to the back of the stationary cover 93 and is continuously formed with a laterally elongated portion 390f (which corresponds to the laterally elongated portion 290f) that is laterally elongated in the X-axis direction from the lower end of the second vertical flat portion 390e. The support boundary R4 of the flexible PWB 390 is formed to extend in the X-axis direction to be substantially parallel to the X-axis direction guide rod 72. Similar to the fourth embodiment of the image stabilizing unit, orientating the flexible PWB 390 toward the X-axis direction guide rod 72 and the guide hole 21a so that the support boundary R4 is close to the X-axis direction guide rod 72 and the guide hole 21a makes it possible to curb the occurrence of a deleterious moment such as a bending moment or a torsional moment which would otherwise be produced by the flexible PWB 390 and exerted on the X-axis direction stage 21.

As described above, according to the image stabilizer to which the present invention is applied, the occurrence of a deleterious moment such as a bending moment or a torsional moment caused by the flexible PWB which is exerted on the image pickup device holding member (each of the X-axis direction stage 21 and the Y-axis direction stage 71) when the image pickup device is driven to counteract image shake is substantially prevented, to thereby make it possible to move the image pickup device with a high degree of precision.

It is desirable that a guide device for the image pickup device (the X-axis direction guide rod 72 and the Y-axis direction guide rod 73) and a driving device (the X-axis drive motor 170x and the Y-axis drive motor 170y) be provided independently of each other, i.e., not integrally with each other, so as to be arranged at different positions in a plane orthogonal to a photographing optical axis (the photographing optical axis Z1). Driving devices such as motors or actuators are relatively large components, and accordingly, by arranging the driving devices at positions different from the positions of the guide devices (the X-axis direction guide device and the Y-axis direction guide device), the arrangements of the supported portion and the freely-deformable portion of the flexible PWB become less restricted around the guide devices while an ideal arrangement of the flexible PWB becomes possible. Additionally, since the driving devices can be arranged in dead space not interfering with either the guide devices or the flexible PWB, the internal space of the camera body can be used more effectively.

Although the image stabilizing units shown in FIGS. 41 and 43, which have been referenced to illustrate features of the present invention, are the type of image stabilizing unit shown in FIG. 24 in which one end of the X-axis direction stage biasing spring 87x is fixed to the stationary holder 23 to be supported thereby, similar effects can be obtained even in the type of image stabilizing unit shown in FIGS. 26 through 28 in which the X-axis direction stage biasing spring 87x is engaged with the spring hook 71w of the Y-axis direction stage 71.

Although the present invention has been described based on the above illustrated embodiments, the present invention is not limited solely to these particular embodiments. For instance, although each of the flexible PWB 90, 290 and 390 includes a forward-extending portion which is composed of the first horizontal flat portion (90c, 290c or 390c), the U-shaped folded portion (90v3, 290v3 or 390v3) and the second horizontal flat portion (90d, 290d or 390d) and this forward-extending portion contributes to a reduction of a resistance to movements of the flexible PWB when the CCD image sensor 60 is driven in the above illustrated embodiments, it is possible that this forward-extending portion be omitted in the flexible printed wiring board arrangement of the present invention.

Although the movable plate (91 or 191) which is in contact with the flexible PWB (90 or 190) to support the flexible PWB is provided as a component independent of the X-axis direction stage 21 and the Y-axis direction stage 71 that hold the CCD image sensor 60, it is possible that one or more supports for supporting the flexible PWB be formed integral with each of the X-axis direction stage 21 and the Y-axis direction stage 71.

Although the X-axis direction stage 21 is configured to receive a driving force of the X-axis drive motor 170x via intermediate members such as the first X-axis direction moving member 75 and the second X-axis direction moving member 76 while the Y-axis direction stage 71 is configured to receive a driving force of the Y-axis drive motor 170y via an intermediate member such as the Y-axis direction moving member 80 in the above illustrated embodiments of the image stabilizers, it is possible that each of the X-axis direction stage and the Y-axis direction stage be directly coupled to the associated drive source, with no such intermediate members therebetween.

Obvious changes may be made in the specific embodiments of the present invention d-shaped folded p such modifications being within the spirit and scope of the invention claimed. It is indicated that all matter contained herein is illustrative and does not limit the scope of the present invention.

What is claimed is:
1. An image stabilizer comprising:
an image pickup device;
a guide device which guides said image pickup device in a manner to allow said image pickup device to move linearly in a plane orthogonal to an optical axis, said guide device and said image pickup device being arranged at different positions; and
a flexible printed wiring board which extends from said image pickup device and towards said guide device, and which overlaps said guide device along the optical axis direction,
wherein said flexible printed wiring board includes an integrally-movable portion which is connected to said image pickup device to move with said image pickup device, and a freely-deformable portion extending from said integrally-movable portion,
wherein said flexible printed wiring board is orientated toward said guide device so that a boundary between said integrally-movable portion and said freely-deformable portion is positioned close to said guide device.
2. The image stabilizer according to claim 1, further comprising:
an image-pickup-device holding member which holds said image pickup device, wherein said integrally-movable portion of said flexible printed wiring board is supported by said image-pickup-device holding member.

3. The image stabilizer according to claim 2, wherein said image-pickup-device holding member comprises:
   a holding frame which holds said image pickup device and is guided linearly by said guide device; and
   a flexible printed wiring board support member fixed to said holding frame behind said image pickup device so that said flexible printed wiring board partly lies on a front surface of said flexible printed wiring board support member.

4. The image stabilizer according to claim 2, further comprising:
   a driving device which moves said image-pickup-device holding member in a guide direction of said guide device, said driving device being arranged at a different position from said guide device in a plane orthogonal to said optical axis.

5. The image stabilizer according to claim 2, wherein said image-pickup-device holding member comprises:
   a first moving stage to which said image pickup device is mounted and which is guided linearly in a first direction by said guide device, and
   a second moving stage which holds said first moving stage and is movable linearly in a second direction orthogonal to said first direction in a plane orthogonal to said optical axis.

6. The image stabilizer according to claim 1, wherein a direction of formation of said boundary between said integrally-movable portion and said freely-deformable portion of said flexible printed wiring board is substantially parallel to a guiding direction of said guide device.

7. The image stabilizer according to claim 1, wherein said guide device comprises:
   a guide shaft extending in a direction orthogonal to said optical axis; and
   a guide hole which is formed in said image-pickup-device holding member and in which said guide shaft is slidably engaged.

8. The image stabilizer according to claim 4, wherein said driving device comprises at least one motor.

9. The image stabilizer according to claim 1, wherein said image stabilizer is incorporated in a digital camera.

10. An image stabilizer, comprising:
    an image pickup device;
    a holding frame which holds said image pickup device;
    a guide device which guides said holding frame in a manner to allow said holding frame to move linearly in a plane orthogonal to an optical axis;
    a flexible printed wiring board which extends from said image pickup device and towards said guide device, and which overlaps said guide device along the optical axis direction; and
    a flexible printed wiring board support member fixed to said holding frame behind said image pickup device so that said flexible printed wiring board partly lies on a front surface of said flexible printed wiring board support member, said flexible printed wiring board support member being moved with said holding frame in a direction orthogonal to said optical axis,
    wherein said flexible printed wiring board is orientated toward said guide device so that a boundary between a supported portion and a non-supported portion of said flexible printed wiring board which are supported and not supported by said flexible printed wiring board support member, respectively, is positioned close to said guide device.

* * * * *